US009981860B2

(12) United States Patent
Govindan et al.

(10) Patent No.: US 9,981,860 B2
(45) Date of Patent: May 29, 2018

(54) PRODUCTION OF ULTRA-HIGH-DENSITY BRINES USING TRANSIENTLY-OPERATED DESALINATION SYSTEMS

(71) Applicant: Gradiant Corporation, Woburn, MA (US)

(72) Inventors: Prakash Narayan Govindan, Melrose, MA (US); Maximus G. St. John, Boston, MA (US); Steven Lam, Medford, MA (US); Mark Zaloudek, Waltham, MA (US); Karim M. Chehayeb, Beirut (LB); Samar Shah, Malden, MA (US)

(73) Assignee: Gradiant Corporation, Woburn, MA (US)

(*) Notice: Subject to any disclaimer, the term of this patent is extended or adjusted under 35 U.S.C. 154(b) by 0 days. days.

(21) Appl. No.: 15/464,390

(22) Filed: Mar. 21, 2017

(65) Prior Publication Data

US 2017/0203977 A1 Jul. 20, 2017

Related U.S. Application Data

(63) Continuation of application No. 14/992,244, filed on Jan. 11, 2016, now Pat. No. 9,617,169, which is a continuation of application No. 14/719,189, filed on May 21, 2015, now Pat. No. 9,266,748.

(51) Int. Cl.

| | |
|---|---|
| ***B01D 1/30*** | (2006.01) |
| ***C02F 1/10*** | (2006.01) |
| ***C02F 5/02*** | (2006.01) |
| ***C02F 1/66*** | (2006.01) |
| ***B01D 3/16*** | (2006.01) |
| ***B01D 17/02*** | (2006.01) |
| ***C02F 1/52*** | (2006.01) |
| *C02F 103/08* | (2006.01) |
| *C02F 101/32* | (2006.01) |
| *C02F 101/10* | (2006.01) |
| *C02F 101/12* | (2006.01) |
| *C02F 1/00* | (2006.01) |
| *C02F 103/10* | (2006.01) |

(52) U.S. Cl.

CPC .................. *C02F 1/10* (2013.01); *B01D 3/16* (2013.01); *B01D 17/02* (2013.01); *C02F 1/5236* (2013.01); *C02F 1/66* (2013.01); *C02F 5/02* (2013.01); *C02F 2001/007* (2013.01); *C02F 2001/5218* (2013.01); *C02F 2101/101* (2013.01); *C02F 2101/12* (2013.01); *C02F 2101/322* (2013.01); *C02F 2101/325* (2013.01); *C02F 2103/08* (2013.01); *C02F 2103/10* (2013.01); *C02F 2301/046* (2013.01)

(58) Field of Classification Search

CPC ............. B01D 1/30; B01D 1/00; B01D 11/04

USPC .................................................... 23/306, 307

See application file for complete search history.

(56) References Cited

U.S. PATENT DOCUMENTS

| | | | |
|---|---|---|---|
| 3,214,351 | A | 10/1965 | Lichtenstein et al. |
| 3,489,652 | A | 1/1970 | Williamson |
| 3,583,895 | A | 6/1971 | Othmer |
| 3,860,492 | A | 1/1975 | Lowi, Jr. et al. |
| 3,926,739 | A | 12/1975 | Izumi |
| 4,072,182 | A | 2/1978 | Cheng |
| 5,124,004 | A | 6/1992 | Grethlein et al. |
| 5,617,719 | A | 4/1997 | Ginter |
| 5,724,828 | A | 3/1998 | Korenic |
| 6,730,234 | B2 | 5/2004 | Symens et al. |
| 6,911,121 | B1 | 6/2005 | Beckman, Jr. |

(Continued)

FOREIGN PATENT DOCUMENTS

| | | |
|---|---|---|
| CN | 1140763 C | 3/2004 |
| DE | 3147460 A1 | 6/1983 |

(Continued)

OTHER PUBLICATIONS

International Search Report and Written Opinion for PCT/US16/33632 dated Nov. 14, 2016.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>.

Aly et al., Modelling and simulation of steam jet ejectors. Desalination. 1999;123(1):1-8.

Efraty et al., Closed circuit desalination—A new low energy high recovery technology without energy recovery. Desalination and Water Treatment. Jul. 31, 2011. 95-101.

Govindan, Thermal Design of Humidification Dehumidificaiton Systems for Affordable and Small-scale Desalination. Doctoral Thesis. Massachusetts Institute of Technology. Sep. 2012. 286 pages.

(Continued)

*Primary Examiner* — Edward Johnson

(74) *Attorney, Agent, or Firm* — Wolf, Greenfield & Sacks, P.C.

(57) ABSTRACT

Systems and methods related to desalination systems are described herein. According to some embodiments, the desalination systems are transiently operated and/or configured to facilitate transient operation. In some embodiments, a liquid stream comprising water and at least one dissolved salt is circulated through a fluidic circuit comprising a desalination system. In some embodiments, a portion of the desalination system (e.g., a humidifier) is configured to remove at least a portion of the water from the liquid stream to produce a concentrated brine stream enriched in the dissolved salt. In certain cases, the concentrated brine stream is recirculated through the fluidic circuit until the concentrated brine stream reaches a relatively high density (e.g., at least about 10 pounds per gallon) and/or a relatively high salinity (e.g., a total dissolved salt concentration of at least about 25 wt %). In certain embodiments, additional salt is added to the concentrated brine stream to produce an ultra-high-density brine stream (e.g., a brine stream having a density of at least about 11.7 pounds per gallon). Some aspects relate to a system that is configured to promote energy efficiency by recovering heat from the recirculated concentrated brine stream upon discharge from the fluidic circuit.

21 Claims, 13 Drawing Sheets

(56) References Cited

U.S. PATENT DOCUMENTS

| | | | | |
|---|---|---|---|---|
| 7,316,080 | B1 | 1/2008 | Woolsey | |
| 7,832,714 | B2 | 11/2010 | Duesel et al. | |
| 7,950,921 | B1 | 5/2011 | Woolsey | |
| 8,119,007 | B2 | 2/2012 | Bajpayee et al. | |
| 8,252,092 | B2 | 8/2012 | Govindan et al. | |
| 8,292,272 | B2 | 10/2012 | Elsharqawy et al. | |
| 8,366,924 | B2 | 2/2013 | Vuong | |
| 8,465,006 | B2 | 6/2013 | Elsharqawy et al. | |
| 8,496,234 | B1 | 7/2013 | Govindan et al. | |
| 8,501,007 | B2 | 8/2013 | Bajpayee et al. | |
| 8,523,985 | B2 | 9/2013 | Govindan et al. | |
| 8,647,477 | B2 | 2/2014 | Govindan et al. | |
| 8,778,065 | B2 | 7/2014 | Govindan et al. | |
| 8,794,320 | B2 | 8/2014 | Ayirala et al. | |
| 8,840,792 | B2 | 9/2014 | Wohlert | |
| 9,072,984 | B2 | 7/2015 | Govindan et al. | |
| 9,079,117 | B2 | 7/2015 | Govindan et al. | |
| 9,120,033 | B2 | 9/2015 | Govindan et al. | |
| 9,221,694 | B1 | 12/2015 | Govindan et al. | |
| 9,266,747 | B1 | 2/2016 | Sparrow et al. | |
| 9,266,748 | B1 | 2/2016 | Govindan et al. | |
| 9,416,800 | B2 | 8/2016 | Govindan et al. | |
| 9,428,404 | B2 | 8/2016 | Bajpayee et al. | |
| 9,550,685 | B2 | 1/2017 | Klausner et al. | |
| 9,579,590 | B2 | 2/2017 | Govindan et al. | |
| 9,617,169 | B2 * | 4/2017 | Govindan ................ | B01D 3/16 |
| 9,643,102 | B2 | 5/2017 | Al-Sulaiman et al. | |
| 2002/0166758 | A1 | 11/2002 | Vinz | |
| 2005/0033585 | A1 | 2/2005 | Shields | |
| 2005/0121304 | A1 | 6/2005 | Beckman | |
| 2005/0126175 | A1 | 6/2005 | Badgley | |
| 2005/0230238 | A1 | 10/2005 | Klausner et al. | |
| 2006/0157409 | A1 | 7/2006 | Hassan | |
| 2008/0083605 | A1 | 4/2008 | Holtzapple et al. | |
| 2008/0105534 | A1 | 5/2008 | Taylor et al. | |
| 2009/0173096 | A1 | 7/2009 | Wohlert | |
| 2009/0184065 | A1 | 7/2009 | Cremer et al. | |
| 2010/0032377 | A1 | 2/2010 | Wohlert | |
| 2010/0314238 | A1 | 12/2010 | Frolov et al. | |
| 2011/0056822 | A1 | 3/2011 | Elsharqawy et al. | |
| 2011/0079504 | A1 | 4/2011 | Govindan et al. | |
| 2011/0120157 | A1 | 5/2011 | Wohlert | |
| 2012/0012005 | A1 | 1/2012 | Burke | |
| 2012/0145635 | A1 | 6/2012 | Lucas, III et al. | |
| 2012/0159203 | A1 | 6/2012 | Gervais et al. | |
| 2012/0205236 | A1 | 8/2012 | Govindan et al. | |
| 2013/0074694 | A1 | 3/2013 | Govindan et al. | |
| 2013/0118887 | A1 | 5/2013 | Frovlov et al. | |
| 2014/0014212 | A1 | 1/2014 | Govindan et al. | |
| 2014/0021135 | A1 | 1/2014 | Sawyer et al. | |
| 2014/0061022 | A1 | 3/2014 | Passarelli | |
| 2014/0061958 | A1 | 3/2014 | Sparrow et al. | |
| 2014/0197022 | A1 | 7/2014 | Antar et al. | |
| 2014/0291137 | A1 | 10/2014 | Barton et al. | |
| 2014/0367871 | A1 | 12/2014 | Govindan et al. | |
| 2015/0060286 | A1 | 3/2015 | Govindan et al. | |
| 2015/0083577 | A1 | 3/2015 | Govindan et al. | |
| 2015/0107840 | A1 | 4/2015 | Ligthelm et al. | |
| 2015/0129410 | A1 | 5/2015 | Govindan et al. | |
| 2015/0130093 | A1 | 5/2015 | Govindan et al. | |
| 2015/0166362 | A1 | 6/2015 | Govindan et al. | |
| 2015/0353377 | A1 | 12/2015 | Al-Sulaiman et al. | |
| 2016/0228795 | A1 | 8/2016 | St. John et al. | |
| 2016/0229705 | A1 | 8/2016 | St. John et al. | |
| 2016/0229714 | A1 | 8/2016 | Thiel et al. | |
| 2016/0244349 | A1 | 8/2016 | St John et al. | |
| 2016/0339354 | A1 | 11/2016 | Govindan et al. | |
| 2016/0339356 | A1 | 11/2016 | Govindan et al. | |
| 2016/0339357 | A1 | 11/2016 | Govindan et al. | |
| 2017/0113947 | A1 | 4/2017 | Govindan et al. | |
| 2017/0152156 | A1 | 6/2017 | Al-Qutub et al. | |

FOREIGN PATENT DOCUMENTS

| | | | |
|---|---|---|---|
| EP | 0 253 287 | B1 | 9/1992 |
| EP | 1 443 025 | A1 | 8/2004 |
| FR | 2 281 896 | A1 | 3/1976 |
| FR | 2 713 219 | A1 | 6/1995 |
| FR | 2 786 708 | A1 | 6/2000 |
| GB | 780 272 | A | 7/1957 |
| GB | 1 241 174 | A | 7/1971 |
| GB | 1 265 188 | A | 3/1972 |
| WO | WO 01/07134 | A1 | 2/2001 |
| WO | WO 01/14256 | A1 | 3/2001 |
| WO | WO 02/32813 | A1 | 4/2002 |
| WO | WO 2004/026767 | A2 | 4/2004 |
| WO | WO 2004/067451 | A1 | 8/2004 |
| WO | WO 2005/033585 | | 4/2005 |
| WO | WO 2005/100252 | A1 | 10/2005 |
| WO | WO 2007/132477 | | 11/2007 |
| WO | WO 2011/043945 | A1 | 4/2011 |
| WO | WO 2012/159203 | | 11/2012 |
| WO | WO 2013/158315 | | 10/2013 |
| WO | WO 2014/200829 | | 12/2014 |
| WO | WO 2015/061194 | A1 | 4/2015 |
| WO | WO 2016/003913 | | 1/2016 |
| WO | WO 2017/030941 | A1 | 2/2017 |

OTHER PUBLICATIONS

Kronenberg et al., Low-temperature distillation processes in single- and dual-purpose plants. Desalintation. 2001;136:189-97.

Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

McGinnis et al., Pilot demonstration of the NH3/CO2 forward osmosis desalination process on high salinity brines. Desalination. Mar. 2013;312:67-74. Supporting information included.

Nawayseh et al., Solar desalination based on humidification process—I. Evaluating the heat and mass transfer coefficeints. Energy Conversion and Management. Sep. 1999;40(13):1423-39.

Nawayseh et al., Solar desalination based on humidification process—II. Computer Simulation. Energy Conversion and Management. Sep. 1999;40(13):1441-61.

U.S. Appl. No. 14/719,239, filed May 21, 2015, Govindan et al.

U.S. Appl. No. 14/718,510, filed May 21, 2015, Govindan et al.

U.S. Appl. No. 15/161,051, filed May 20, 2016, Lam et al.

PCT/US16/33632, Nov. 14, 2016, International Search Report and Written Opinion.

Office Action dated Nov. 8, 2017 for U.S. Appl. No. 14/719,239 and pending claims.

* cited by examiner

PRODUCTION OF ULTRA-HIGH-DENSITY BRINES USING TRANSIENTLY-OPERATED DESALINATION SYSTEMS

RELATED APPLICATIONS

This application is a continuation of U.S. patent application Ser. No. 14/992,244, filed Jan. 11, 2016, and entitled "Transiently-Operated Desalination Systems with Heat Recovery and Associated Methods," which is a continuation of U.S. patent application Ser. No. 14/719,189, filed May 21, 2015, entitled "Transiently-Operated Desalination Systems with Heat Recovery and Associated Methods," and issued as U.S. Pat. No. 9,266,748 on Feb. 23, 2016, both of which are incorporated herein by reference in their entireties for all purposes.

TECHNICAL FIELD

Systems and methods related to the desalination of aqueous streams comprising at least one salt and the production of saturated brines are generally described.

BACKGROUND

Desalination is a process by which an amount of at least one salt is removed from an aqueous stream. For example, seawater, brackish water, flowback water, industrial wastewater, and/or water produced from oil and gas extraction processes can be desalinated to produce fresh water suitable for human consumption, irrigation, and/or industrial use.

As the world's population has expanded, the demand for fresh water has increased. Desalination may play a role in satisfying this increased demand. In addition, desalination may play a role in recycling wastewater that has been produced by various human processes (e.g., industrial processes, oil and gas extraction processes), thereby mitigating the need to dispose of such wastewater. Accordingly, improved desalination systems and methods are desirable.

SUMMARY

Systems and methods related to the desalination of aqueous streams comprising at least one salt and the production of saturated brines are generally described. The subject matter of the present invention involves, in some cases, interrelated products, alternative solutions to a particular problem, and/or a plurality of different uses of one or more systems and/or articles.

Certain aspects relate to a method for producing a concentrated brine stream. In some embodiments, the method comprises supplying a first liquid stream comprising water and at least one dissolved salt at an initial concentration to a fluidic circuit. The fluidic circuit may, in some cases, comprise a humidifier, which may remove at least a portion of the water from the first liquid stream to produce a first concentrated brine stream comprising water and the at least one dissolved salt at a second concentration higher than the initial concentration of the first liquid stream. In certain embodiments, the method further comprises recirculating the first concentrated brine stream through the fluidic circuit to remove at least a portion of the water from the first concentrated brine stream, forming a recirculated first concentrated brine stream comprising water and the at least one dissolved salt at a third concentration higher than the second concentration of the first concentrated brine stream. In some embodiments, the method comprises discharging the recirculated first concentrated brine stream from the fluidic circuit when the recirculated first concentrated brine stream reaches a density of at least about 10 pounds per gallon.

In certain embodiments, the method comprises supplying a first liquid stream comprising water and at least one dissolved salt at an initial concentration to a fluidic circuit comprising a humidifier, wherein the humidifier removes at least a portion of the water from the first liquid stream to produce a first concentrated brine stream comprising water and the at least one dissolved salt at a second concentration higher than the initial concentration of the first liquid stream. In some cases, the method further comprises recirculating the first concentrated brine stream through the fluidic circuit to remove at least a portion of the water from the first concentrated brine stream, forming a recirculated first concentrated brine stream comprising water and the at least one dissolved salt at a third concentration higher than the second concentration of the first concentrated brine stream. In certain cases, the method comprises discharging the recirculated first concentrated brine stream from the fluidic circuit when the salinity reaches at least about 25%.

According to some embodiments, the method comprises supplying a first liquid stream comprising water and a dissolved salt at an initial concentration to a fluidic circuit comprising a humidifier, wherein the humidifier removes at least a portion of the water from the first liquid stream to produce a first concentrated brine stream comprising water and the dissolved salt at a second concentration higher than the initial concentration of the first liquid stream. In some cases, the method further comprises recirculating the first concentrated brine stream through the fluidic circuit to remove at least a portion of the water from the first concentrated brine stream, forming a recirculated first concentrated brine stream comprising water and the dissolved salt at a third concentration higher than the second concentration of the first concentrated brine stream. In certain embodiments, the method further comprises discharging the recirculated first concentrated brine stream from the fluidic circuit when the recirculated first concentrated brine stream reaches a density of at least about 10 pounds per gallon, wherein discharging the recirculated first concentrated brine stream comprises flowing the recirculated first concentrated brine stream through a first portion of a heat exchanger. In some embodiments, the method further comprises supplying a second liquid stream comprising water and a dissolved salt at an initial concentration to the fluidic circuit comprising the humidifier, wherein supplying the second liquid stream comprises flowing the second liquid stream through a second portion of the heat exchanger, wherein heat is transferred from the recirculated first concentrated brine stream to the second liquid stream in the heat exchanger, and wherein the humidifier removes at least a portion of the water from the second liquid stream to produce a second concentrated brine stream comprising water and the dissolved salt at a second concentration higher than the initial concentration of the second liquid stream. According to certain embodiments, the method further comprises recirculating the second concentrated brine stream through the fluidic circuit to remove at least a portion of the water from the second concentrated brine stream, forming a recirculated second concentrated brine stream comprising water and the dissolved salt at a third concentration higher than the second concentration of the second concentrated brine stream. In some cases, the method further comprises discharging the recirculated second concentrated brine stream from the fluidic circuit when the recirculated second concentrated brine stream reaches a density of at least about 10 pounds per gallon.

In certain embodiments, the method comprises supplying a first liquid stream comprising water and a dissolved salt at an initial concentration to a feed tank. In some embodiments, the method further comprises flowing the first liquid stream from the feed tank to a fluidic circuit comprising a humidifier, wherein the humidifier removes at least a portion of the water from the first liquid stream to produce a first concentrated brine stream comprising water and the dissolved salt at a second concentration higher than the initial concentration of the first liquid stream. In some cases, the method further comprises recirculating the first concentrated brine stream through the fluidic circuit to remove at least a portion of the water from the first concentrated brine stream, forming a recirculated first concentrated brine stream comprising water and the dissolved salt at a third concentration higher than the second concentration of the first concentrated brine stream. In certain embodiments, the method further comprises discharging the recirculated first concentrated brine stream from the fluidic circuit when the recirculated first concentrated brine stream reaches a density of at least about 10 pounds per gallon, wherein discharging the recirculated first concentrated brine stream comprises flowing the recirculated first concentrated brine stream through a first portion of a heat exchanger to a concentrated brine tank. In some embodiments, the method further comprises supplying a second liquid stream comprising water and a dissolved salt at an initial concentration to the feed tank, wherein supplying the second liquid stream comprises flowing the second liquid stream through a second portion of the heat exchanger, wherein heat is transferred from the recirculated first concentrated brine stream to the second liquid stream in the heat exchanger. In certain embodiments, the method further comprises flowing the second liquid stream from the feed tank to the fluidic circuit comprising the humidifier, wherein the humidifier removes at least a portion of the water from the second liquid stream to produce a second concentrated brine stream comprising water and the dissolved salt at a second concentration higher than the initial concentration of the second liquid stream. In some embodiments, the method further comprises recirculating the second concentrated brine stream through the fluidic circuit to remove at least a portion of the water from the second concentrated brine stream, forming a recirculated second concentrated brine stream comprising water and the dissolved salt at a third concentration higher than the second concentration of the second concentrated brine stream. In some embodiments, the method further comprises discharging the recirculated second concentrated brine stream from the fluidic circuit when the recirculated second concentrated brine stream reaches a density of at least about 10 pounds per gallon, wherein discharging the recirculated second concentrated brine stream comprises flowing the recirculated second concentrated brine stream through the first portion of the heat exchanger to the concentrated brine tank. In certain embodiments, the method further comprises flowing a first volume of liquid from the concentrated brine tank to the first portion of the heat exchanger while flowing a second volume of liquid from the feed tank to the second portion of the heat exchanger, wherein heat is transferred from the first volume of liquid to the second volume of liquid.

Some aspects relate to a system for producing a concentrated brine stream. In some embodiments, the system comprises a first tank; a second tank; a heat exchanger fluidly connected to the first tank and the second tank; and a desalination system fluidly connected to the first tank and the second tank. In certain cases, the desalination system is configured to receive a feed stream comprising water and at least one dissolved salt and produce a water-containing stream lean in the at least one dissolved salt relative to the feed stream and a concentrated saline stream enriched in the at least one dissolved salt relative to the feed stream.

Certain aspects relate to a method for producing a concentrated brine stream. In some embodiments, the method comprises supplying a liquid stream comprising water and a dissolved salt at an initial concentration to a fluidic circuit comprising a humidifier, wherein the humidifier removes at least a portion of the water from the liquid stream to produce a concentrated brine stream comprising water and the dissolved salt at a second concentration higher than the initial concentration of the liquid stream. In some embodiments, the method further comprises recirculating the concentrated brine stream through the fluidic circuit to remove at least a portion of the water from the concentrated brine stream, forming a recirculated concentrated brine stream comprising water and the dissolved salt at a third concentration higher than the second concentration of the concentrated brine stream. In certain cases, the method further comprises discharging the recirculated concentrated brine stream from the fluidic circuit when the recirculated concentrated brine stream reaches a density of at least about 10 pounds per gallon. In certain embodiments, the method further comprises adding additional salt to the recirculated concentrated brine stream until the recirculated concentrated brine stream reaches a density of at least about 11.7 pounds per gallon.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
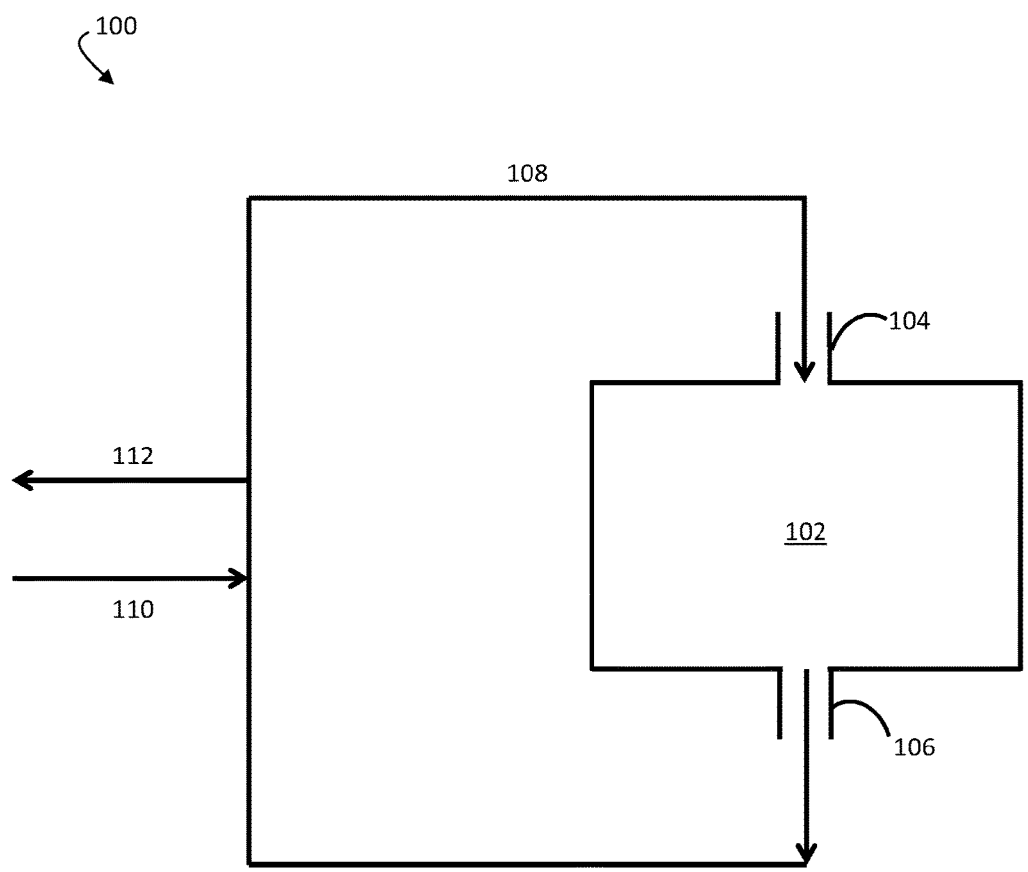
FIG. 1A shows a schematic flow diagram of an exemplary system for producing a concentrated brine stream comprising a humidifier, according to some embodiments.

Systems and methods related to desalination systems, including transiently-operated desalination systems, are described herein. According to some embodiments, a liquid stream comprising water and at least one dissolved salt is circulated through a desalination system. In some embodiments, a portion of the desalination system (e.g., a humidifier) is configured to remove at least a portion of the water from the liquid stream to produce a concentrated brine stream enriched in the dissolved salt relative to the liquid stream. In certain cases, the concentrated brine stream is recirculated through the desalination system (e.g. through a fluidic circuit passing through a humidifier of the desalination system) until the recirculated concentrated brine stream reaches a relatively high density (e.g., at least about 10 pounds per gallon) and/or a relatively high salinity (e.g., a total dissolved salt concentration of at least about 25 wt %). In certain embodiments, one or more additional salts are added to the recirculated concentrated brine stream to produce an ultra-high-density concentrated brine stream (e.g., a brine stream having a density of at least about 11.7 pounds per gallon). Some aspects relate to a system that is configured to promote energy efficiency by recovering heat from the recirculated concentrated brine stream, e.g. upon or after discharge from a humidifier of the desalination system.

As used herein, a transiently-operated desalination system refers to a desalination system in which a liquid stream is recirculated through the desalination system until a certain condition is met (e.g., until the liquid stream reaches a certain density and/or salinity). Upon satisfaction of the condition, the liquid stream may be discharged from the desalination system. In contrast, a continuously-operated desalination system generally refers to a desalination system in which a liquid stream is fed to the desalination system, desalinated, and subsequently discharged from the desalination system without being recirculated.

It has been discovered within the context of this invention that a transiently-operated desalination system may be particularly well-suited for producing a concentrated brine stream (e.g., a brine stream having a relatively high density and/or salinity). In some cases, it may be advantageous for a desalination system to produce concentrated brine, as the concentrated brine may be a highly desirable product that can be used in a variety of applications. For example, concentrated brine can be used in the oil and gas industry as a kill fluid (e.g., a high-density fluid placed in a wellbore to stop the flow of reservoir fluids) and/or as a drilling fluid (e.g., a fluid that assists in drilling a wellbore). In addition, concentrated brine can be used in the production of chemicals, textiles, and/or leather. In some cases, concentrated brine solutions can be used to de-ice roads, as such solutions may be capable of de-icing a road faster than a solid salt.

In addition, it may be advantageous for a desalination system to produce concentrated brine not only because the concentrated brine is a valuable product, but because it avoids the need to dispose of the concentrated brine as a liquid waste stream. In some cases, disposal of liquid waste streams may be expensive and/or complicated. For example, one method of disposing of a liquid waste stream in an oilfield is deep well injection. Deep well injection sites often are expensive to drill, heavily taxed and regulated, and/or of limited capacity. Accordingly, in some cases it may be desirable to avoid the need to dispose of liquid waste streams or reduce the volume of such liquid waste streams requiring disposal.

Continuously-operated desalination systems described in the prior art may be less suitable for producing concentrated brine or may be unable to produce concentrated brine without undesirable complications. For example, because concentrated brine solutions are generally near, at, or above the saturation limit, production of concentrated brine often results in the formation of salt crystals. The formation of salt crystals in a desalination system may be deleterious, as the salt crystals may clog pumps, instruments, valves, and/or separation surfaces of the desalination system.

However, it has been discovered that a transiently-operated desalination system may be capable of producing concentrated brine while eliminating or reducing at least some such complications. In a transiently-operated desalination system, the concentration of one or more salts in a liquid stream circulating through the desalination system generally varies over time. In some cases, the amount of time that a liquid stream having a relatively high concentration of one or more salts spends in a transiently-operated desalination system (e.g., residence time) is less than the amount of time that an equivalent liquid stream would spend in a continuously-operated desalination system seeking to produce concentrated brine. In certain embodiments, a liquid stream flowing through a transiently-operated desalination system may have a relatively high flow velocity, which may inhibit formation of salt crystals. Accordingly, the probability of forming salt crystals within a desalination system may be reduced in a transiently-operated desalination system compared to a continuously-operated desalination system. In addition, in some transiently-operated desalination systems of the invention, fouling of the desalination system by salt crystal formation may be avoided by following a period of high salinity operation with a period of low salinity operation. In some such transiently-operated desalination systems, salt crystals that form during a period of high salinity operation may be dissolved during a period of low salinity operation.

In some cases, transient operation of a desalination system to produce a concentrated brine stream may be associated with further advantages. For example, a transiently-operated desalination system may have flexibility to produce a concentrated brine stream from a variety of types of feed streams. In the oil and gas industry, for example, one type of feed stream that may be encountered is produced water (e.g., water that emerges from oil or gas wells along with the oil or gas). Due to the length of time produced water has spent in the ground, and due to high subterranean pressures and temperatures that may increase the solubility of certain salts and minerals, produced water often comprises relatively high concentrations of dissolved salts and minerals. For example, some produced water streams may comprise a supersaturated solution of dissolved strontium sulfate ($SrSO_4$). In contrast, another type of feed stream that may be encountered in the oil and gas industry is flowback water (e.g., water that is injected as a fracking fluid during hydraulic fracturing operations and subsequently recovered). Flowback water often comprises a variety of constituents used in fracking, including surfactants, proppants, and viscosity reducing agents, but often has a lower salinity than produced water. In some cases, a transiently-operated desalination system advantageously has the flexibility to produce concentrated brine from feed streams having different salinities. For example, in a transiently-operated desalination stream, a feed stream may be concentrated via successive passes through the desalination system until a certain condition is met, regardless of the initial salinity of the feed stream.

An exemplary schematic diagram of a desalination system configured to be transiently operated to produce a concentrated brine stream is shown in FIG. 1A. In FIG. 1A, system 100 for producing a concentrated brine stream comprises a fluidic circuit (102, 104, 106, 108) comprising a humidifier 102, which may be configured to remove at least a portion of water from a liquid stream comprising water and at least one dissolved salt at an initial concentration to produce a concentrated brine stream enriched in the at least one dissolved salt. In some embodiments, humidifier 102 is part of a desalination system (e.g., a humidification-dehumidification (HDH) desalination system). Accordingly, in certain embodiments, humidifier 102 is fluidly connected to a dehumidifier (not shown in FIG. 1A), which may be configured to produce a stream comprising substantially pure water. As shown in FIG. 1A, humidifier 102 is fluidly connected to conduit 108 via humidifier inlet 104 and humidifier outlet 106. Conduit 108 is also fluidly connected to inlet 110 and outlet 112. In some embodiments, inlet 110 is fluidly connected to a source of a liquid comprising water and at least one dissolved salt (not shown in FIG. 1A).

In operation, a liquid stream comprising water and at least one dissolved salt may enter system 100 through inlet 110. The liquid stream may flow through conduit 108 and enter humidifier 102 through humidifier inlet 104. In humidifier 102, at least a portion of the water may be removed from the liquid stream to produce a concentrated brine stream. The concentrated brine stream may then exit humidifier 102 through humidifier outlet 106 and be recirculated through the fluidic circuit (e.g. via conduit 108 back to humidifier inlet 104). The recirculated concentrated brine stream may continue to recirculate through the fluidic circuit of system 100 until a certain condition is met (e.g., until a certain density or salinity is reached). Upon satisfaction of the condition, the recirculated concentrated brine stream may be discharged from the fluidic circuit through outlet 112.

Figure 1B:
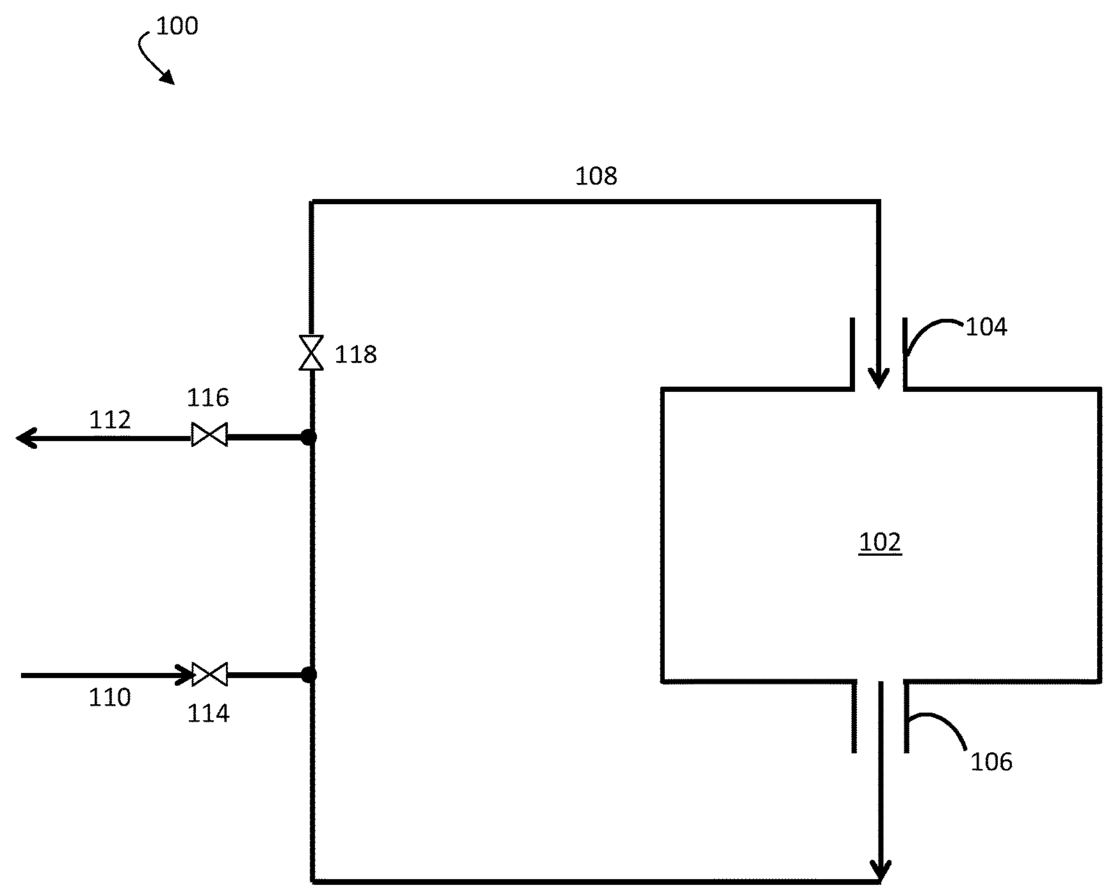
FIG. 1B shows a schematic flow diagram of an exemplary system for producing a concentrated brine stream comprising a humidifier, a conduit, and a plurality of valves, according to some embodiments.

In some embodiments, system 100 further comprises a plurality of optional valves to regulate flow through the system. For example, as shown in FIG. 1B, optional inlet valve 114 is positioned after inlet 110, optional discharge valve 116 is positioned before outlet 112, and optional recirculation valve 118 is positioned along conduit 108. In operation, inlet valve 114 and recirculation valve 118 may initially be open and discharge valve 116 may initially be closed, and a liquid stream comprising water and at least one dissolved salt may enter the fluidic circuit through inlet 110. After the liquid stream has entered the fluidic circuit, inlet valve 114 may be closed. The liquid stream may then flow through conduit 108 and enter humidifier 102 through humidifier inlet 104. At least a portion of the water may be removed from the liquid stream to produce a concentrated brine stream in humidifier 102, and the concentrated brine stream may exit humidifier 102 through humidifier outlet 106. The concentrated brine stream may subsequently be recirculated through the fluidic circuit until a certain condition is satisfied. Upon satisfaction of the condition, discharge valve 116 may be opened and recirculation valve 118 may be closed, and the recirculated concentrated brine stream may be discharged from the fluidic circuit through outlet 112.

Figure 1C:
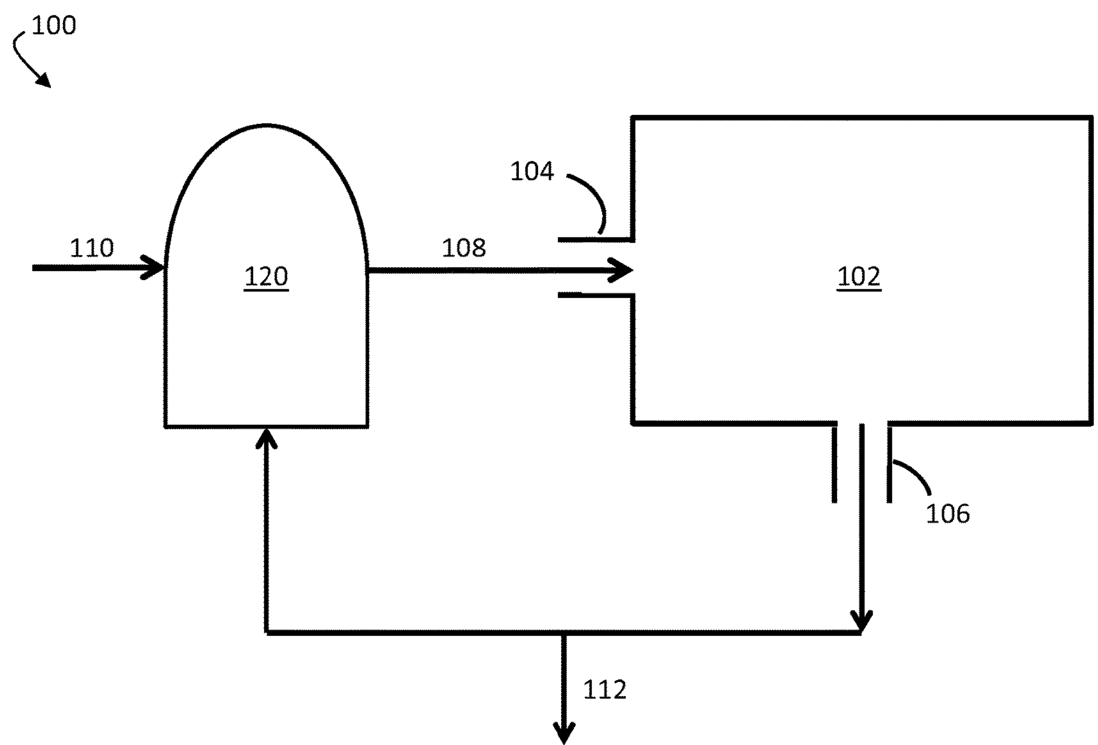
FIG. 1C shows a schematic flow diagram of an exemplary system for producing a concentrated brine stream comprising a feed tank and a humidifier, according to some embodiments.

According to some embodiments, system 100 further comprises an optional feed tank. For example, FIG. 1C shows an exemplary schematic illustration of system 100 comprising feed tank 120 and humidifier 102. As shown in FIG. 1C, feed tank 120 is fluidly connected to inlet 110, which may be in fluid communication with a source of a liquid comprising water and at least one dissolved salt (not shown in FIG. 1C). Feed tank 120 is also fluidly connected to humidifier inlet 104 and humidifier outlet 106 through conduit 108.

In operation, a liquid stream comprising water and at least one dissolved salt may enter feed tank 120 through inlet 110. The liquid stream may then flow through conduit 108 from feed tank 120 to humidifier inlet 104. In humidifier 102, an amount of water may be removed from the liquid stream to produce a concentrated brine stream. The concentrated brine stream may exit humidifier 102 through humidifier outlet 106 and may be returned to feed tank 120 through conduit 108. In some embodiments, an additional amount of the liquid comprising water and at least one dissolved salt may be added to feed tank 120 through inlet 110. In certain embodiments, the additional amount of liquid may be added to maintain a constant volume of liquid circulating through feed tank 120. In some cases, the additional amount of liquid may prevent cavitation at the inlet of a pump (not shown in FIG. 1C) configured to pump liquid from feed tank 120 to humidifier 102. The concentrated brine stream, along with the added amount of liquid, may be recirculated through the fluidic circuit (120, 108, 104, 102, 106) of system 100 until a certain condition is met. Upon satisfaction of the condition, the recirculated concentrated brine stream may be discharged from the fluidic circuit through outlet 112.

Figure 1D:
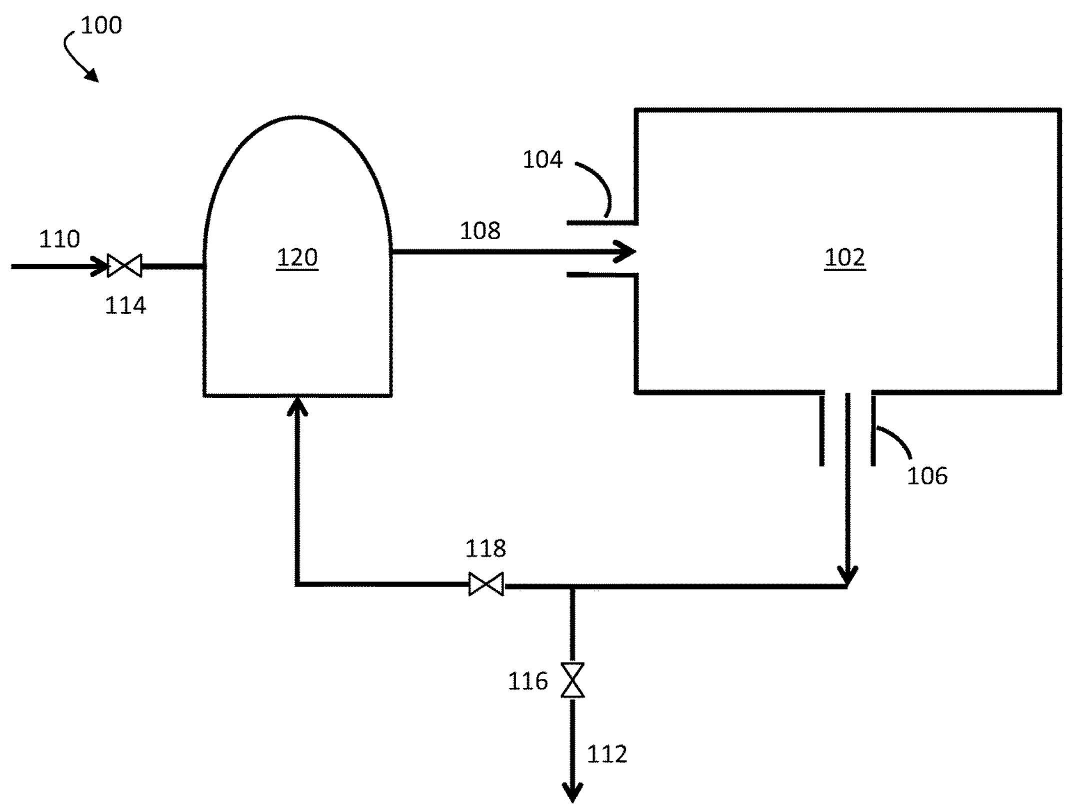
FIG. 1D shows a schematic flow diagram of an exemplary system for producing a concentrated brine stream comprising a feed tank, a humidifier, a conduit, and a plurality of valves, according to some embodiments.

In some embodiments, the system further comprises an optional feed tank and a plurality of optional valves to regulate flow through the fluidic circuit. For example, in FIG. 1D, optional inlet valve 114 is positioned after inlet 110, which is fluidly connected to optional feed tank 120. Optional feed tank 120 is also fluidly connected to humidifier 102 through conduit 108. Optional recirculation valve 118 is positioned along conduit 108. Optional discharge valve 116 is positioned before outlet 112, which is in fluid communication with conduit 108.

In operation, feed tank 120 may initially be filled with a liquid stream comprising water and at least one dissolved salt. Recirculation valve 118 may initially be open, and inlet valve 114 and discharge valve 116 may initially be closed. The liquid stream may flow through conduit 108 from feed tank 120 to humidifier 102, where at least a portion of the water may be removed from the liquid stream to produce a concentrated brine stream. The concentrated brine stream may exit humidifier 102 and return to feed tank 120 via conduit 108. In some embodiments, inlet valve 114 may be opened, and an additional amount of liquid comprising water and at least one dissolved salt may be added to feed tank 120. Inlet valve 114 may then be closed. The concentrated brine stream may then be recirculated through the fluidic circuit (120, 108, 104, 102, 106) of system 100 until a certain condition is met. When the condition is satisfied, recirculation valve 118 may be closed, and discharge valve 116 may be opened. The recirculated concentrated brine stream may then be discharged from the fluidic circuit. Inlet valve 114 may then be opened, and feed tank 120 may be filled with a second liquid stream comprising water and at least one dissolved salt.

The liquid stream comprising water and at least one dissolved salt fed to the system for producing a concentrated brine stream can originate from a variety of sources. For example, in certain embodiments, at least a portion of the liquid stream that enters a fluidic circuit comprising at least a portion of a desalination system comprises and/or is derived from seawater, produced water, flowback water, ground water, brackish water, and/or wastewater (e.g., industrial wastewater). Non-limiting examples of wastewater include textile mill wastewater, leather tannery wastewater, paper mill wastewater, cooling tower blowdown water, flue gas desulfurization wastewater, landfill leachate water, and/or the effluent of a chemical process (e.g., the effluent of another desalination system and/or a chemical process). As described in further detail herein, at least a portion of the liquid stream may be pretreated to remove at least a portion of one or more components (e.g., a scaling ion, a water-immiscible material, a suspended solid, and/or a volatile organic material).

According to some embodiments, the liquid stream fed to the system for producing a concentrated brine stream comprises water and at least one dissolved salt at an initial concentration. A dissolved salt generally refers to a salt that has been solubilized to such an extent that the component ions of the salt are no longer ionically bonded to each other. In certain embodiments, at least one dissolved salt in the liquid stream is a monovalent salt. As used herein, the term "monovalent salt" refers to a salt that includes a monovalent cation (e.g., a cation with a redox state of +1 when solubilized). Examples of monovalent salts include, but are not limited to, salts containing sodium, potassium, lithium, rubidium, cesium, and francium. In certain embodiments, the monovalent salts include monovalent anions comprising, for example, chlorine, bromine, fluorine, and iodine. Non-limiting examples of monovalent salts include sodium chloride (NaCl), sodium bromide (NaBr), potassium chloride (KCl), potassium bromide (KBr), sodium carbonate, ($Na_2CO_3$), and sodium sulfate ($Na_2SO_4$). In some cases, at least one salt is a divalent salt. As used herein, the term "divalent salt" refers to a salt that includes a divalent cation (e.g., a cation with a redox state of +2 when solubilized). Non-limiting examples of divalent salts include calcium chloride ($CaCl_2$), calcium sulfate ($CaSO_4$), magnesium sulfate ($MgSO_4$), strontium sulfate ($SrSO_4$), barium sulfate ($BaSO_4$), and barium-strontium sulfate ($BaSr(SO_4)_2$). In some cases, at least one salt in the liquid stream is a trivalent salt (e.g., a salt that includes a trivalent cation having a redox state of +3 when solubilized) or a tetravalent salt (e.g., a salt that includes a tetravalent cation having a redox state of +4 when solubilized). Non-limiting examples of trivalent salts or tetravalent salts that may be present in certain liquid streams include iron (III) hydroxide ($Fe(OH)_3$), iron (III) carbonate ($Fe_2(CO_3)_3$), aluminum hydroxide ($Al(OH)_3$), aluminum carbonate ($Al_2(CO_3)_3$), boron salts, and/or silicates.

The liquid stream fed to the system for producing a concentrated brine stream may have any initial salinity. As used herein, the salinity of a liquid stream refers to the weight percent (wt %) of all dissolved salts in the liquid stream. In some embodiments, the liquid stream has a salinity of at least about 1%, at least about 5%, at least about 10%, at least about 15%, at least about 20%, at least about 25%, at least about 26%, at least about 27%, at least about 28%, at least about 29%, or at least about 30% (and/or, in certain embodiments, up to the solubility limit of the dissolved salt(s) in the liquid stream). In some embodiments, the liquid stream has a salinity of about 30% or less, about 29% or less, about 28% or less, about 27% or less, about 26% or less, about 25% or less, about 20% or less, about 15% or less, about 10% or less, about 5% or less, or about 1% or less. Combinations of the above-noted ranges are also possible. For example, in some embodiments, the liquid stream may have a salinity in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %. Salinity may be measured according to any method known in the art. For example, a non-limiting example of a suitable method for measuring salinity is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The salinity of the sample may be obtained by dividing the mass of the total dissolved solids by the mass of the original sample and multiplying the resultant number by 100.

According to some embodiments, the initial concentration of at least one dissolved salt (e.g., NaCl) in the liquid stream fed to the system for producing a concentrated brine stream is relatively high. In some embodiments, the initial concentration of at least one dissolved salt (e.g., NaCl) in the liquid stream fed to the system for producing a concentrated brine stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, or at least about 100,000 mg/L, at least about 102,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 219,000 mg/L, at least about 220,000 mg/L, at least about 250,000 mg/L, at least about 275,000 mg/L, at least about 300,000 mg/L, at least about 310,000 mg/L, at least about 312,000 mg/L, at least about 320,000 mg/L, at least about 350,000 mg/L, or at least about 375,000 mg/L (and/or, in certain embodiments, up to the solubility limit of the salt in the liquid stream). In some embodiments, the initial concentration of at least one dissolved salt in the liquid stream is in the range of about 100 mg/L to about 375,000 mg/L, about 1,000 mg/L to about 10,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 375,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 375,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 375,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 375,000 mg/L, about 102,000 mg/L to about 219,000 mg/L, about 102,000 mg/L to about 312,000 mg/L, about 150,000 mg/L to about 200,000 mg/L, about 150,000 mg/L to about 250,000 mg/L, about 150,000 mg/L to about 300,000 mg/L, about 150,000 mg/L to about 350,000 mg/L, about 150,000 mg/L to about 375,000 mg/L, about 200,000 mg/L to about 250,000 mg/L, about 200,000 mg/L to about 300,000 mg/L, about 200,000 mg/L to about 350,000 mg/L, about 200,000 mg/L to about 375,000 mg/L, about 250,000 mg/L to about 300,000 mg/L, about 250,000 mg/L to about 350,000 mg/L, about 250,000 mg/L to about 375,000 mg/L, about 300,000 mg/L to about 350,000 mg/L, or about 300,000 mg/L to about 375,000 mg/L. The concentration of a dissolved salt generally refers to the combined concentrations of the cation and anion of the salt. For example, the concentration of dissolved NaCl would refer to the sum of the concentration of sodium ions ($Na^+$) and the concentration of chloride ions ($Cl^-$). The concentration of a dissolved salt may be measured according to any method known in the art. For example, suitable methods for measuring the concentration of a dissolved salt include inductively coupled plasma (ICP) spectroscopy (e.g., inductively coupled plasma optical emission spectroscopy). As one non-limiting example, an Optima 8300 ICP-OES spectrometer may be used.

In some embodiments, the liquid stream fed to the system for producing a concentrated brine stream comprises at least one dissolved salt (e.g., NaCl) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the salt in the liquid stream). In some embodiments, the liquid stream fed to the system for producing a concentrated brine stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the initial total dissolved salt concentration of the liquid stream fed to the system for producing a concentrated brine stream may be relatively high. The total dissolved salt concentration generally refers to the combined concentrations of all the cations and anions of dissolved salts (e.g., monovalent, divalent, trivalent, and/or tetravalent salts) present in the liquid stream. As a simple, non-limiting example, in a water stream comprising dissolved NaCl and dissolved $MgSO_4$, the total dissolved salt concentration would refer to the total concentrations of the $Na^+$, $Cl^-$, $Mg^{2+}$, and $SO_4^{2-}$ ions. In certain cases, the initial total dissolved salt concentration of the liquid stream fed to the system for producing a concentrated brine stream is at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 220,000 mg/L, at least about 250,000 mg/L, at least about 275,000 mg/L, at least about 300,000 mg/L, at least about 310,000 mg/L, at least about 320,000 mg/L, at least about 350,000 mg/L, at least about 375,000 mg/L, at least about 400,000 mg/L, at least about 450,000 mg/L, or at least about 500,000 mg/L (and/or, in certain embodiments, up to the solubility limit of the dissolved salt(s) in the liquid stream). In some embodiments, the initial total dissolved salt concentration of the liquid stream is in the range of about 1,000 mg/L to about 10,000 mg/L, about 1,000 mg/L to about 20,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 75,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L. Total dissolved salt concentration may be measured according to any method known in the art. For example, a non-limiting example of a suitable method for measuring total dissolved salt concentration is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The total dissolved salt concentration of the sample may be obtained by dividing the mass of the total dissolved solids by the volume of the original sample.

In some embodiments, the liquid stream comprising water and at least one dissolved salt initially fed to the system for producing a concentrated brine stream is made to flow through at least a portion of a desalination system (e.g., a system configured to remove at least a portion of at least one salt from an aqueous stream). In some embodiments, the desalination system comprises one or more desalination units. According to certain embodiments, at least one of the desalination units is a thermal desalination unit. In some cases, at least one of the desalination units is a humidification-dehumidification (HDH) desalination unit. An HDH desalination unit generally refers to a unit comprising a humidifier and a dehumidifier. In some embodiments, the humidifier is configured to receive a liquid feed stream comprising water and at least one dissolved salt and to transfer at least a portion of the water from the liquid feed stream to a carrier gas through an evaporation process, thereby producing a humidified gas stream and a concentrated brine stream. In certain embodiments, the carrier gas comprises a non-condensable gas. Non-limiting examples of suitable non-condensable gases include air, nitrogen, oxygen, helium, argon, carbon monoxide, carbon dioxide, sulfur oxides ($SO_x$) (e.g., $SO_2$, $SO_3$), and/or nitrogen oxides ($NO_x$) (e.g., NO, $NO_2$). In some embodiments, the dehumidifier is configured to receive the humidified gas stream from the humidifier and to transfer at least a portion of water from the humidified gas stream to a stream comprising substantially pure water through a condensation process.

Figure 2:
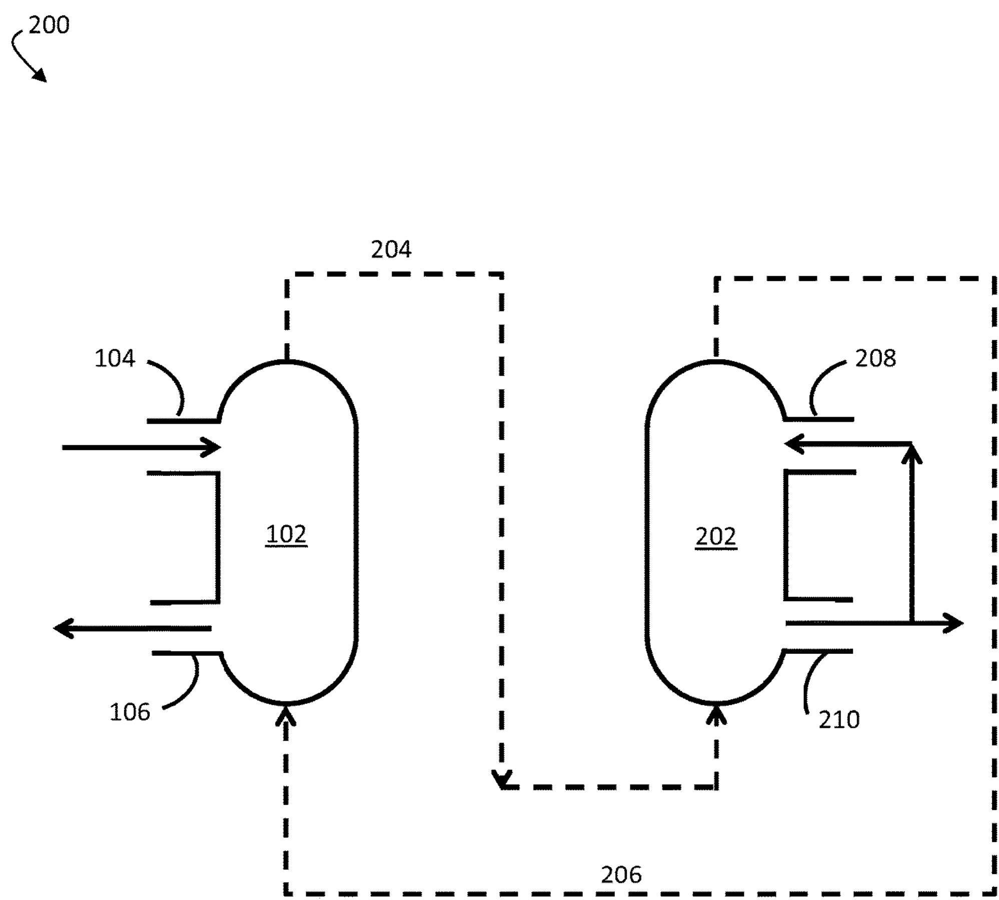
FIG. 2 shows a schematic flow diagram, according to some embodiments, of an exemplary humidification-dehumidification desalination system comprising a humidifier and a dehumidifier.

FIG. 2 shows an exemplary schematic illustration of HDH desalination unit 200, which may be used in association with certain inventive systems and methods described herein. In FIG. 2, desalination unit 200 comprises humidifier 102 and dehumidifier 202. As shown in FIG. 2, humidifier 102 comprises liquid inlet 104 (which may correspond, for example, to humidifier inlet 104 from FIG. 1) and liquid outlet 106 (which may correspond, for example, to humidifier outlet 106 from FIG. 1). In FIG. 2, humidifier 102 is fluidly connected to dehumidifier 202 via gas conduits 204 and 206. As shown in FIG. 2, dehumidifier 202 comprises liquid inlet 208 and liquid outlet 210.

In operation, a liquid stream comprising water and a dissolved salt at an initial concentration may enter humidifier 102 through liquid inlet 104. Humidifier 102 may also be configured to receive a carrier gas stream comprising a non-condensable gas. According to some embodiments, humidifier 102 is configured such that the liquid stream comes into contact (e.g., direct or indirect contact) with the carrier gas stream, and heat and water vapor are transferred from the liquid stream to the carrier gas stream through an evaporation process, thereby producing a humidified gas stream. In some embodiments, the remaining portion of the liquid stream that is not transported to the carrier gas stream forms a concentrated brine stream enriched in the salt relative to the liquid stream (e.g., the concentration of the salt in the concentrated brine stream is greater than the initial concentration of the salt in the liquid stream). In some embodiments, the concentrated brine stream exits humidifier 102 through liquid outlet 106, which may be fluidly connected to a conduit corresponding to conduit 108 in FIG. 1.

According to some embodiments, the humidified gas stream exits humidifier 102 and flows through gas conduit 204 to dehumidifier 202. A stream comprising substantially pure water may enter dehumidifier 202 through liquid inlet 208. In dehumidifier 202, the humidified gas stream may come into contact (e.g., direct or indirect contact) with the substantially pure water stream, and heat and water may be transferred from the humidified gas stream to the substantially pure water stream through a condensation process, thereby producing a dehumidified gas stream. The stream comprising substantially pure water may exit dehumidifier 202 through liquid outlet 210. In some cases, at least a portion of the substantially pure water stream may be discharged from HDH desalination system 200. In certain embodiments, at least a portion of the substantially pure water stream may be recirculated to liquid inlet 208. The dehumidified gas stream may exit dehumidifier 202, and at least a portion of the dehumidified gas stream may return to humidifier 102 through gas conduit 206. In some embodiments, at least a portion of the dehumidified gas stream may be transported elsewhere within the system and/or vented.

A humidifier (e.g., a humidifier of an HDH desalination unit) in a system for producing a concentrated brine stream may have any configuration that allows for the transfer of water vapor from a liquid feed stream to a carrier gas stream (e.g., through an evaporation process). In certain embodiments, the humidifier comprises a vessel (e.g., a stainless steel tank or other vessel). The humidifier vessel can comprise a liquid inlet configured to receive a liquid feed stream comprising water and at least one dissolved salt and a gas inlet configured to receive a carrier gas stream. In some embodiments, the humidifier can further comprise a liquid outlet and a gas outlet.

A dehumidifier (e.g., a dehumidifier of an HDH desalination unit) in a system for producing a concentrated brine stream may have any configuration that allows for the transfer of water from a humidified gas stream to a stream comprising substantially pure water (e.g., through a condensation process). In certain embodiments, the dehumidifier comprises a vessel (e.g., a stainless steel tank or other vessel). The dehumidifier vessel can comprise a liquid inlet configured to receive a stream comprising substantially pure water and a gas inlet configured to receive the humidified gas stream. In some embodiments, the dehumidifier can further comprise a liquid outlet for the stream comprising substantially pure water and a gas outlet for the dehumidified gas stream.

According to some embodiments, the humidifier is a bubble column humidifier (e.g., a humidifier in which the evaporation process occurs through direct contact between a liquid feed stream and bubbles of a carrier gas) and/or the dehumidifier is a bubble column dehumidifier (e.g., a dehumidifier in which the condensation process occurs through direct contact between a substantially pure liquid stream and bubbles of a humidified gas). In some cases, bubble column humidifiers and bubble column dehumidifiers may be associated with certain advantages. For example, bubble column humidifiers and dehumidifiers may exhibit higher thermodynamic effectiveness than certain other types of humidifiers (e.g., packed bed humidifiers, spray towers, wetted wall towers) and dehumidifiers (e.g., surface condensers). Without wishing to be bound by a particular theory, the increased thermodynamic effectiveness may be at least partially attributed to the use of gas bubbles for heat and mass transfer in bubble column humidifiers and dehumidifiers, since gas bubbles may have more surface area available for heat and mass transfer than many other types of surfaces (e.g., metallic tubes, liquid films, packing material). In addition, bubble column humidifiers and dehumidifiers may have certain features that further increase thermodynamic effectiveness, including, but not limited to, relatively low liquid level height, relatively high aspect ratio liquid flow paths, and multi-staged designs.

In certain embodiments, a bubble column humidifier comprises at least one stage comprising a chamber and a liquid layer positioned within a portion of the chamber. The liquid layer may, in some cases, comprise a liquid comprising water and at least one dissolved salt. The chamber may further comprise a gas distribution region occupying at least a portion of the chamber not occupied by the liquid layer. In addition, the chamber may be in fluid communication with a bubble generator (e.g., a sparger plate). In some embodiments, a carrier gas stream flows through the bubble generator, forming bubbles of the carrier gas. The carrier gas bubbles may then travel through the liquid layer. The liquid layer may be maintained at a temperature higher than the temperature of the gas bubbles, and as the gas bubbles directly contact the liquid layer, heat and/or mass may be transferred from the liquid layer to the gas bubbles. In some cases, at least a portion of water may be transferred to the gas bubbles through an evaporation process. The bubbles of the humidified gas may exit the liquid layer and enter the gas distribution region. The humidified gas may be substantially homogeneously distributed throughout the gas distribution region. The humidified gas may then exit the bubble column humidifier as a humidified gas stream.

In some embodiments, a bubble column dehumidifier comprises at least one stage comprising a chamber and a liquid layer positioned within a portion of the chamber. The liquid layer may, in some cases, comprise substantially pure water. The chamber may further comprise a gas distribution region occupying at least a portion of the chamber not occupied by the liquid layer. In addition, the chamber may be in fluid communication with a bubble generator (e.g., a sparger plate). In some embodiments, the humidified gas stream flows from the humidifier through the bubble generator, forming bubbles of the humidified gas. The bubbles of the humidified gas may then travel through the liquid layer. The liquid layer may be maintained at a temperature lower than the temperature of the humidified gas bubbles, and as the humidified gas bubbles directly contact the liquid layer, heat and/or mass may be transferred from the humidified gas bubbles to the liquid layer via a condensation process.

Suitable bubble column condensers that may be used as the dehumidifier and/or suitable bubble column humidifiers that may be used as the humidifier in certain systems and methods described herein include those described in U.S. Pat. No. 8,523,985, by Govindan et al., issued Sep. 3, 2013, and entitled "Bubble-Column Vapor Mixture Condenser"; U.S. Pat. No. 8,778,065, by Govindan et al., issued Jul. 15, 2014, and entitled "Humidification-Dehumidification System Including a Bubble-Column Vapor Mixture Condenser"; U.S. Patent Publication No. 2013/0074694, by Govindan et al., filed Sep. 23, 2011, and entitled "Bubble-Column Vapor Mixture Condenser"; U.S. Patent Publication No. 2014/0367871, by Govindan et al., filed Jun. 12, 2013, and entitled "Multi-Stage Bubble Column Humidifier"; U.S. Patent Publication No. 2015/0083577, filed on Sep. 23, 2014, and entitled "Desalination Systems and Associated Methods"; U.S. Patent Publication No. 2015/0129410, filed on Sep. 12, 2014, and entitled "Systems Including a Condensing Apparatus Such as a Bubble Column Condenser," each of which is incorporated herein by reference in its entirety for all purposes.

In some embodiments, the humidifier and/or dehumidifier comprise a plurality of stages. For example, the stages may be arranged such that a gas (e.g., a carrier gas, a humidified gas) flows sequentially from a first stage to a second stage. In some cases, the stages may be arranged in a vertical fashion (e.g., a second stage positioned above a first stage) or a horizontal fashion (e.g., a second stage positioned to the right or left of a first stage). In some cases, each stage may comprise a liquid layer. In embodiments relating to a humidifier comprising a plurality of stages (e.g., a multi-stage humidifier), the temperature of the liquid layer of the first stage (e.g., the bottommost stage in a vertically arranged bubble column) may be lower than the temperature of the liquid layer of the second stage, which may be lower than the temperature of the liquid layer of the third stage (e.g., the topmost stage in a vertically arranged bubble column). In embodiments relating to a dehumidifier comprising a plurality of stages (e.g., a multi-stage dehumidifier), the temperature of the liquid layer of the first stage may be higher than the temperature of the liquid layer of the second stage, which may be higher than the temperature of the liquid layer of the third stage.

The presence of multiple stages within a bubble column humidifier and/or bubble column dehumidifier may, in some cases, advantageously result in increased humidification and/or dehumidification of a gas. In some cases, the presence of multiple stages may advantageously lead to higher recovery of substantially pure water. For example, the presence of multiple stages may provide numerous locations where the gas may be humidified and/or dehumidified (e.g., treated to recover substantially pure water). That is, the gas may travel through more than one liquid layer in which at least a portion of the gas undergoes humidification (e.g., evaporation) or dehumidification (e.g., condensation). In addition, the presence of multiple stages may increase the difference in temperature between a liquid stream at an inlet and an outlet of a humidifier and/or dehumidifier. This may be advantageous in systems where heat from a liquid stream (e.g., dehumidifier liquid outlet stream) is transferred to a separate stream (e.g., humidifier input stream) within the system. In such cases, the ability to produce a heated dehumidifier liquid outlet stream can increase the energy effectiveness of the system. Additionally, the presence of multiple stages may enable greater flexibility for fluid flow within an apparatus. For example, extraction and/or injection of fluids (e.g., gas streams) from intermediate humidification and/or dehumidification stages may occur through intermediate exchange conduits.

In some cases, a bubble column humidifier and/or a bubble column dehumidifier is configured to extract partially humidified gas from at least one intermediate location in the humidifier (e.g., not the final humidification stage) and to inject the partially humidified gas into at least one intermediate location in the dehumidifier (e.g., not the first dehumidification stage). In some embodiments, extraction from at least one intermediate location in the humidifier and injection into at least one intermediate location in the dehumidifier may be thermodynamically advantageous. Because the portion of the gas flow exiting the humidifier at an intermediate outlet (e.g., the extracted portion) has not passed through the entire humidifier, the temperature of the gas flow at the intermediate outlet may be lower than the temperature of the gas flow at the main gas outlet of the humidifier. The location of the extraction points (e.g., outlets) and/or injection points (e.g., inlets) may be selected to increase the thermal efficiency of the system. For example, because a gas (e.g., air) may have increased vapor content at higher temperatures than at lower temperatures, and because the heat capacity of a gas with higher vapor content may be higher than the heat capacity of a gas with lower vapor content, less gas may be used in higher temperature areas of the humidifier and/or dehumidifier to better balance the heat capacity rate ratios of the gas (e.g., air) and liquid (e.g., water) streams. Extraction and/or injection at intermediate locations may therefore advantageously allow for manipulation of gas mass flows and for greater heat recovery.

The humidifier and/or dehumidifier may be of any size. In some cases, the size of the humidifier and/or dehumidifier will generally depend upon the number of humidifiers and/or dehumidifiers employed in the system and the total flow rate of the liquid that is to be desalinated. In certain embodiments, the total of the volumes of the humidifiers and/or dehumidifiers used in the system for producing a concentrated brine stream can be at least about 1 gallon, at least about 10 gallons, at least about 100 gallons, at least about 500 gallons, at least about 1,000 gallons, at least about 2,000 gallons, at least about 5,000 gallons, at least about 7,000 gallons, at least about 10,000 gallons, at least about 20,000 gallons, at least about 50,000 gallons, or at least about 100,000 gallons (and/or, in some embodiments, up to about 1,000,000 gallons, or more).

It should be recognized that the inventive systems and methods described herein are not limited to those including a bubble column humidifier and/or a bubble column dehumidifier and that other types of humidifiers and/or dehumidifiers may be used in some embodiments. For example, in some embodiments, the humidifier is a packed bed humidifier. In certain cases, the humidifier comprises a packing material (e.g., polyvinyl chloride (PVC) packing material). The packing material may, in some cases, facilitate turbulent gas flow and/or enhanced direct contact between the liquid stream comprising water and at least one dissolved salt and the carrier gas stream within the humidifier. In certain embodiments, the humidifier further comprises a device configured to produce droplets of the liquid feed stream. For example, a nozzle or other spraying device may be positioned at the top of the humidifier such that the liquid feed stream is sprayed downward to the bottom of the humidifier. The use of a spraying device can advantageously increase the degree of contact between the liquid feed stream fed to the humidifier and the carrier gas stream into which water from the liquid feed stream is transported.

In some embodiments, an HDH desalination unit further comprises one or more additional devices. According to some embodiments, for example, an HDH desalination unit further comprises a heat exchanger in fluid communication with the humidifier and/or dehumidifier. In certain cases, the heat exchanger advantageously facilitates transfer of heat from a liquid stream exiting the dehumidifier to a liquid stream entering the humidifier. For example, the heat exchanger may advantageously allow energy to be recovered from a dehumidifier liquid outlet stream and used to pre-heat a humidifier liquid inlet stream prior to entry of the humidifier liquid inlet stream into the humidifier.

In certain embodiments, an HDH desalination unit further comprises an optional heating device arranged in fluid communication with the humidifier. The optional heating device may be any device capable of transferring heat to a liquid stream. The heating device may be a heat exchanger, a heat collection device (e.g., a device configured to store and/or utilize thermal energy), or an electric heater. In certain cases, the heating device may be arranged such that a liquid feed stream is heated prior to entering the humidifier. Heating the liquid feed stream may, in some cases, increase the degree to which water is transferred from the liquid feed stream to the carrier gas stream within the humidifier.

In some embodiments, an HDH desalination unit further comprises an optional cooling device arranged in fluid communication with the dehumidifier. In certain cases, a stream comprising substantially pure water may be cooled by the cooling device prior to entering the dehumidifier. A cooling device generally refers to any device that is capable of removing heat from a fluid stream (e.g., a liquid stream, a gas stream). The cooling device may be a heat exchanger (e.g., an air-cooled heat exchanger), a dry cooler, a chiller, a radiator, or any other device capable of removing heat from a fluid stream.

It should be understood that the inventive systems and methods described herein are not limited to those including a humidification-dehumidification desalination unit and that in other embodiments, other types of desalination units may be employed. Non-limiting examples of suitable desalination units include a mechanical vapor compression unit, a multi-effect distillation unit, a multi-stage flash unit, and a vacuum distillation unit. In some embodiments, a desalination system comprises a plurality of desalination units, each of which may be any type of desalination unit. The desalination units of a desalination system may be the same or different types of desalination units.

In some embodiments, a desalination system used in systems and methods described herein may have a relatively high liquid feed rate (e.g., amount of liquid feed entering the system per unit time). In certain embodiments, the desalination system has a liquid feed rate of at least about 5 barrels/day, at least about 10 barrels/day, at least about 20 barrels/day, at least about 50 barrels/day, at least about 100 barrels/day, at least about 200 barrels/day, at least about 300 barrels/day, at least about 400 barrels/day, at least about 500 barrels/day, at least about 600 barrels/day, at least about 700 barrels/day, at least about 800 barrels/day, at least about 900 barrels/day, at least about 1,000 barrels a day, at least about 2,000 barrels/day, at least about 5,000 barrels/day, at least about 10,000 barrels/day, at least about 20,000 barrels/day, at least about 30,000 barrels/day, at least about 35,000 barrels/day, at least about 40,000 barrels/day, at least about 50,000 barrels/day (and/or, in some embodiments, up to about 100,000 barrels/day, or more).

In some embodiments, the desalination system has a relatively high production rate (e.g., amount of substantially pure water produced per unit time). In certain cases, the desalination system has a production rate of at least about 10 barrels/day, at least about 50 barrels/day, at least about 100 barrels/day, at least about 200 barrels/day, at least about 300 barrels/day, at least about 400 barrels/day, at least about 500 barrels/day, at least about 600 barrels/day, at least about 700 barrels/day, at least about 800 barrels/day, at least about 900 barrels/day, at least about 1,000 barrels a day, at least about 2,000 barrels/day, at least about 5,000 barrels/day, or at least about 10,000 barrels/day (and/or, in some embodiments, up to about 100,000 barrels/day, or more).

Certain of the systems described herein can be configured to desalinate saline solutions entering at relatively high flow rates, and accordingly, can be configured to produce relative pure water streams at relatively high flow rates. For example, in some embodiments, the systems and methods described herein may be configured and sized to operate to receive a liquid feed stream at a flow rate of at least about 1 gallon/minute, at least about 10 gallons/minute, at least about 100 gallons/minute, or at least about 1000 gallons/minute (and/or, in certain embodiments, up to about 10,000 gallons/minute, or more).

In some embodiments, at least a portion of the desalination system (e.g., the dehumidifier of an HDH desalination unit) is configured to produce a stream comprising water of relatively high purity. For example, in some embodiments, the desalination system produces a stream comprising water in an amount of at least about 95 wt %, at least about 99 wt %, at least about 99.9 wt %, or at least about 99.99 wt % (and/or, in certain embodiments, up to about 99.999 wt %, or more). In some embodiments, the percentage volume of a liquid feed stream that is recovered as fresh water is at least about 40%, at least about 45%, at least about 50%, at least about 55%, at least about 58%, at least about 60%, or at least about 70%.

In some embodiments, the substantially pure water stream has a relatively low concentration of one or more dissolved salts. In some cases, the concentration of at least one dissolved salt (e.g., NaCl) in the substantially pure water stream is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, about 0.05 mg/L or less, about 0.02 mg/L or less, or about 0.01 mg/L or less. According to some embodiments, the concentration of at least one dissolved salt in the substantially pure water stream is substantially zero (e.g., not detectable). In certain cases, the concentration of at least one dissolved salt in the substantially pure water stream is in the range of about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.5 mg/L, about 0 mg/L to about 0.1 mg/L, about 0 mg/L to about 0.05 mg/L, about 0 mg/L to about 0.02 mg/L, or about 0 mg/L to about 0.01 mg/L.

In some embodiments, the substantially pure water stream contains at least one dissolved salt in an amount of about 2 wt % or less, about 1 wt % or less, about 0.5 wt % or less, about 0.2 wt % or less, about 0.1 wt % or less, about 0.05 wt % or less, or about 0.01 wt % or less. In some embodiments, the substantially pure water stream contains at least one dissolved salt in an amount in the range of about 0.01 wt % to about 2 wt %, about 0.01 wt % to about 1 wt %, about 0.01 wt % to about 0.5 wt %, about 0.01 wt % to about 0.2 wt %, or about 0.01 wt % to about 0.1 wt %.

In some embodiments, the concentration of at least one dissolved salt in the substantially pure water stream is substantially less than the concentration of the at least one dissolved salt in the liquid feed stream received by the desalination system. In some cases, the concentration of at least one dissolved salt in the substantially pure water stream is at least about 0.5%, about 1%, about 2%, about 5%, about 10%, about 15%, or about 20% less than the concentration of the at least one dissolved salt in the liquid feed stream.

In some embodiments, the substantially pure water stream has a relatively low total dissolved salt concentration. In some cases, the total dissolved salt concentration in the substantially pure water stream is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, about 0.05 mg/L or less, about 0.02 mg/L or less, or about 0.01 mg/L or less. According to some embodiments, the total dissolved salt concentration in the substantially pure water stream is substantially zero (e.g., not detectable). In certain embodiments, the total dissolved salt concentration in the substantially pure water stream is in the range of about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.5 mg/L, about 0 mg/L to about 0.2 mg/L, about 0 mg/L to about 0.1 mg/L, about 0 mg/L to about 0.05 mg/L, about 0 mg/L to about 0.02 mg/L, or about 0 mg/L to about 0.01 mg/L.

In some embodiments, the total dissolved salt concentration of the substantially pure water stream is substantially less than the total dissolved salt concentration of a liquid feed stream received by the desalination system. In some cases, the total dissolved salt concentration of the substantially pure water stream is at least about 0.5%, about 1%, about 2%, about 5%, about 10%, about 15%, or about 20% less than the total dissolved salt concentration of the liquid feed stream.

According to some embodiments, the substantially pure water stream has a relatively low salinity (e.g., weight percent of all dissolved salts). In some embodiments, the substantially pure water stream has a salinity of about 5% or less, about 2% or less, about 1% or less, about 0.5% or less, about 0.2% or less, about 0.1% or less, about 0.05% or less, or about 0.01% or less. In some embodiments, the substantially pure water stream has a salinity in the range of about 0.01% to about 5%, about 0.01% to about 2%, about 0.01% to about 1%, about 0.01% to about 0.5%, about 0.01% to about 0.2%, or about 0.01% to about 0.1%.

According to some embodiments, at least a portion of the desalination system (e.g., the humidifier of an HDH desalination unit) is configured to produce a concentrated brine stream (e.g., a stream comprising a relatively high concentration of at least one dissolved salt). The concentrated brine stream may be recirculated through a fluidic circuit comprising at least a portion of the desalination system until a certain condition (e.g., a target density and/or salinity) is met. In some embodiments, the recirculated concentrated brine stream may be discharged upon satisfaction of the condition. The discharged concentrated brine stream may, in some cases, have a relatively high salinity (e.g., wt % of all dissolved salts). In some cases, the salinity of the discharged concentrated brine stream is at least about 10%, at least about 15%, at least about 20%, at least about 25%, at least about 26%, at least about 27%, at least about 28%, at least about 29%, or at least about 30%. In some embodiments, the salinity of the discharged concentrated brine stream is in the range of about 10% to about 20%, about 10% to about 25%, about 10% to about 26%, about 10% to about 27%, about 10% to about 28%, about 10% to about 29%, about 10% to about 30%, about 15% to about 20%, about 15% to about 25%, about 15% to about 26%, about 15% to about 27%, about 15% to about 28%, about 15% to about 29%, about 15% to about 30%, about 20% to about 25%, about 20% to about 26%, about 20% to about 27%, about 20% to about 28%, about 20% to about 29%, about 20% to about 30%, about 25 wt % to about 26 wt %, about 25 wt % to about 27 wt %, about 25 wt % to about 28 wt %, about 25 wt % to about 29 wt %, or about 25% to about 30%.

The discharged concentrated brine stream may, in some cases, have a relatively high concentration of at least one dissolved salt (e.g., NaCl). In certain cases, the concentration of at least one dissolved salt in the discharged concentrated brine stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, or at least about 500,000 mg/L (and/or, in certain embodiments, up to the solubility limit of the salt in the liquid stream). In some embodiments, the concentration of at least one dissolved salt in the discharged concentrated brine stream is in the range of about 1,000 mg/L to about 10,000 mg/L, about 1,000 mg/L to about 20,000 mg/L, about 1,000 mg/L to about 50,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the discharged concentrated brine stream contains at least one dissolved salt (e.g., NaCl) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the salt in the liquid stream). In some embodiments, the discharged concentrated brine stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the concentration of at least one dissolved salt in the concentrated brine stream is substantially greater than the concentration of the at least one dissolved salt in the liquid feed stream received by the desalination system. In some cases, the concentration of at least one dissolved salt in the concentrated brine stream is at least about 0.5%, about 1%, about 2%, about 5%, about 10%, about 15%, or about 20% greater than the concentration of the at least one dissolved salt in the liquid feed stream.

In some embodiments, the total dissolved salt concentration of the concentrated brine stream upon discharge may be relatively high. In certain cases, the total dissolved salt concentration of the discharged concentrated brine stream is at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, at least about 500,000 mg/L, at least about 550,000 mg/L, or at least about 600,000 mg/L (and/or, in certain embodiments, up to the solubility limit of the salt(s)

in the concentrated brine stream). In some embodiments, the total salt concentration of the discharged concentrated brine stream is in the range of about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 10,000 mg/L to about 550,000 mg/L, about 10,000 mg/L to about 600,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 20,000 mg/L to about 550,000 mg/L, about 20,000 mg/L to about 600,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 50,000 mg/L to about 550,000 mg/L, about 50,000 mg/L to about 600,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, about 100,000 mg/L to about 500,000 mg/L, about 100,000 mg/L to about 550,000 mg/L, or about 100,000 mg/L to about 600,000 mg/L.

In some embodiments, the total dissolved salt concentration of the discharged concentrated brine stream is significantly higher than the total dissolved salt concentration of a liquid feed stream received by the desalination system. In some cases, the total dissolved salt concentration of the discharged concentrated brine stream is at least about 5%, at least about 6%, at least about 10%, at least about 14%, at least about 15%, at least about 20%, or at least about 25% greater than the total dissolved salt concentration of the liquid feed stream.

In some cases, the concentration of at least one salt in the concentrated brine stream is at or near the saturation limit. The saturation limit of an aqueous saline solution, as used herein, refers to the concentration of a salt at which 0.5 wt % of the aqueous solution is made up of the salt. The above-defined saturation limit is typically at or near the bulk salt concentration at which there is inception of crystal formation. One can determine whether a given solution is at its saturation limit with respect to the salt(s) contained within the aqueous solution by inspecting the solution to determine whether the formation of solid salt is occurring. In some cases, a concentrated brine comprising at least one salt at or near the saturation limit may be referred to as a "saturated brine."

Generally, the saturation limit of an aqueous saline solution will depend upon the temperature, pressure, and flow velocity of the saline solution. For example, saline aqueous solutions at relatively high temperatures will generally have higher solubility limits than saline aqueous solutions at relatively low temperatures. As another example, saline aqueous solutions at relatively high flow velocities will generally have higher solubility limits than saline aqueous solutions at relatively low flow velocities.

According to some embodiments, the discharged concentrated brine stream has a relatively high density. It may be advantageous, in some cases, for a concentrated brine stream to have a relatively high density, as a higher density may result in increased effectiveness in certain applications (e.g., use as a kill fluid for oil or gas wells). In some cases, the density of the discharged concentrated brine stream is measured at a temperature of about 120° F. or less, about 100° F. or less, about 80° F. or less, about 72° F. or less, about 60° F. or less, or about 40° F. or less. In some embodiments, the density of the discharged concentrated brine stream is measured at a temperature of at least about 40° F., at least about 60° F., at least about 72° F., at least about 80° F., at least about 100° F., or at least about 120° F. In some embodiments, the density of the discharged concentrated brine stream is measured at a temperature in the range of about 40° F. to about 120° F., about 40° F. to about 100° F., about 40° F. to about 80° F., about 40° F. to about 72° F., about 40° F. to about 60° F., about 60° F. to about 120° F., about 60° F. to about 100° F., or about 60° F. to about 80° F. In certain embodiments, the discharged concentrated brine stream has a density (e.g., measured at about 60° F.) of at least about 9.5 pounds/gallon, at least about 10 pounds/gallon, at least about 10.5 pounds/gallon, at least about 11 pounds/gallon, at least about 11.5 pounds/gallon, at least about 12 pounds/gallon, or at least about 15 pounds/gallon. In some embodiments, the discharged concentrated brine stream (e.g., measured at about 60° F.) has a density in the range of about 10 pounds/gallon to about 11 pounds/gallon, about 10 pounds/gallon to about 11.5 pounds/gallon, about 10 pounds/gallon to about 12 pounds/gallon, about 10 pounds/gallon to about 15 pounds/gallon, about 11 pounds/gallon to about 11.5 pounds/gallon, about 11 pounds/gallon to about 12 pounds/gallon, about 11 pounds/gallon to about 15 pounds/gallon, or about 11.5 pounds/gallon to about 15 pounds/gallon.

In some embodiments, a system for producing a concentrated brine stream comprises one or more tanks. For example, a system may comprise one or more feed tanks and/or one or more concentrated brine storage tanks. The tanks may be any type of tank known in the art and may comprise any vessel capable of holding a volume of a liquid. The tanks may also have any size. In some cases, the tanks may be relatively large. According to certain embodiments, one or more tanks in a system for producing a concentrated brine stream have a volume of at least about 1,000 gallons, at least about 2,000 gallons, at least about 5,000 gallons, at least about 7,000 gallons, at least about 10,000 gallons, at least about 20,000 gallons, or at least about 50,000 gallons.

In some embodiments, a system for producing a concentrated brine stream is configured to recover heat from concentrated brine streams that are discharged from the system. During the transient operation of a desalination system, a concentrated brine stream recirculating through the system may be heated to a relatively high temperature. It may be advantageous to recover at least a portion of the heat of the recirculated concentrated brine stream prior to discharging the recirculated concentrated brine stream from the system instead of wasting the thermal energy. Accordingly, in some embodiments, the system comprises at least one heat exchanger. Prior to being discharged from the system, a recirculated concentrated brine stream may flow through a first portion of the heat exchanger. While the recirculated concentrated brine stream is flowing through a first portion of the heat exchanger, an incoming liquid feed stream may flow through a second portion of the heat exchanger, and heat may be transferred from the recirculated concentrated brine stream to the liquid feed stream. In some cases, it may be desirable for the liquid feed stream to be at a relatively high temperature in order to promote evaporation of water vapor from the liquid feed stream to a carrier gas stream in the humidifier. Recovery of heat from the recirculated concentrated brine stream may avoid the need to use an external heating device to heat the liquid feed stream or may reduce the amount of external input energy needed to heat the liquid feed stream prior to flowing through the humidifier. In addition, large temperature differences between the concentrated brine stream flowing through a recirculation loop and the incoming liquid feed stream may disrupt the thermal steady state of the system. A system including one or more heat exchangers operated to promote energy recovery may advantageously reduce the temperature difference between the recirculated concentrated brine stream and the incoming liquid feed stream.

Figure 3A:
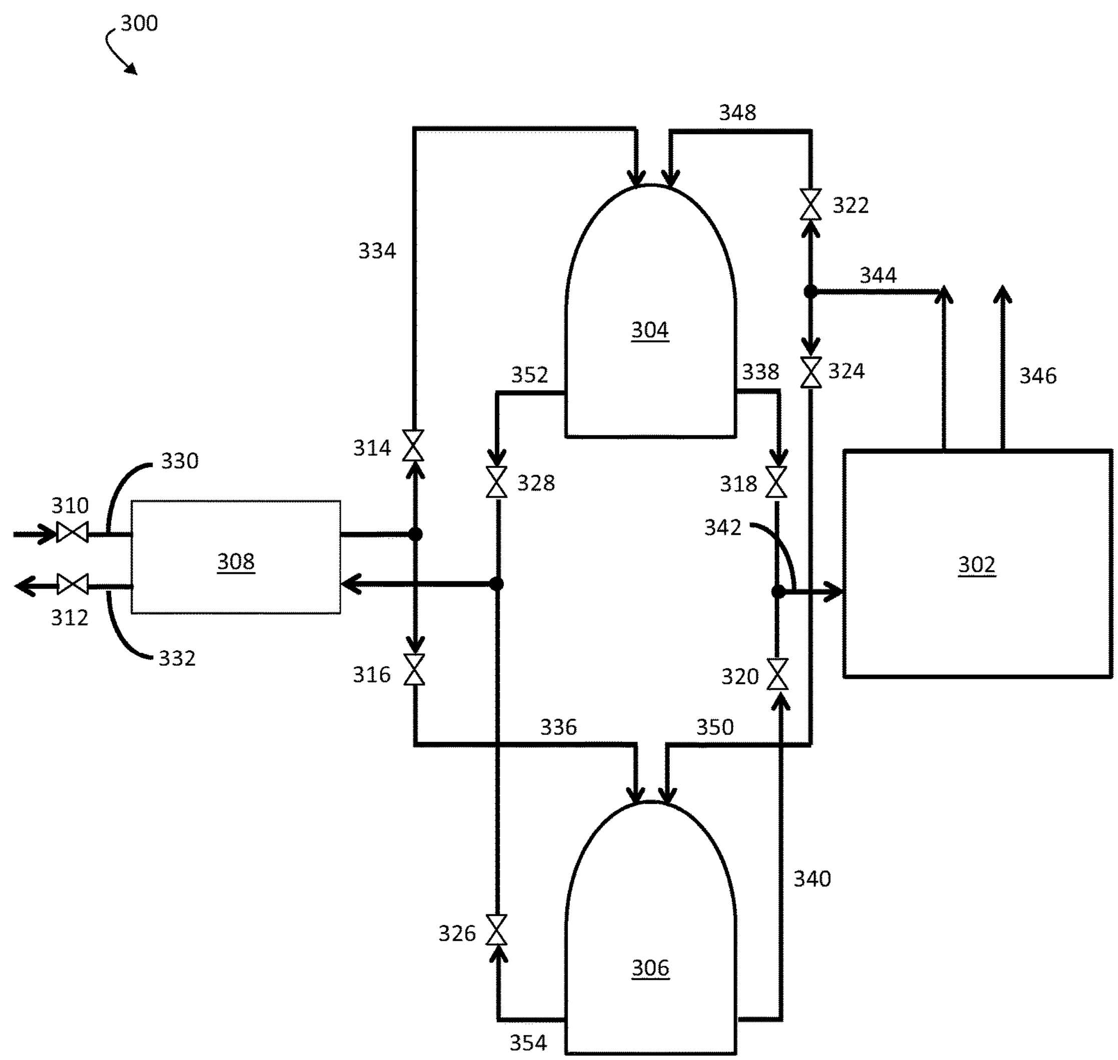
FIG. 3A shows a schematic flow diagram of an exemplary system for producing a concentrated brine stream comprising two feed tanks, a desalination system, and a heat exchanger configured to recover heat from a discharged concentrated brine stream, according to some embodiments.

FIG. 3A shows an exemplary schematic diagram of a system 300 for producing a concentrated brine stream that is configured to recover heat from concentrated brine streams discharged from the system. In FIG. 3A, system 300 comprises desalination system 302, first feed tank 304, second feed tank 306, and heat exchanger 308. In addition, system 300 comprises a plurality of valves 310, 312, 314, 316, 318, 320, 322, 324, 326, and 328, and a plurality of conduits 330, 332, 334, 336, 338, 340, 342, 344, 346, 348, 350, 352, and 354.

In operation, a first liquid feed stream comprising water and at least one dissolved salt may enter system 300. Initially, valves 310 and 314 may be open, and the first liquid feed stream may flow through conduit 330, heat exchanger 308, and conduit 334 to first feed tank 304. Valves 310 and 314 may then be closed, and valves 318 and 322 may be opened. The first liquid feed stream may flow through conduits 338 and 342 to desalination system 302. In desalination system 302, at least a portion of the water may be removed from the first liquid feed stream to produce a first concentrated brine stream enriched in the at least one dissolved salt relative to the first liquid feed stream. Desalination system 302 may also be configured to produce a stream of substantially pure water, at least a portion of which may be discharged from system 300 through conduit 346. In some embodiments, at least a portion of the stream of substantially pure water is recirculated back to desalination system 302.

The first concentrated brine stream may be made to flow through conduits 344 and 348 to be returned to first feed tank 304. The first concentrated brine stream may continue to be fed to/from first feed tank 304 and recirculated through desalination system 302 until a certain condition (e.g., target density and/or salinity) is met. With each successive pass through the desalination system, the density and/or salinity (e.g., concentration of the at least one salt) of the first concentrated brine stream may increase. Upon satisfaction of the condition, valves 318 and 322 may be closed, and valves 312 and 328 may be opened. The recirculated first concentrated brine stream, which may have a relatively high temperature, may flow from first feed tank 304 to heat exchanger 308 through fluid conduit 352. While the recirculated first concentrated brine stream flows through heat exchanger 308, valves 310 and 316 may be opened, and a second liquid feed stream comprising water and at least one dissolved salt may flow through conduit 330 to heat exchanger 308. In heat exchanger 308, heat may be transferred from the recirculated first concentrated brine stream to the second liquid feed stream. The heated second liquid feed stream may then flow through conduit 336 to second feed tank 306.

Once second feed tank 306 has been filled, valves 310, 312, 316, and 328 may be closed, and valves 320 and 324 may be opened. The heated second liquid feed stream may then flow through conduits 340 and 342 from second feed tank 306 to desalination system 302. In desalination system 302, at least a portion of the water may be removed from the second liquid feed stream to produce a second concentrated brine stream. The second concentrated brine stream may flow through conduits 344 and 350 from desalination system 302 to second feed tank 306. The second concentrated brine stream may be fed to/from second feed tank 306 and recirculated through desalination system 302 until a certain condition is reached. Upon satisfaction of the condition, valves 320 and 324 may be closed, and valves 326, 312, 310, and 314 may be opened. The recirculated second concentrated brine stream may flow through conduit 354 to heat exchanger 308. In heat exchanger 308, heat may be transferred from the recirculated second concentrated brine stream to a third liquid feed stream entering system 300 through conduit 330 and heat exchanger 308 and flowing through conduit 334 to first feed tank 304. In this manner, heat from a discharged stream (e.g., effluent brine) may be recovered and transferred to an incoming liquid stream. This alternating operation may be repeated any desired number of times.

According to some embodiments, a system for producing a concentrated brine stream comprises a heat exchanger. Any heat exchanger known in the art may be used. Examples of suitable heat exchangers include, but are not limited to, plate-and-frame heat exchangers, shell-and-tube heat exchangers, tube-and-tube heat exchangers, plate heat exchangers, plate-and-shell heat exchangers, spiral heat exchangers, and the like. In a particular embodiment, the heat exchanger is a plate-and-frame heat exchanger. In certain embodiments, the heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). In some cases, more than two fluid streams may flow through the heat exchanger. In an exemplary embodiment, the heat exchanger is a counter-flow plate-and-frame heat exchanger. In some cases, a counter-flow plate-and-frame heat exchanger may advantageously result in a small temperature difference between two fluid streams flowing through the heat exchanger.

In some embodiments, a relatively large amount of heat may be transferred between the concentrated brine stream and the incoming liquid stream. For example, the difference between the temperature of a fluid entering the heat exchanger and the fluid exiting the heat exchanger may be at least about 5° C., at least about 10° C., at least about 15° C., at least about 20° C., at least about 30° C., at least about 40° C., at least about 50° C., at least about 60° C., at least about 70° C., at least about 80° C., at least about 90° C., or at least about 100° C. In some embodiments, the difference between the temperature of a fluid entering the heat exchanger and the fluid exiting the heat exchanger may be in the range of about 5° C. to about 20° C., about 5° C. to about 30° C., about 5° C. to about 50° C., about 5° C. to about 60° C., about 5° C. to about 90° C., about 5° C. to about 100° C., about 10° C. to about 30° C., about 10° C. to about 60° C., about 10° C. to about 90° C., about 10° C. to about 100° C., about 20° C. to about 60° C., about 20° C. to about 90° C., about 20° C. to about 100° C., about 30° C. to about 60° C., about 30° C. to about 90° C., about 30° C. to about 100° C., about 50° C. to about 100° C., about 60° C. to about 90° C., about 60° C. to about 100° C., or about 80° C. to about 100° C.

In some embodiments, a system for producing a concentrated brine stream may be configured to not only directly recover heat from a concentrated brine stream being discharged from the system, but also to recover residual heat remaining in a tank used to store the concentrated brine stream. In some cases, while a first portion of a concentrated brine stream is recirculating through a desalination system, a second portion of the concentrated brine stream may be circulated from a concentrated brine storage tank to a heat exchanger. A portion of a liquid feed stream comprising water and at least one dissolved salt may also be circulated from a feed tank to the heat exchanger. An amount of heat may be transferred from the concentrated brine stream to the liquid feed stream in the heat exchanger. Recovery of heat from a concentrated brine storage tank during periods between concentrated brine discharges may be referred to as secondary heat recovery, while direct recovery of heat from a discharged concentrated brine stream flowing through a heat exchanger may be referred to as primary heat recovery.

Figure 3B:
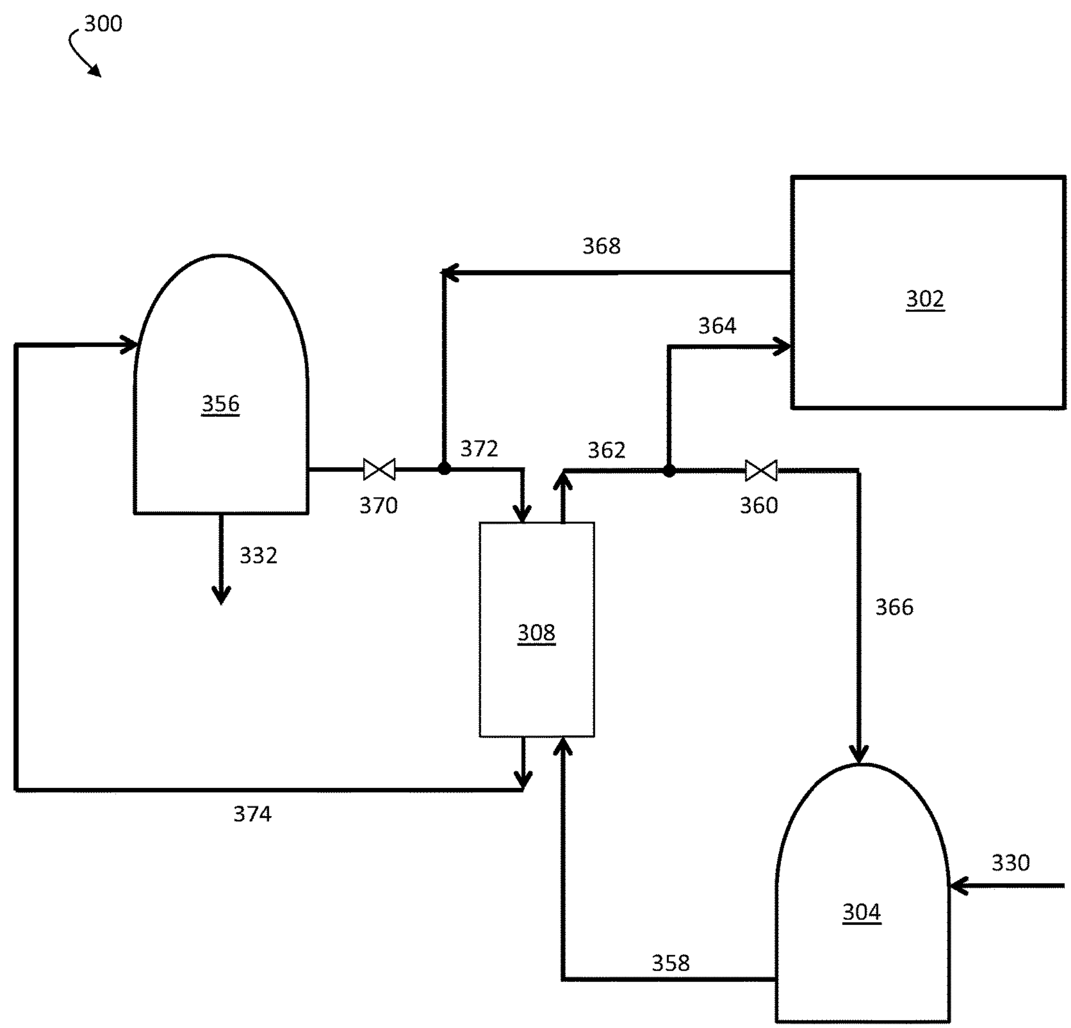
FIG. 3B shows a schematic flow diagram of an exemplary system for producing a concentrated brine stream comprising a feed tank, a concentrated brine tank, a desalination system, and a counter-flow heat exchanger, according to some embodiments.

An exemplary schematic diagram of a system for producing a concentrated brine stream that is configured for secondary heat recovery is shown in FIG. 3B. As shown in FIG. 3B, system 300 comprises desalination system 302, feed tank 304, concentrated brine tank 356, and counter-flow heat exchanger 308. System 300 also comprises valves 360 and 370 and conduits 330, 332, 358, 362, 364, 366, 368, 372, and 374. In certain embodiments, desalination system 302 comprises a plurality of desalination units. For example, in certain cases, desalination system 302 comprises one or more desalination units connected in parallel.

In operation, a liquid feed stream comprising water and at least one dissolved salt may enter system 300 through conduit 330, flowing into feed tank 304. Initially, valve 360 may be closed, and the liquid stream may flow from feed tank 304 through conduit 358, heat exchanger 308, and conduits 362 and 364 to desalination system 302. In desalination system 302, at least a portion of the water may be removed from the liquid feed stream to produce a concentrated brine stream enriched in the at least one dissolved salt relative to the liquid feed stream. The concentrated brine stream may be recirculated through desalination system 302 until the concentrated brine stream reaches a certain condition (e.g., a target density and/or salinity). Upon satisfaction of the condition, the recirculated concentrated brine stream may exit desalination system 302 through conduit 368. Valve 370 may be closed, and the recirculated concentrated brine stream may flow through heat exchanger 308 in a first direction. At the same time, a second liquid feed stream comprising water and at least one dissolved salt may flow through heat exchanger 308 in a second, substantially opposite direction, and heat may be transferred from the recirculated concentrated brine stream to the second liquid feed stream, thereby forming a cooled recirculated concentrated brine stream and a heated second liquid feed stream. The heated second liquid feed stream may flow through conduits 362 and 364 to desalination system 302. The cooled concentrated brine stream may flow through conduit 374 to concentrated brine tank 356. In some cases, at least a portion of the cooled concentrated brine stream may be discharged from system 300 through conduit 332, and at least a portion of the cooled concentrated brine stream may remain in concentrated brine tank 356.

In some cases, in between discharges of concentrated brine streams from desalination system 302, valves 360 and 370 may be opened, and an amount of concentrated brine may be made to flow from concentrated brine tank 356 to heat exchanger 308 while an amount of a liquid feed stream is made to flow from feed tank 304 to heat exchanger 308. Heat may be transferred from the concentrated brine stream to the liquid feed stream, further cooling the concentrated brine stream and heating the liquid feed stream. The cooled concentrated brine stream may be returned to concentrated brine tank 356 through conduit 374, and the heated liquid feed stream may be returned to feed tank 304 through conduits 362 and 366. In some cases, feed tank 304 and concentrated brine tank 356 may reach a thermal equilibrium.

Figure 3C:
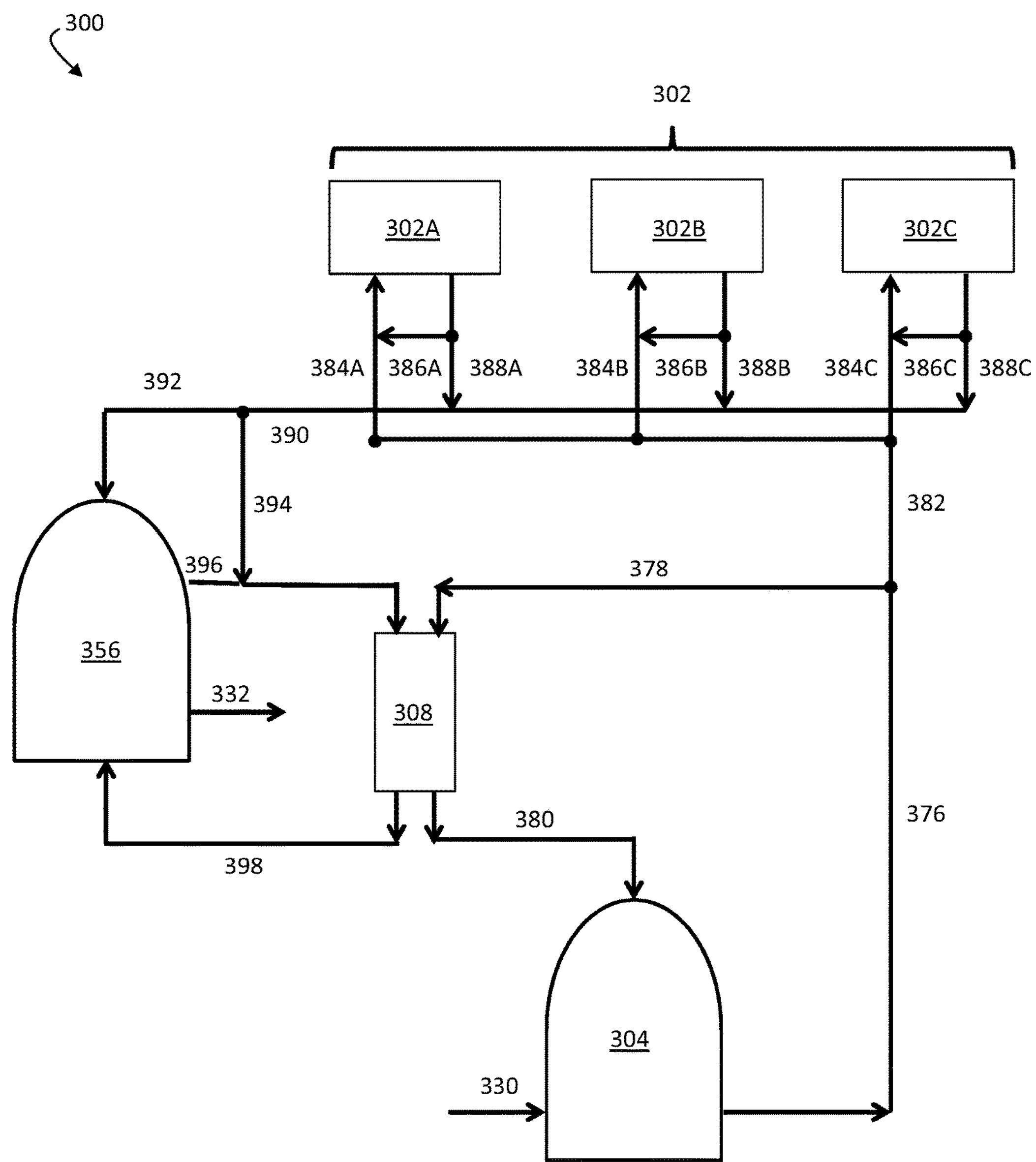
FIG. 3C shows a schematic flow diagram of an exemplary system for producing a concentrated brine stream comprising a feed tank, a concentrated brine tank, a desalination system comprising three desalination units, and a parallel-flow heat exchanger, according to some embodiments.

In some embodiments, a parallel flow heat exchanger may be used. For example, FIG. 3C shows an exemplary schematic diagram of a system 300 for producing a concentrated brine stream that comprises a parallel flow heat exchanger. As shown in FIG. 3C, system 300 comprises desalination system 302 comprising desalination units 302A, 302B, and 302C, in addition to feed tank 304, concentrated brine tank 356, and heat exchanger 308. According to the embodiment shown in FIG. 3C, heat exchanger 308 is a parallel flow heat exchanger. In some cases, it may be advantageous to use a parallel flow heat exchanger for secondary heat recovery, as such a heat exchanger may require less area than a counter-flow heat exchanger. System 300 also comprises conduits 330, 332, 376, 378, 380, 382, 384A, 384B, 384C, 386A, 386B, 386C, 388A, 388B, 388C, 390, 392, 394, 396, and 398.

In operation, first desalination unit 302A, second desalination unit 302B, and third desalination unit 302C may be brought into operation sequentially. In each of the desalination units, a liquid feed stream may be fed to the unit (e.g., through conduit 384A, 384B, or 384C), and a concentrated brine stream and a substantially pure water stream may be produced. The concentrated brine streams may be recirculated through each of the desalination units (e.g., through conduit 386A, 386B, or 386C) until a certain condition (e.g., a target density and/or salinity) is satisfied. Optionally, a liquid feed stream may be added to the desalination unit (e.g., through 384A, 384B, or 384C) at the same rate that the substantially pure water stream is discharged from the desalination unit in order to maintain a constant volume in each unit. In some cases, the specified condition may first be satisfied in desalination unit 302A, and the recirculated concentrated brine stream from desalination unit 302A may be discharged through conduit 388A. At least a portion of the concentrated brine stream may flow through conduits 390 and 394 to heat exchanger 308. A second liquid feed stream may simultaneously flow through heat exchanger 308, and heat may be transferred from the concentrated brine stream to the second liquid feed stream to produce a cooled concentrated brine stream and a heated second liquid feed stream. The heated second liquid feed stream may flow through conduit 380 to return to feed tank 304, and the cooled concentrated brine stream may flow through conduit 398 to concentrated brine tank 356. In some cases, the specified condition may subsequently be satisfied in desalination unit 302B, and the recirculated concentrated brine stream from desalination unit 302B may be discharged through conduit 388B. The specified condition may then be satisfied in desalination unit 302C, and the recirculated concentrated brine stream from desalination unit 302C may be discharged through conduit 388C. In this manner, amounts of concentrated brine may be discharged from desalination units 302A, 302B, and 302C.

In certain cases, in between periods of discharge from one of desalination units 302A, 302B, and 302C, a portion of the concentrated brine stream may flow from concentrated brine tank 356 through conduit 396 to heat exchanger 308 while a portion of the second liquid feed stream flows from feed tank 304 to heat exchanger 308 (e.g., through conduits 376 and 378). In heat exchanger 308, heat may be transferred from the concentrated brine stream to the second liquid feed stream. The cooled concentrated brine stream may then be returned to concentrated brine tank 356 through conduit 398, and the heated liquid feed stream may be returned to feed tank 304 through conduit 380.

Some aspects are related to a method of forming an ultra-high-density concentrated brine stream (e.g., a concentrated brine stream having a density of at least about 11.7 pounds/gallon). In some embodiments, a method of forming an ultra-high-density concentrated brine stream comprises the step of adding an amount of one or more salts to a liquid stream to produce an ultra-high-density concentrated brine stream. For example, in certain embodiments, a concentrated brine stream comprising at least one dissolved salt is produced by a transiently-operated desalination system according to systems and methods described herein, and an amount of one or more additional salts is added to the concentrated brine stream to produce an ultra-high-density concentrated brine stream. In some cases, an amount of one or more salts may be added to other types of liquid streams, such as a concentrated brine stream produced by a continuously-operated desalination system, a liquid feed stream (e.g., produced water, flowback water), a stream of substantially pure water, or any other type of liquid stream. Non-limiting examples of suitable salts to add to a concentrated brine stream (e.g., a concentrated brine stream produced by a transiently-operated desalination system), a liquid feed stream, a substantially pure water stream, and/or another liquid stream to produce an ultra-high-density concentrated brine stream include sodium chloride (NaCl), calcium chloride ($CaCl_2$), magnesium chloride ($MgCl_2$), copper (II) chloride ($CuCl_2$), iron (III) chloride hexahydrate ($FeCl_3.6H_2O$), iron (III) chloride ($FeCl_3$), lithium chloride (LiCl), manganese (II) chloride ($MnCl_2$), nickel (II) chloride ($NiCl_2$), zinc chloride ($ZnCl_2$), sodium bromide (NaBr), calcium bromide ($CaBr_2$), magnesium bromide ($MgBr_2$), potassium bromide (KBr), copper (II) bromide ($CuBr_2$), iron (III) bromide ($FeBr_3$), lithium bromide (LiBr), manganese (II) bromide ($MnBr_2$), nickel (II) bromide ($NiBr_2$), zinc bromide ($ZnBr_2$), ammonium nitrate ($NH_4NO_3$), sodium nitrate ($NaNO_3$), lithium nitrate ($LiNO_3$), calcium nitrate ($Ca(NO_3)_2$), magnesium nitrate ($Mg(NO_3)_2$), strontium nitrate ($Sr(NO_3)_2$), calcium nitrate tetrahydrate ($Ca(NO_3)_2.4H_2O$), copper (II) nitrate ($Cu(NO_3)_2$), iron (II) nitrate ($Fe(NO_3)_2$), iron (III) nitrate ($Fe(NO_3)_3$), nickel (II) nitrate ($Ni(NO_3)_2$), and/or zinc nitrate ($Zn(NO_3)_2$). In some embodiments, at least one of the one or more additional salts added to a liquid stream comprising water and at least one dissolved salt is different from the at least one dissolved salt. In some embodiments, each of the one or more additional salts added to the liquid stream is different from the at least one dissolved salt. In certain cases, at least one of the one or more additional salts added to the liquid stream is the same as the at least one dissolved salt.

In certain cases, an ultra-high-density concentrated brine stream is formed from a substantially solid material. As described in further detail herein, a system for producing a concentrated brine stream may comprise a desalination system (e.g., a desalination system configured to be transiently operated) and, optionally, a pretreatment system and/or precipitation apparatus fluidly connected to the desalination system. In certain embodiments, the pretreatment system and/or precipitation apparatus may be configured to produce a substantially solid material (e.g., a filter cake). In certain cases, the substantially solid material comprises calcium carbonate ($CaCO_3$). In some cases, a method of forming an ultra-high-density concentrated brine stream comprises the step of adding an amount of one or more acids to the substantially solid material. Non-limiting examples of suitable acids to add to the substantially solid material include hydrochloric acid (HCl) and nitric acid ($HNO_3$). According to certain embodiments, addition of hydrochloric acid to a substantially solid material comprising calcium carbonate can produce an ultra-high-density concentrated brine stream comprising dissolved calcium chloride ($CaCl_2$). In some cases, addition of hydrochloric acid to the substantially solid material can produce carbon dioxide ($CO_2$). In certain embodiments, the $CO_2$ may be collected and advantageously used to increase the alkalinity of a liquid feed stream prior to an ion removal step in a pretreatment process, reducing the amount of soda ash required. In some cases, the $CO_2$ may be used to decrease the pH of the feed stream prior to a pH adjustment step of the pretreatment process, reducing the amount of additional acid (e.g., HCl) required. In some embodiments, addition of nitric acid to a substantially solid material comprising calcium carbonate can produce an ultra-high-density concentrated brine stream comprising dissolved calcium nitrate ($Ca(NO_3)_2$).

In some embodiments, the ultra-high-density concentrated brine stream has a density (e.g., measured at about 60° F.) of at least about 11 pounds/gallon, at least about 11.5 pounds/gallon, at least about 11.7 pounds/gallon, at least about 12 pounds/gallon, at least about 12.5 pounds/gallon, at least about 13 pounds/gallon, at least about 13.2 pounds/gallon, at least about 13.5 pounds/gallon, at least about 14 pounds/gallon, at least about 14.5 pounds/gallon, at least about 15 pounds/gallon, at least about 20 pounds/gallon, or at least about 25 pounds/gallon. In certain cases, the ultra-high-density concentrated brine stream has a density (e.g., measured at about 60° F.) in the range of about 11 pounds/gallon to about 12 pounds/gallon, about 11 pounds/gallon to about 12.5 pounds/gallon, about 11 pounds/gallon to about 13 pounds/gallon, about 11 pounds/gallon to about 13.2 pounds/gallon, about 11 pounds/gallon to about 13.5 pounds/gallon, about 11 pounds/gallon to about 14 pounds/gallon, about 11 pounds/gallon to about 14.5 pounds/gallon, about 11 pounds/gallon to about 15 pounds/gallon, about 11 pounds/gallon to about 20 pounds/gallon, about 11 pounds/gallon to about 25 pounds/gallon, about 11.5 pounds/gallon to about 12 pounds/gallon, about 11.5 pounds/gallon to about 12.5 pounds/gallon, about 11.5 pounds/gallon to about 13 pounds/gallon, about 11.5 pounds/gallon to about 13.2 pounds/gallon, about 11.5 pounds/gallon to about 13.5 pounds/gallon, about 11.5 pounds/gallon to about 14 pounds/gallon, about 11.5 pounds/gallon to about 14.5 pounds/gallon, about 11.5 pounds/gallon to about 15 pounds/gallon, about 11.5 pounds/gallon to about 20 pounds/gallon, about 11.5 pounds/gallon to about 25 pounds/gallon, about 11.7 pounds/gallon to about 12.5 pounds/gallon, about 11.7 pounds/gallon to about 13 pounds/gallon, about 11.7 pounds/gallon to about 13.2 pounds/gallon, about 11.7 pounds/gallon to about 13.5 pounds/gallon, about 11.7 pounds/gallon to about 14 pounds/gallon, about 11.7 pounds/gallon to about 14.5 pounds/gallon, about 11.7 pounds/gallon to about 15 pounds/gallon, about 11.7 pounds/gallon to about 20 pounds/gallon, about 11.7 pounds/gallon to about 25 pounds/gallon, about 12 pounds/gallon to about 12.5 pounds/gallon, about 12 pounds/gallon to about 13 pounds/gallon, about 12 pounds/gallon to about 13.2 pounds/gallon, about 12 pounds/gallon to about 13.5 pounds/gallon, about 12 pounds/gallon to about 14 pounds/gallon, about 12 pounds/gallon to about 14.5 pounds/gallon, about 12 pounds/gallon to about 15 pounds/gallon, about 12 pounds/gallon to about 20 pounds/gallon, about 12 pounds/gallon to about 25 pounds/gallon, about 12.5 pounds/gallon to about 13 pounds/gallon, about 12.5 pounds/gallon to about 13.2 pounds/gallon, about 12.5 pounds/gallon to about 13.5 pounds/gallon, about 12.5 pounds/gallon to about 14 pounds/gallon, about 12.5 pounds/gallon to about 14.5 pounds/gallon, about 12.5 pounds/gallon to about 15 pounds/gallon, about 12.5 pounds/gallon to about 20 pounds/gallon, about 12.5 pounds/gallon to about 25 pounds/gallon, about 13 pounds/gallon to about 13.2 pounds/gallon, about 13 pounds/gallon to about 13.5 pounds/gallon, about 13 pounds/gallon to about 14 pounds/gallon, about 13 pounds/gallon to about 14.5 pounds/gallon, about 13 pounds/gallon to about 15 pounds/gallon, about 13 pounds/gallon to about 20 pounds/gallon, about 13 pounds/gallon to about 25 pounds/gallon, about 13.5 pounds/gallon to about 14 pounds/gallon, about 13.5 pounds/gallon to about 14.5 pounds/gallon, about 13.5 pounds/gallon to about 15 pounds/gallon, about 13.5 pounds/gallon to about 20 pounds/gallon, about 13.5 pounds/gallon to about 25 pounds/gallon, about 14 pounds/gallon to about 15 pounds/gallon, about 14 pounds/gallon to about 20 pounds/gallon, about 14 pounds/gallon to about 25 pounds/gallon, about 15 pounds/gallon to about 20 pounds/gallon, about 15 pounds/gallon to about 25 pounds/gallon, or about 20 pounds/gallon to about 25 pounds/gallon. In some cases, the density of the ultra-high-density concentrated brine stream is measured at a temperature of about 120° F. or less, about 100° F. or less, about 80° F. or less, about 72° F. or less, about 68° F. or less, about 60° F. or less, about 50° F. or less, or about 40° F. or less. In some embodiments, the density of the ultra-high-density concentrated brine stream is measured at a temperature of at least about 40° F., at least about 50° F., at least about 60° F., at least about 68° F., at least about 72° F., at least about 80° F., at least about 100° F., or at least about 120° F. In some embodiments, the density of the ultra-high-density concentrated brine stream is measured at a temperature in the range of about 40° F. to about 120° F., about 40° F. to about 100° F., about 40° F. to about 80° F., about 40° F. to about 72° F., about 40° F. to about 68° F., about 40° F. to about 60° F., about 40° F. to about 50° F., about 60° F. to about 120° F., about 60° F. to about 100° F., about 60° F. to about 80° F., about 60° F. to about 72° F., or about 60° F. to about 68° F.

In some cases, the concentration of at least one dissolved salt (e.g., NaCl) in the ultra-high-density concentrated brine stream is relatively high. In certain cases, the concentration of at least one dissolved salt in the ultra-high-density concentrated brine stream is at least about 10,000 mg/L, at least about 20,000 mg/L, at least about 50,000 mg/L, at least about 80,000 mg/L, at least about 85,000 mg/L, at least about 90,000 mg/L, at least about 100,000 mg/L, at least about 150,000 mg/L, at least about 180,000 mg/L, at least about 200,000 mg/L, at least about 250,000 mg/L, at least about 270,000 mg/L, at least about 300,000 mg/L, at least about 350,000 mg/L, at least about 380,000 mg/L, at least about 400,000 mg/L, at least about 450,000 mg/L, at least about 480,000 mg/L, at least about 500,000 mg/L, at least about 600,000 mg/L, at least about 700,000 mg/L, at least about 800,000 mg/L, at least about 900,000 mg/L, at least about 1,000,000 mg/L, or at least about 1,100,000 mg/L (and/or, in certain embodiments, up to the solubility limit of the salt in the liquid stream). In some embodiments, the concentration of at least one dissolved salt in the ultra-high-density concentrated brine stream is in the range of about 10,000 mg/L to about 500,000 mg/L, about 20,000 mg/L to about 500,000 mg/L, about 50,000 mg/L to about 500,000 mg/L, about 80,000 mg/L to about 500,000 mg/L, about 85,000 mg/L to about 500,000 mg/L, about 90,000 mg/L to about 500,000 mg/L, about 100,000 mg/L to about 500,000 mg/L, about 150,000 mg/L to about 500,000 mg/L, about 180,000 mg/L to about 500,000 mg/L, about 200,000 mg/L to about 500,000 mg/L, about 250,000 mg/L to about 500,000 mg/L, about 280,000 mg/L to about 500,000 mg/L, about 300,000 mg/L to about 500,000 mg/L, about 350,000 mg/L to about 500,000 mg/L, about 380,000 mg/L to about 500,000 mg/L, about 400,000 mg/L to about 500,000 mg/L, or about 450,000 mg/L to about 500,000 mg/L, about 10,000 mg/L to about 1,100,000 mg/L, about 20,000 mg/L to about 1,100,000 mg/L, about 50,000 mg/L to about 1,100,000 mg/L, about 80,000 mg/L to about 1,100,000 mg/L, about 85,000 mg/L to about 1,100,000 mg/L, about 90,000 mg/L to about 1,100,000 mg/L, about 100,000 mg/L to about 1,100,000 mg/L, about 150,000 mg/L to about 1,100,000 mg/L, about 180,000 mg/L to about 1,100,000 mg/L, about 200,000 mg/L to about 1,100,000 mg/L, about 250,000 mg/L to about 1,100,000 mg/L, about 280,000 mg/L to about 1,100,000 mg/L, about 300,000 mg/L to about 1,100,000 mg/L, about 350,000 mg/L to about 1,100,000 mg/L, about 380,000 mg/L to about 1,100,000 mg/L, about 400,000 mg/L to about 1,100,000 mg/L, about 450,000 mg/L to about 1,100,000 mg/L, about 500,000 mg/L to about 1,100,000 mg/L, about 600,000 mg/L to about 1,100,000 mg/L, about 700,000 mg/L to about 1,100,000 mg/L, about 800,000 mg/L to about 1,100,000 mg/L, about 900,000 mg/L to about 1,100,000 mg/L or about 1,000,000 mg/L to about 1,100,000 mg/L.

In some embodiments, the ultra-high-density concentrated brine stream contains at least one dissolved salt (e.g., NaCl) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, at least about 30 wt %, at least about 35 wt %, at least about 40 wt %, at least about 50 wt %, at least about 60 wt %, or at least about 70 wt % (and/or, in certain embodiments, up to the solubility limit of the salt in the liquid stream). In some embodiments, the ultra-high-density concentrated brine stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 1 wt % to about 35 wt %, about 1 wt % to about 40 wt %, about 1 wt % to about 50 wt %, about 1 wt % to about 60 wt %, about 1 wt % to about 70 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 10 wt % to about 35 wt %, about 10 wt % to about 40 wt %, about 10 wt % to about 50 wt %, about 10 wt % to about 60 wt %, about 10 wt % to about 70 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 20 wt % to about 35 wt %, about 20 wt % to about 40 wt %, about 20 wt % to about 50 wt %, about 20 wt % to about 60 wt %, about 20 wt % to about 70 wt %, about 25 wt % to about 26 wt %, about 25 wt % to about 27 wt %, about 25 wt % to about 28 wt %, about 25 wt % to about 29 wt %, or about 25 wt % to about 30 wt %, about 25 wt % to about 35 wt %, about 25 wt % to about 40 wt %, about 25 wt % to about 50 wt %, about 25 wt % to about 60 wt %, about 25 wt % to about 70 wt %, about 30 wt % to about 40 wt %, about 30 wt % to about 50 wt %, about 30 wt % to about 60 wt %, about 30 wt % to about 70 wt %, about 40 wt % to about 50 wt %, about 40 wt % to about 60 wt %, about 40 wt % to about 70 wt %, about 50 wt % to about 60 wt %, about 50 wt % to about 70 wt %, about 60 wt % to about 70 wt %.

In some embodiments, the total dissolved salt concentration of the ultra-high-density concentrated brine stream may be relatively high. In certain cases, the total dissolved salt concentration of the ultra-high-density concentrated brine stream is at least about 50,000 mg/L, at least about 80,000 mg/L, at least about 85,000 mg/L, at least about 90,000 mg/L, at least about 100,000 mg/L, at least about 150,000 mg/L, at least about 180,000 mg/L, at least about 200,000 mg/L, at least about 250,000 mg/L, at least about 270,000 mg/L, at least about 300,000 mg/L, at least about 350,000 mg/L, at least about 380,000 mg/L, at least about 400,000 mg/L, at least about 450,000 mg/L, at least about 480,000 mg/L, at least about 500,000 mg/L, at least about 600,000 mg/L, at least about 700,000 mg/L, at least about 800,000 mg/L, at least about 900,000 mg/L, at least about 1,000,000 mg/L, or at least about 1,100,000 mg/L, or at least about 1,200,000 mg/L (and/or, in certain embodiments, up to the solubility limit of the salt in the liquid stream). In some embodiments, the total dissolved salt concentration of the ultra-high-density concentrated brine stream is in the range of about 10,000 mg/L to about 500,000 mg/L, about 50,000 mg/L to about 500,000 mg/L, about 80,000 mg/L to about 500,000 mg/L, about 85,000 mg/L to about 500,000 mg/L, about 90,000 mg/L to about 500,000 mg/L, about 100,000 mg/L to about 500,000 mg/L, about 150,000 mg/L to about 500,000 mg/L, about 180,000 mg/L to about 500,000 mg/L, about 200,000 mg/L to about 500,000 mg/L, about 250,000 mg/L to about 500,000 mg/L, about 280,000 mg/L to about 500,000 mg/L, about 300,000 mg/L to about 500,000 mg/L, about 350,000 mg/L to about 500,000 mg/L, about 380,000 mg/L to about 500,000 mg/L, about 400,000 mg/L to about 500,000 mg/L, or about 450,000 mg/L to about 500,000 mg/L, about 10,000 mg/L to about 1,200,000 mg/L, about 20,000 mg/L to about 1,200,000 mg/L, about 50,000 mg/L to about 1,200,000 mg/L, about 80,000 mg/L to about 1,200,000 mg/L, about 85,000 mg/L to about 1,200,000 mg/L, about 90,000 mg/L to about 1,200,000 mg/L, about 100,000 mg/L to about 1,200,000 mg/L, about 150,000 mg/L to about 1,200,000 mg/L, about 180,000 mg/L to about 1,200,000 mg/L, about 200,000 mg/L to about 1,200,000 mg/L, about 250,000 mg/L to about 1,200,000 mg/L, about 280,000 mg/L to about 1,200,000 mg/L, about 300,000 mg/L to about 1,200,000 mg/L, about 350,000 mg/L to about 1,200,000 mg/L, about 380,000 mg/L to about 1,200,000 mg/L, about 400,000 mg/L to about 1,200,000 mg/L, about 450,000 mg/L to about 1,200,000 mg/L, about 500,000 mg/L to about 1,200,000 mg/L, about 600,000 mg/L to about 1,200,000 mg/L, about 700,000 mg/L to about 1,200,000 mg/L, about 800,000 mg/L to about 1,200,000 mg/L, about 900,000 mg/L to about 1,200,000 mg/L or about 1,000,000 mg/L to about 1,200,000 mg/L.

In some embodiments, the ultra-high-density concentrated brine stream contains a total amount of dissolved salts of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, at least about 30 wt %, at least about 35 wt %, at least about 40 wt %, at least about 50 wt %, at least about 60 wt %, or at least about 70 wt %, or at least about 80 wt %. In some embodiments, the ultra-high-density concentrated brine stream comprises a total amount of dissolved salts in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 1 wt % to about 35 wt %, about 1 wt % to about 40 wt %, about 1 wt % to about 50 wt %, about 1 wt % to about 60 wt %, about 1 wt % to about 70 wt %, about 1 wt % to about 80 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 10 wt % to about 35 wt %, about 10 wt % to about 40 wt %, about 10 wt % to about 50 wt %, about 10 wt % to about 60 wt %, about 10 wt % to about 70 wt %, about 10 wt % to about 80 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 20 wt % to about 35 wt %, about 20 wt % to about 40 wt %, about 20 wt % to about 50 wt %, about 20 wt % to about 60 wt %, about 20 wt % to about 70 wt %, about 20 wt % to about 80 wt %, about 25 wt % to about 26 wt %, about 25 wt % to about 27 wt %, about 25 wt % to about 28 wt %, about 25 wt % to about 29 wt %, or about 25 wt % to about 30 wt %, about 25 wt % to about 35 wt %, about 25 wt % to about 40 wt %, about 25 wt % to about 50 wt %, about 25 wt % to about 60 wt %, about 25 wt % to about 70 wt %, about 25 wt % to about 80 wt %, about 30 wt % to about 40 wt %, about 30 wt % to about 50 wt %, about 30 wt % to about 60 wt %, about 30 wt % to about 70 wt %, about 30 wt % to about 80 wt %, about 40 wt % to about 50 wt %, about 40 wt % to about 60 wt %, about 40 wt % to about 70 wt %, about 40 wt % to about 80 wt %, about 50 wt % to about 60 wt %, about 50 wt % to about 70 wt %, about 50 wt % to about 80 wt %, about 60 wt % to about 70 wt %, about 60 wt % to about 80 wt %, or about 70 wt % to about 80 wt %.

According to some embodiments, a system for producing a concentrated brine stream comprises a desalination system (e.g., a desalination system configured to be transiently operated) and, optionally, a pretreatment system and/or precipitation apparatus fluidly connected to the desalination system. In certain cases, for example, a liquid feed stream comprising water and at least one dissolved salt may flow through an optional pretreatment system prior to entering a desalination system. The optional pretreatment system may optionally comprise a separation apparatus, an ion-removal apparatus, a suspended solids removal apparatus, a pH adjustment apparatus, a volatile organic material (VOM) removal apparatus, and/or a filtration apparatus. In some cases, it may be advantageous for a liquid feed stream to flow through a pretreatment system prior to flowing through a desalination system in order to remove one or more contaminants (e.g., scaling ions, suspended solids, water-immiscible materials, etc.) that may impede operation of the desalination system.

Figure 4:
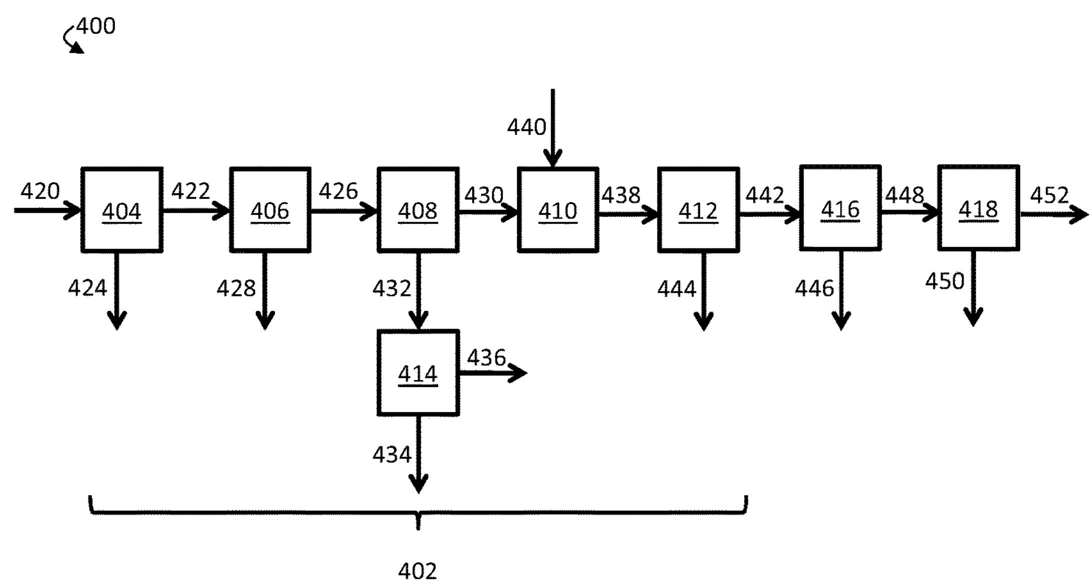
FIG. 4 shows a schematic flow diagram, according to some embodiments, of an exemplary system for producing a concentrated brine stream comprising a pretreatment system, a desalination system, and a precipitation apparatus.

FIG. 4 is a schematic diagram of exemplary system 400 for producing a concentrated brine stream, according to certain embodiments. In FIG. 4, system 400 comprises optional pretreatment system 402, desalination system 416, and optional precipitation apparatus 418. As shown in FIG. 4, pretreatment system 402 comprises optional separation apparatus 404 configured to remove at least a portion of a suspended and/or emulsified immiscible phase from a liquid stream, optional ion-removal apparatus 406 configured to remove at least a portion of at least one scale-forming ion from a liquid stream, optional suspended solids removal apparatus 408 configured to remove at least a portion of suspended solids from a liquid stream, optional pH adjustment apparatus 410 configured to adjust (i.e. increase or decrease) or maintain/stabilize (e.g. via buffering) the pH of a liquid stream, optional volatile organic material (VOM) removal apparatus 412 configured to remove at least a portion of VOM from a liquid stream, and/or optional filtration apparatus 414 configured to produce a substantially solid material. Each component of system 400 for producing a concentrated brine stream may be fluidly connected to one or more other components of system 400, either directly or indirectly. It should be noted that each of the components of system 400 shown in FIG. 4 is optional, and a system for producing a concentrated brine stream may comprise any combination of the components shown in FIG. 4.

In operation, liquid feed stream 420 comprising a suspended and/or emulsified immiscible phase, a scale-forming ion, suspended solids, and/or a volatile organic material is flowed to separation apparatus 404. Separation apparatus 404 removes at least a portion of the suspended and/or emulsified immiscible phase to produce immiscible-phase-diminished stream 422, which contains less of the immiscible phase than feed stream 420. In certain embodiments, separation apparatus 404 also produces immiscible-phase-enriched stream 424, which contains more of the immiscible phase than feed stream 420. Immiscible-phase-diminished stream 422 is then made to flow to ion-removal apparatus 406. Ion-removal apparatus 406 removes at least a portion of at least one scale-forming ion from stream 422 to produce ion-diminished stream 426, which contains less of at least one scale-forming ion than immiscible-phase-diminished stream 422. In certain embodiments, ion-removal apparatus 406 also produces ion-enriched stream 428, which contains more of at least one scale-forming ion than immiscible-phase-diminished stream 422. Ion-diminished stream 426 is then made to flow to suspended solids removal apparatus 408. Suspended solids removal apparatus 408 removes at least a portion of suspended solids from ion-diminished stream 426 to produce suspended-solids-diminished stream 430, which contains less suspended solids than ion-diminished stream 426. Optionally, suspended solids removal apparatus 408 may also produce suspended-solids-enriched stream 432, which contains more suspended solids than ion-diminished stream 426, and which may be flowed to filtration apparatus 414 to form solid stream 434 and filtered liquid stream 436. Suspended-solids-diminished stream 430 is then made to flow to pH adjustment apparatus 410. pH adjustment apparatus 410 may, in certain cases, increase or decrease the pH of stream 430 to produce pH-adjusted stream 438. In some cases, chemicals 440 (e.g., one or more acids) may be added in pH adjustment apparatus 410 to adjust (e.g., increase or decrease) or maintain/stabilize (e.g., via buffering) the pH of stream 430. pH-adjusted stream 438 is then made to flow to VOM removal apparatus 412. VOM removal apparatus 412 may remove at least a portion of VOM from pH-adjusted stream 438 to produce VOM-diminished stream 442, which contains less VOM than pH-adjusted stream 438. VOM removal apparatus 412 may also produce VOM-enriched stream 444, which contains more VOM than pH-adjusted stream 438. VOM-diminished stream 442 is then made to flow to desalination system 416, which may be configured to remove at least a portion of at least one dissolved salt from VOM-diminished stream 442. In some cases, desalination system 416 is configured to produce a substantially pure water stream 446 and a concentrated brine stream 448. In certain embodiments, at least a portion of substantially pure water stream 446 is discharged from system 400 and/or is recycled and returned to desalination system 416. In certain cases, at least a portion of concentrated brine stream 448 is made to flow to precipitation apparatus 418. Precipitation apparatus 418 may be configured such that at least a portion of the dissolved salt within concentrated brine stream 448 is precipitated within precipitation apparatus 418 to produce solid stream 450 and water-containing stream 452, which contains less dissolved salt than concentrated brine stream 448.

As shown in FIG. 4, a pretreatment system may comprise an optional separation apparatus configured to receive a liquid feed stream and remove at least a portion of a suspended and/or emulsified immiscible phase (e.g., a water-immiscible material) to produce an immiscible-phase-diminished stream, which contains less of the immiscible phase than the liquid feed stream. As used herein, a suspended and/or emulsified immiscible phase refers to a material that is not soluble in water to a level of more than 10% by weight at the temperature and under the conditions at which the separation apparatus operates. In some embodiments, the suspended and/or emulsified immiscible phase comprises oil and/or grease. As used herein, the term "oil" refers to a fluid that is generally more hydrophobic than water and is not miscible or soluble in water, as is known in the art. Thus, the oil may be a hydrocarbon in some embodiments, but in other embodiments, the oil may comprise other hydrophobic fluids.

In certain embodiments, the separation apparatus is configured to remove a relatively large percentage of water-immiscible material from the stream fed to the separation apparatus. For example, in some embodiments, the amount (in weight percentage, wt %) of at least one water-immiscible material within the immiscible-phase-diminished stream exiting the separation apparatus (e.g., stream 422 in FIG. 4) is at least about 50%, at least about 75%, at least about 90%, at least about 95%, or at least about 99% less than the amount of the at least one water-immiscible material within the stream entering the separation apparatus (e.g., stream 420 in FIG. 4). To illustrate, if the stream exiting the separation apparatus contains 5 wt % water-immiscible material, and the stream entering the separation apparatus contains 50 wt % water-immiscible material, then the stream exiting the separation apparatus contains 90% less water-immiscible than the stream entering the separation apparatus. In certain embodiments, the sum of the amounts of all water-immiscible materials within the stream exiting the separation apparatus is at least about 50%, at least about 75%, at least about 90%, at least about 95%, or at least about 99% less than the sum of the amounts of all water-immiscible materials within the stream entering the separation apparatus.

Figure 5:
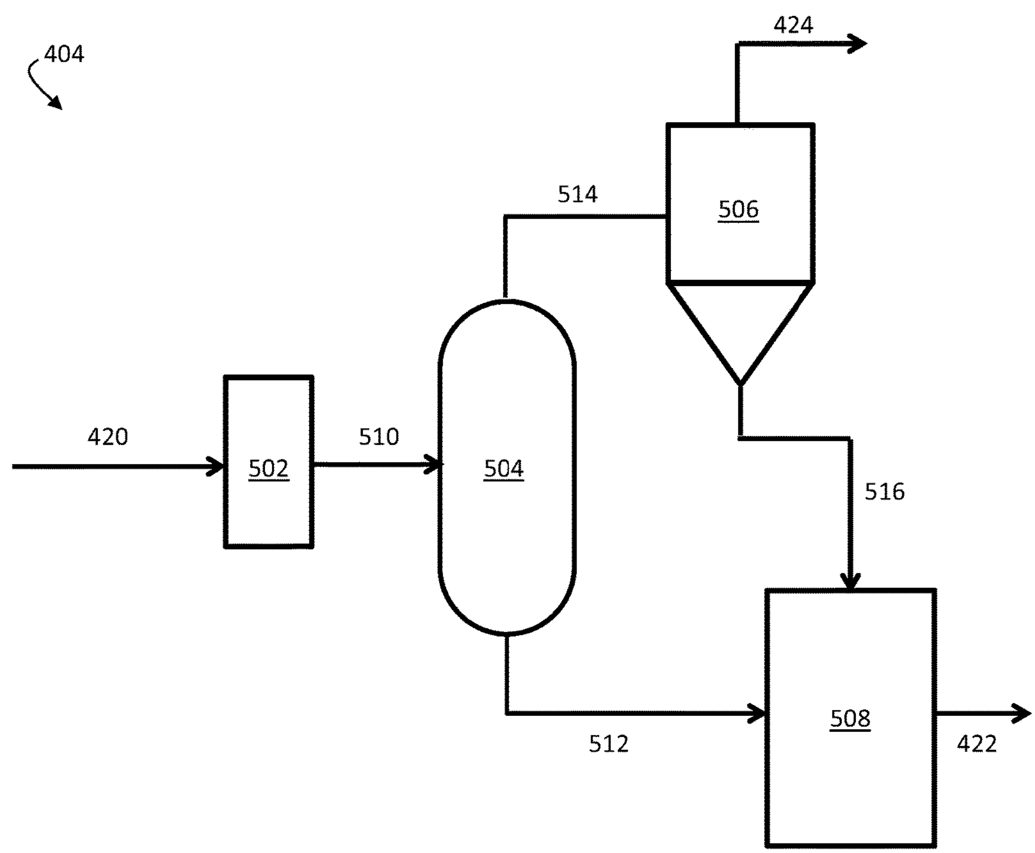
FIG. 5 shows a schematic flow diagram of an exemplary separation apparatus, according to some embodiments.

In some embodiments, the separation apparatus comprises one or more separators. FIG. 5 shows a schematic diagram of an exemplary separation apparatus. As shown in FIG. 5, separation apparatus 404 comprises optional strainer 502, primary separator 504, optional secondary separator 506, and optional tank 508. In operation, liquid feed stream 420 (e.g., corresponding to liquid feed stream 420 in FIG. 4) flows through optional strainer 502. Strainer 502 may be configured to prevent particles having a certain size from passing through strainer 502 to primary separator 504. Liquid stream 510, which is the portion of liquid feed stream 420 that passes through strainer 502, may then flow to primary separator 504. In primary separator 504, water may be substantially separated from a suspended and/or emulsified immiscible phase to produce first immiscible-phase-diminished stream 512, which contains less of the suspended and/or emulsified immiscible phase than stream 510, and first immiscible-phase-enriched stream 514, which contains more of the suspended and/or emulsified immiscible phase than stream 510. Immiscible-phase-diminished stream 512 may flow to tank 508.

In some cases, immiscible-phase-enriched stream 514 may flow to optional secondary separator 506. In secondary separator 506, any water remaining in stream 514 may be separated from the suspended and/or emulsified immiscible phase to produce second immiscible-phase-diminished stream 516 and second immiscible-phase-enriched stream 424. Second immiscible-phase-enriched stream 424 may be discharged from separation apparatus 404, and second immiscible-phase-diminished stream 516 may be flowed to tank 508. Immiscible-phase-diminished stream 422 formed by combining streams 512 and 516 may then be discharged from separation apparatus 404. In some embodiments, immiscible-phase-diminished stream 422 is made to flow to another component of pretreatment system 402 (e.g., ion-removal apparatus 406, suspended solids removal apparatus 408, pH adjustment apparatus 410, VOM removal apparatus 412). Alternatively, in some embodiments, at least a portion of immiscible-phase-diminished stream 422 is discharged from pretreatment system 402 and made to flow to desalination system 416.

The primary separator of a separation apparatus may be any type of separator known in the art. In some cases, the primary separator at least partially separates a portion of a suspended and/or emulsified immiscible phase from an aqueous stream via gravity, centrifugal force, adsorption, and/or a physical barrier. According to certain embodiments, the primary separator comprises an induced gas flotation (IGF) separator, a dissolved gas flotation (DGF) separator, a hydrocyclone (e.g., a de-oiling hydrocyclone), a corrugated plate interceptor, an adsorption media filter, a coalescing media filter, a membrane filter, a gravity separator (e.g., an American Petroleum Institute (API) separator), and/or a skimmer.

According to certain embodiments, the primary separator is an induced gas flotation (IGF) separator. An IGF separator generally refers to a device configured to introduce bubbles of a gas into a volume of a liquid, where the gas bubbles adhere to particles (e.g., droplets of water-immiscible material, small solid particles) within the liquid volume and cause the particles to float to the surface of the liquid volume. In a particular embodiment, the gas is air, and the IGF separator is referred to as an induced air flotation (IAF) separator. Other examples of suitable gases include, but are not limited to, carbon dioxide ($CO_2$), nitrogen ($N_2$), and/or natural gas. In some cases, use of an IGF separator may be associated with certain advantages, such as removing at least a portion of one or more VOMs and/or one or more dissolved gases (e.g., hydrogen sulfide).

In some embodiments, the separation apparatus further comprises a secondary separator fluidly connected to the primary separator. In some cases, the secondary separator is configured to remove at least a portion of a suspended and/or emulsified immiscible phase from an immiscible-phase-enriched stream received from the primary separator. The secondary separator may be any type of separator known in the art. In some cases, the secondary separator at least partially separates a portion of a suspended and/or emulsified immiscible phase from an aqueous stream via gravity, centrifugal force, adsorption, and/or a physical barrier. For example, the secondary separator may comprise a dissolved gas flotation (DGF) separator, a gravity separator (e.g., an API separator), an induced gas flotation (IGF) separator, a hydrocyclone (e.g., a de-oiling hydrocyclone), a corrugated plate interceptor, an adsorption media filter, a coalescing media filter, a membrane filter, and/or a skimmer.

According to certain embodiments, the secondary separator comprises a dissolved gas flotation (DGF) separator. A DGF separator generally refers to a device configured to dissolve a gas into a liquid volume. In some cases, the gas may be dissolved in the liquid volume through the generation of very high pressure zones. In certain embodiments, the dissolved gas may precipitate as small gas bubbles (e.g., having an average diameter of about 10 microns or less). In some embodiments, the small gas bubbles nucleate on particles (e.g., droplets of water-immiscible material, suspended solid particles), and the bubbles and associated particles float to the surface of the liquid volume. In certain embodiments, the gas is air, and the DGF separator is referred to as a dissolved air flotation (DAF) separator. In certain cases, the density of air bubbles in a liquid volume is relatively low. In some cases, the relatively low density of air bubbles advantageously increases the rate of buoyancy-driven separation between water and water-immiscible materials.

In some embodiments, the secondary separator comprises a gravity separator. For example, in certain cases, the gravity separator comprises a settling tank. In certain embodiments, water and water-immiscible material in a stream received by the gravity separator (e.g., an immiscible-phase-enriched stream) may be at least partially physically separated within the settling tank. In some cases, for example, water present in the stream received by the gravity separator may settle at the bottom of a settling tank, while water-immiscible material may float to the top of the settling tank. In certain embodiments, this separation may be at least partially attributed to differences in the specific gravity of water and the water-immiscible material. In certain cases, at least a portion of the water-immiscible material (e.g., oil, grease) may be recovered from the settling tank. The water-immiscible material may subsequently be stored and/or transported off-site.

In some embodiments, water recovered from the stream received by the secondary separator may be combined with the immiscible-phase-diminished stream produced by the primary separator. In certain cases, the immiscible-phase-diminished streams produced by the primary and/or secondary separator may be made to flow to one or more buffer tanks and/or storage tanks. In certain cases, the immiscible-phase-diminished streams may be made to flow to other components of a pretreatment system (e.g., ion-removal apparatus, suspended solids removal apparatus, pH adjustment apparatus, VOM removal apparatus). In some cases, the immiscible-material-diminished streams may be made to flow to a desalination system.

In some embodiments, the primary separator and/or secondary separator may be configured to remove droplets of the immiscible phase having relatively small diameters. In certain embodiments, the primary separator and/or secondary separator are configured to remove droplets of the immiscible phase having a diameter of about 200 microns or less, about 150 microns or less, about 100 microns or less, about 50 microns or less, about 20 microns or less, about 10 microns or less, about 5 microns or less, or about 1 micron or less. In certain cases, the primary separator and/or secondary separator are configured to remove droplets of the immiscible phase having an average diameter of at least about 1 micron, at least about 5 microns, at least about 10 microns, at least about 20 microns, at least about 50 microns, at least about 100 microns, at least about 150 microns, or at least about 200 microns. Combinations of the above-noted ranges (e.g., about 1 micron to about 200 microns, about 1 micron to about 100 microns, about 1 micron to about 50 microns, about 1 micron to about 10 microns) are also possible.

In some embodiments, the separation apparatus comprises one or more additional components. According to some embodiments, the separation apparatus further comprises an optional strainer positioned upstream of the primary separator and/or the secondary separator. A strainer generally refers to a device configured to prevent the passage of particles having a certain size through the strainer. In some embodiments, the strainer is configured to prevent the passage of particles having an average diameter of at least about 0.1 mm, at least about 0.5 mm, at least about 1 mm, at least about 2 mm, at least about 5 mm, at least about 10 mm, at least about 15 mm, or at least about 20 mm. Non-limiting examples of suitable strainers include basket strainers, duplex basket strainers (e.g., twin basket strainers), Y-strainers, T-strainers, inline strainers, automatic self-cleaning strainers, plate strainers (e.g., expanded cross-section strainers), scraper strainers, and/or magnetic strainers.

In some embodiments, the separation apparatus further comprises one or more optional buffer tanks. In some embodiments, one or more buffer tanks are positioned between the primary separator and/or secondary separator and other components of a pretreatment system.

In certain cases, the separation apparatus further comprises one or more additional separators. In some embodiments, the one or more separators are positioned upstream of the primary separator. The one or more upstream separators may be any type of separator known in the art. In some embodiments, the one or more upstream separators at least partially separate the suspended and/or emulsified immiscible phase from water via gas flotation, gravity, centrifugal force, adsorption, and/or a physical barrier. In some embodiments, the one or more upstream separators comprise a gravity separator (e.g., an American Petroleum Institute (API) separator), an IGF separator, a DGF separator, a hydrocyclone (e.g., a de-oiling hydrocyclone), a corrugated plate interceptor, an adsorption media filter, a coalescing media filter, and/or a membrane filter.

In certain embodiments, the one or more upstream separators comprise a gravity separator. In some cases, the gravity separator is an American Petroleum Institute (API) separator. An API separator generally refers to a separator configured to separate water and water-immiscible material based on the specific gravity difference between water and the water-immiscible material (e.g., through settling). In some cases, an API separator may be used to separate relatively large amounts of water and water-immiscible material. In certain embodiments, an API separator comprises coalescing media. In some cases, an API separator comprises parallel plates. In certain embodiments, the presence of parallel plates in the API separator may advantageously reduce the residence time required for separation by settling in the API separator.

It should be noted that the primary separator, optional secondary separator, and/or one or more optional upstream separators may be the same type of separator or different types of separators.

According to certain embodiments, the pretreatment system can comprise an optional ion-removal apparatus. The ion-removal apparatus can be configured to remove at least a portion of at least one scale-forming ion from an input stream received by the ion-removal apparatus to produce an ion-diminished stream. Generally, the ion-diminished stream contains less of the scale-forming ion (e.g., a scale-forming cation and/or a scale-forming anion) relative to the input stream received by the ion-removal apparatus. The use of the ion-removal apparatus to remove scale-forming ions can reduce the level of scaling within unit operations downstream of the ion-removal apparatus (e.g., a desalination system). In certain embodiments, the ion-removal apparatus removes at least a portion of at least one scale-forming ion while allowing a dissolved salt (e.g., a dissolved monovalent salt) to remain dissolved in the aqueous stream transported out of the ion-removal apparatus.

The ion-removal apparatus can be configured to remove any scale-forming ion that is desired to be removed. Those of ordinary skill in the art are familiar with scale-forming ions, which are ions that tend to form solid scale when present in concentrations exceeding their solubility levels. In some cases, at least one scale-forming ion is a scale-forming cation (e.g., a multivalent cation). Non-limiting examples of scale-forming cations include $Mg^{2+}$, $Ca^{2+}$, $Sr^{2+}$, and $Ba^{2+}$. In some cases, at least one scale-forming ion is a scale-forming anion (e.g., a multivalent anion). Non-limiting examples of scale-forming anions include carbonate anions ($CO_3^{2-}$), bicarbonate anions ($HCO_3^-$), sulfate anions ($SO_4^{2-}$), bisulfate anions ($HSO_4^-$), and dissolved silica (e.g., $SiO_2(OH)_2^{2-}$, $SiO(OH)^{3-}$, $(SiO_3^{2-})_n$. In certain embodiments, the ion-removal apparatus is configured to remove at least a portion of at least one scale-forming ion in an aqueous feed stream while allowing a dissolved monovalent salt (e.g., NaCl) to remain dissolved in the aqueous stream transported out of the ion-removal apparatus.

In some instances, the scale-forming ions that are removed from the liquid feed stream using the ion-removal apparatus may be sparingly soluble (e.g., having a solubility of less than about 1 gram per 100 grams of water, less than about 0.1 grams per 100 grams of water, or less than about 0.01 grams per 100 grams of water (or lower) at 20° C.). Therefore, according to some embodiments, such scale-forming ions may be prone to scaling within various parts of a pretreatment system and/or a desalination system. Examples of sparingly soluble salts containing scale-forming ions include, but are not limited to, calcium carbonate ($CaCO_3$), which has a solubility of about 0.000775 grams per 100 grams of water at 20° C.; calcium sulfate ($CaSO_4$), which has a solubility of about 0.264 grams per 100 grams of water at 20° C.; magnesium hydroxide ($Mg(OH)_2$), which has a solubility of about 0.0009628 grams per 100 grams of water at 20° C.; and barium sulfate ($BaSO_4$), which has a solubility of about 0.000285 grams per 100 grams of water at 20° C. The ion-removal apparatus can be configured, according to certain embodiments, such that removal of the scale-forming ions inhibits or prevents scaling of solid salts comprising the scale-forming ions during operation of the pretreatment system and/or the desalination system.

In certain embodiments, the ion-removal apparatus is configured to remove a relatively large percentage of the dissolved scale-forming ions from the feed stream. According to certain embodiments, the ion-removal apparatus can be configured to produce an ion-diminished stream in which the concentration, in milligrams per liter, of at least one scale-forming ion (e.g., $Ca^{2+}$) within the ion-diminished stream (e.g., stream 426 in FIG. 4) is about 750 mg/L or less, about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.1 mg/L or less, or about 0 mg/L. In some embodiments, the concentration of at least one scale-forming ion within the ion-diminished stream is in the range of about 0 mg/L to about 750 mg/L, about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, or about 0 mg/L to about 1 mg/L. In some embodiments, the ion-diminished stream is substantially free of at least one scale-forming ion.

In some embodiments, the ion-removal apparatus is configured to produce an ion-diminished stream in which the total concentration, in milligrams per liter, of scale-forming ions within the ion-diminished stream is about 2600 mg/L or less, about 2500 mg/L or less, about 2000 mg/L or less, about 1800 mg/L or less, about 1500 mg/L or less, about 1000 mg/L or less, about 900 mg/L or less, about 800 mg/L or less, about 700 mg/L or less, about 600 mg/L or less, about 500 mg/L or less, about 200 mg/L or less, about 100 mg/L or less, 50 mg/L or less, about 20 mg/L or less, about 10 mg/L or less, about 5 mg/L or less, about 2 mg/L or less, about 1 mg/L or less, about 0.1 mg/L or less, or about 0 mg/L. In some embodiments, the total concentration of scale-forming ions within the ion-diminished stream is in the range of about 0 mg/L to about 2600 mg/L, about 0 mg/L to about 2500 mg/L, about 0 mg/L to about 2000 mg/L, about 0 mg/L to about 1800 mg/L, about 0 mg/L to about 1500 mg/L, about 0 mg/L to about 1000 mg/L, about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 20 mg/L, about 0 mg/L to about 10 mg/L, about 0 mg/L to about 5 mg/L, about 0 mg/L to about 2 mg/L, or about 0 mg/L to about 1 mg/L. In some embodiments, the ion-diminished stream exiting the ion-removal apparatus is substantially free of scale-forming ions.

In certain embodiments, the ion-removal apparatus is configured to produce an ion-diminished stream in which the concentration, in moles per liter (i.e., molarity), of at least one scale-forming ion within the stream exiting the ion-removal apparatus (e.g., stream 426 in FIG. 4) is at least about 50%, at least about 75%, at least about 90%, at least about 95%, or at least about 99% less than the concentration of the at least one scale-forming ion within the stream entering the ion-removal apparatus (e.g., stream 422 in FIG. 4). In certain embodiments, the sum of the concentrations, in moles per liter, of all scale-forming ions within the stream exiting the ion-removal apparatus is at least about 50%, at least about 75%, at least about 90%, at least about 95%, or at least about 99% less than the sum of the concentrations of all scale-forming ions within the stream entering the ion-removal apparatus.

A variety of types of ion-removal apparatuses may be used in the embodiments described herein. In some embodiments, the ion-removal apparatus comprises an ion-removal medium, which can be contained, for example, within a vessel. In some embodiments, the ion-removal apparatus comprises a chemical ion-removal apparatus. According to certain embodiments, the chemical ion-removal apparatus comprises one or more ion-removal compositions configured to induce precipitation of at least one scale-forming ion. For example, the chemical ion-removal apparatus can be configured to remove at least one ion using caustic soda (e.g., NaOH), soda ash (e.g., $Na_2CO_3$), and/or a flocculent (e.g., an anionic polymer). In some embodiments, the one or more ion-removal compositions can be configured to induce precipitation of at least one scale-forming cation. For example, when caustic soda and/or soda ash are added to a stream containing $Ca^{2+}$ and/or $Mg^{2+}$, at least a portion of $Ca^{2+}$ and/or $Mg^{2+}$ contained within the stream may be precipitated as an insoluble solid such as, for example, calcium carbonate ($CaCO_3$) and/or magnesium hydroxide ($Mg(OH)_2$). Without wishing to be bound by a particular theory, the addition of caustic soda may induce precipitation of certain scale-forming cations in a stream by increasing the pH of the stream. In some cases, carbonate salts and/or hydroxide salts of the scale-forming cations have relatively low solubility at relatively high pH levels, and increasing the pH of a stream containing scale-forming cations may induce precipitation of such carbonate salts and/or hydroxide salts of the scale-forming cations. In certain embodiments, the addition of soda ash may facilitate precipitation of carbonate salts of certain scale-forming anions by providing a supply of carbonate ions. In some embodiments, the one or more ion removal compositions can be configured to induce precipitation of at least one scale-forming anion.

In some embodiments, the one or more ion removal compositions comprise a flocculent. A flocculent generally refers to a composition that causes relatively large particles to form through aggregation of smaller particles. In some embodiments, the relatively large particles may precipitate from a solution. Non-limiting examples of suitable flocculents include ferric chloride, polyaluminum chloride, activated silica, colloidal clays (e.g., bentonite), metallic hydroxides with a polymeric structure (e.g., alum, ferric hydroxide), starches and/or starch derivatives (e.g., corn starch, potato starch, anionic oxidized starches, amine-treated cationic starches), polysaccharides (e.g., guar gum), alginates, polyacrylamides (e.g., nonionic, anionic, or cationic polyacrylamides), polyethylene-imines, polyamide-amines, polyamines, polyethylene oxide, and/or sulfonated compounds. Without wishing to be bound by a particular theory, certain flocculents may form large particles (e.g., large precipitates) by enmeshing smaller particles on formation and/or entrapping smaller particles through adhesion.

According to some embodiments, the flocculent comprises a polymer. In certain cases, the flocculent may be a large-chain polymer. Without wishing to be bound by a particular theory, a large-chain polymer flocculent may facilitate the formation of large particles by adhering to a plurality of smaller particles. In some cases, a large-chain polymer flocculent facilitates the formation of large particles of increased size and/or increased mechanical strength. In certain embodiments, the flocculent is an anionic polymer flocculent. The anionic polymer flocculent may, in some cases, be used to remove scale-forming cations. In certain embodiments, the flocculent is a cationic polymer flocculent. The cationic polymer flocculent may, in some cases, be used to remove scale-forming anions.

It should be noted that mixtures of the above-mentioned ion removal compositions and/or other ion removal compositions may also be used. In addition, if two or more ion removal compositions are added to a liquid feed stream, the ion removal compositions may be added in any order. According to certain embodiments, caustic soda and a polymer flocculent (e.g., an anionic polymer flocculent) may be added to an aqueous feed stream. In certain cases, caustic soda, soda ash, and a polymer flocculent (e.g., an anionic polymer flocculent) may be added to a liquid feed stream.

In some embodiments, a chemical ion-removal apparatus comprises one or more optional reaction tanks (e.g., one reaction tank, two reaction tanks, three reaction tanks, four reaction tanks, five reaction tanks, etc.). In each reaction tank, one or more ion-removal compositions may be added to a liquid feed stream. In some embodiments, the residence time of an aqueous stream flowing through the reaction tanks may be relatively short. According to some embodiments, the residence time of an aqueous stream in at least one reaction tank is about 30 minutes or less, about 20 minutes or less, about 10 minutes or less, about 5 minutes or less, about 2 minutes or less, or about 1 minute or less. In certain embodiments, the residence time of an aqueous stream in each reaction tank is about 30 minutes or less, about 20 minutes or less, about 10 minutes or less, about 5 minutes or less, about 2 minutes or less, or about 1 minute or less. In some embodiments, one or more of the reaction tanks comprise an agitator.

In an exemplary embodiment, a chemical ion-removal apparatus comprises three reaction tanks. In the first reaction tank, a first ion-removal composition (e.g., caustic soda) may be added to a liquid feed stream to produce a first ion-diminished stream. In some cases, the first ion-diminished stream may be made to flow to the second reaction tank, and a second ion-removal composition (e.g., soda ash) and/or an additional amount of the first ion-removal composition may be added to the first ion-diminished stream to produce a second ion-diminished stream. The second ion-diminished stream may then be flowed to the third reaction tank, and a third ion-removal composition (e.g., an anionic polymer flocculent) may be added to the second ion-diminished stream to produce a third ion-diminished stream. The third ion-diminished stream may be made to flow to another unit of the pretreatment system (e.g., suspended solids removal apparatus, pH adjustment apparatus, VOM removal apparatus) for further treatment. In certain cases, the third ion-diminished stream may be discharged from the pretreatment system and, optionally, made to flow to a desalination system.

In certain embodiments, a chemical ion-removal apparatus further comprises an optional flocculation tank positioned downstream of one or more reaction tanks. According to some embodiments, the flocculation tank may comprise an agitator (e.g., a slowly-rotating, low shear agitator). In some embodiments, conditions in the flocculation tank may be selected to increase the size of precipitates formed by chemical reactions in one or more upstream reaction tanks. For example, in some cases, a low shear agitator may be configured to promote motion of precipitates within the flocculation tank. In some cases, motion of the precipitates may cause at least some of the precipitates to collide with each other and adhere to each other, resulting in the formation of larger precipitates. In some embodiments, it may be advantageous to have larger precipitates, as they may have a reduced settling time. In some embodiments, the flocculation tank has a relatively large volume. In some embodiments, the residence time of an aqueous stream in the flocculation tank is about 60 minutes or less, about 50 minutes or less, about 40 minutes or less, about 35 minutes or less, about 30 minutes or less, about 25 minutes or less, about 20 minutes or less, about 15 minutes or less, or about 10 minutes or less. In some embodiments, the residence time of an aqueous stream in the flocculation tank is in the range of about 10 minutes to about 20 minutes, about 10 minutes to about 25 minutes, about 10 minutes to about 30 minutes, about 10 minutes to about 35 minutes, about 10 minutes to about 40 minutes, about 10 minutes to about 50 minutes, about 10 minutes to about 60 minutes, about 20 minutes to about 30 minutes, about 20 minutes to about 40 minutes, about 20 minutes to about 50 minutes, or about 20 minutes to about 60 minutes, about 30 minutes to about 40 minutes, about 30 minutes to about 50 minutes, or about 30 minutes to about 60 minutes.

In certain embodiments, the ion-removal apparatus comprises an electrocoagulation apparatus. The electrocoagulation apparatus can be configured, in some embodiments, to remove at least a portion of suspended solids from the aqueous stream rather than, or in addition to, removing at least a portion of at least one scale-forming ion from the aqueous stream. Those of ordinary skill in the art are familiar with electrocoagulation, in which short wave electrolysis can be used to remove at least a portion of multivalent ions and/or suspended contaminants.

In certain embodiments, the ion-removal apparatus comprises a resin bed. The resin bed contains, according to certain embodiments, an ion-exchange resin. The resin bed can comprise, for example, an anionic selective resin bed and/or a cationic selective resin bed. In certain embodiments, the ion-removal apparatus is an ion-exchange apparatus. The ion-exchange apparatus may contain, for example, an ion-exchange medium. Those of ordinary skill in the art are familiar with the function of ion-exchange media, which generally remove at least one scale-forming ion from a solution and, in some but not all cases, replace the scale-forming ion(s) with one or more monovalent ion(s). For example, in certain embodiments, the ion-exchange medium functions by contacting the aqueous solution containing the scale-forming ion(s), after which at least a portion of the scale-forming ions are captured by the ion-exchange medium and at least a portion of the monovalent ions originally contained within the ion-exchange medium are released into the aqueous solution. In some such embodiments, the ion-exchange medium comprises an ion exchange resin.

Those of ordinary skill in the art would be capable of selecting an appropriate ion-removal medium (e.g., an ion-exchange medium or other ion-removal medium) for use in the ion-removal apparatus based upon the types of scale-forming ions dissolved in the stream fed to the ion-removal apparatus, the concentration of said ions, and the flow rate at which one desires to operate the ion-removal apparatus, among other factors. In some embodiments, a column (e.g., a packed column) can be used to perform the ion-removal operation. For example, in some embodiments, the liquid feed stream can be fed to one or more packed columns containing an ion-exchange resin or other ion-removal medium, which may be used to remove at least a portion of the scale-forming ion(s) from the liquid stream. One of ordinary skill in the art, given the present disclosure, would be capable of designing a variety of other suitable configurations for performing the ion-removal steps described herein.

In some embodiments, the pretreatment systems described herein comprise an optional suspended solids removal apparatus. The suspended solids removal apparatus can be configured, according to certain embodiments, to remove at least a portion of suspended solids from an input stream received by the suspended solids removal apparatus to produce a suspended-solids-diminished stream. Generally, the suspended solids diminished stream contains a smaller quantity of suspended solids than the input stream received by the suspended solids removal apparatus.

The suspended solids removal apparatus can be configured to remove any suspended solids that may be present in the stream fed to the suspended solids removal apparatus. According to certain embodiments, the suspended solids removal apparatus can be configured to remove particles that remain in suspension in water as a colloid or due to the motion of the water. In some embodiments, the suspended solids removal apparatus can be configured to remove dirt, precipitated salts, organic solids (e.g., pathogens such as bacteria, Giardia, and the like), and/or any other solid material. In some embodiments, the suspended solids that are removed by the suspended solids removal apparatus comprise particulate solids.

In certain embodiments, the suspended solids removal apparatus is configured to remove a relatively large percentage of the suspended solids from the stream fed to the suspended solids removal apparatus. For example, in some embodiments, the amount (in weight percentage, wt %) of at least one suspended solid material within the stream exiting the suspended solids removal apparatus (e.g., stream 430 in FIG. 4) is at least about 50%, at least about 75%, at least about 90%, at least about 95%, or at least about 99% less than the amount of the at least one suspended solid material within the stream entering the suspended solids removal apparatus (e.g., stream 426 in FIG. 4). In certain embodiments, the sum of the amounts of all suspended solid materials within the stream exiting the suspended solids removal apparatus is at least about 50%, at least about 75%, at least about 90%, at least about 95%, or at least about 99% less than the sum of the amounts of all suspended solid materials within the stream entering the suspended solids removal apparatus.

A variety of types of devices may be used in the suspended solids removal apparatuses described herein. In some embodiments, the suspended solids removal apparatus comprises a filter, a gravity settler, and/or a coagulant-induced flocculator. A filter generally refers a device configured to inhibit passage of certain materials (e.g., particles of a certain size) from one side of the device to the other side of the device. A gravity settler generally refers to a device that promotes separation of suspended solids from a liquid through gravity (e.g., a settling tank). A coagulant-induced flocculator generally refers to a device in which a coagulant is added to a volume of liquid to induce flocculation. Non-limiting examples of coagulants include ferric chloride, alum, ferrous sulfate, ferric sulfate, ferric chloride, cationic polymer, calcium hydroxide (e.g., lime), calcium oxide (e.g., quicklime), sodium aluminate, ferric aluminum chloride, ferric chloride sulfate, magnesium carbonate, aluminum chlorohydrate, polyaluminum chloride, polyaluminum sulfate chloride, polyaluminum silicate chloride, forms of polyaluminum chloride with organic polymers, polyferric sulfate and ferric salts with polymers, and/or polymerized aluminum-iron blends.

According to some embodiments, the gravity settler comprises a clarifier. A clarifier generally refers to a tank (e.g., a settling tank) that is configured for substantially continuous removal of solids. In some embodiments, the clarifier is an inclined-plate clarifier (e.g., a lamella clarifier). An inclined-plate clarifier generally refers to a device comprising a plurality of inclined plates. In operation, a liquid stream may enter the inclined-plate clarifier, and solid particles may begin to settle on one or more of the inclined plates. In some cases, when a solid particle settles on an inclined plate, it adheres to other particles that have settled on the plate, and the particles slide down the inclined plate to the bottom of the clarifier, where they are collected as a solid-containing stream. In some embodiments, the solid-containing stream may be transported to a filtration apparatus, as described in further detail herein. In certain embodiments, the remaining water may exit the clarifier as a suspended-solids-diminished stream.

According to some embodiments, the suspended solids removal apparatus comprises a filter. In some embodiments, the filter is a polishing filter. A polishing filter generally refers to a filter configured to prevent passage of relatively small particles and/or remove low concentrations of dissolved material. Examples of a suitable polishing filter include, but are not limited to, a granular bed filter (e.g., a media filter) and a bag filter. A granular bed filter refers to a filter that comprises one or more types of granular filtration media (e.g., sand, crushed anthracite coal, garnet sand, granular activated carbon, diatomaceous earth medium). In some embodiments, the polishing filter is configured to remove particles having an average diameter of at least about 0.1 micron, at least about 0.5 microns, at least about 1 micron, at least about 2 microns, at least about 5 microns, at least about 10 microns, at least about 15 microns, at least about 20 microns, or at least about 25 microns.

In certain embodiments, the pretreatment system comprises an optional pH adjustment apparatus configured to receive an input stream comprising scale-forming ions and to adjust (e.g., increase or decrease) or maintain/stabilize (e.g., via buffering) the pH of the input stream to produce a pH-adjusted stream. In certain embodiments, adjusting or maintaining/stabilizing the pH of the input stream can be performed without dissolving any particles that precipitated (e.g., due to addition of an ion-removal composition in the ion-removal apparatus). In some embodiments, the pH-adjusted stream has a pH in the range of about 6 to about 8, about 6.5 to about 7.5, about 6.8 to about 7.2, or about 6.9 to about 7.1. In some embodiments, the pH-adjusted stream has a pH of about 7.0.

In some embodiments, the pH adjustment apparatus is configured to reduce the pH of the aqueous input stream. In certain cases, reducing the pH of the aqueous input stream can be performed in order to inhibit scale-forming ions from precipitating. In some embodiments, the pH of an aqueous feed stream may be reduced by adding a pH-adjusting composition to the feed stream. For example, in certain embodiments, an acid may be added to the feed stream to reduce the pH of the stream. Non-limiting examples of suitable acids include hydrochloric acid, sulfuric acid, phosphoric acid, nitric acid, and/or maleic acid. In some embodiments, a base may be added to the feed stream to increase the pH of the stream. Non-limiting examples of suitable bases include caustic soda, potassium hydroxide, carbon dioxide, calcium hydroxide (e.g., lime), and/or calcium oxide (e.g., quicklime).

As shown in FIG. 4, the pH of input stream 430 can be reduced by adding chemicals via stream 440, according to some embodiments. For example, an acidic composition can be added to pH adjustment apparatus 410 to reduce the pH of stream 430, in certain embodiments. The pH adjustment apparatus may be fluidly connected to one or more other unit operations of system 400, either directly or indirectly.

In some embodiments, the pH adjustment apparatus comprises one or more reaction tanks. The reaction tanks may be configured to facilitate the reaction of an aqueous stream and one or more reagents (e.g., a pH adjustment composition). In some cases, for example, one or more reaction tanks comprise a pH adjustment composition inlet and/or an agitator. In some cases, one or more reaction tanks comprise one or more pH sensors. In certain embodiments, one or more reaction tanks comprise two or more pH sensors. In certain cases, the pH adjustment apparatus further comprises a pH adjustment composition tank fluidly connected (e.g., directly fluidly connected) to one or more reaction tanks. The pH adjustment composition tank may, for example, be configured to contain an amount of the pH adjustment composition. In some cases, the pH adjustment composition may comprise an acid (e.g., a strong acid) or a base (e.g., a strong base) having a relatively high concentration. In some cases, the pH adjustment composition tank may be a single-walled tank. In some cases, the pH adjustment composition tank may be a double-walled tank. It may be advantageous, in some cases, for the pH adjustment composition tank to be double-walled to reduce the risk of injury in the case of a leak. For example, a leak in a first wall of a double-walled tank may be contained by the second wall of the double-walled tank. In some cases, the pH adjustment system further comprises a vapor containment system fluidically connected to the pH adjustment composition tank. In some cases, the vapor containment system may comprise a water-containing tank. In certain cases, the water-containing tank may comprise an amount of water, and vapor from the pH adjustment composition tank may be bubbled through the water of the water-containing tank. The pH adjustment apparatus may further comprise one or more conduits connecting various components of the pH adjustment apparatus. In some cases, one or more conduits (e.g., conduits connecting the pH adjustment composition tank and one or more reaction tanks) may be double-walled.

In certain embodiments, the pretreatment system comprises an optional volatile organic material (VOM) removal apparatus. The VOM removal apparatus can be configured to remove at least a portion of VOM from an input stream received by the VOM removal apparatus to produce a VOM-diminished stream. Generally, the VOM-diminished stream contains VOM in an amount that is less that the amount of VOM in the input stream received by the VOM removal apparatus.

The term "volatile organic material" or "VOM" is used herein to describe organic materials that at least partially evaporate at 25° C. and 1 atmosphere. In certain embodiments, the volatile organic material has a boiling point of less than or equal to 450° C. at 1 atmosphere. VOM includes volatile organic compounds (VOCs) and semi-volatile organic compounds (SVOCs). Examples of VOCs that can be at least partially removed by the VOM removal apparatus include, but are not limited to, acetone; 1,1,1,2-tetrachloroethane; 1,1,1-trichloroethane; 1,1,2,2-tetrachloroethane; 1,1,2-trichloroethane; 1,1-dichloroethane; 1,1-dichloroethene; 1,1-dichloropropene; 1,2,3-trichlorobenzene; 1,2,3-trichloropropane; 1,2,4-trichlorobenzene; 1,2,4-trimethylbenzene; 1,2-dibromo-3-chloropropane; 1,2-dibromoethane; 1,2-dichlorobenzene; 1,2-dichloroethane; 1,2-dichloropropane; 1,3,5-trimethylbenzene; 1,3-dichlorobenzene; 1,3-dichloropropane; 1,4-dichlorobenzene; 2,2-dichloropropane; 2-butanone; 2-chloroethyl vinyl ether; 2-chlorotoluene; 2-hexanone; 4-chlorotoluene; 4-methyl-2-pentanone; benzene; bromobenzene; bromochloromethane; bromodichloromethane; bromoform; carbon disulfide; carbon tetrachloride; chlorobenzene; chloroethane; chloroform; cis-1,2-dichloroethene; cis-1,3-dichloropropene; dibromochloromethane; dibromomethane; dichlorodifluoromethane; ethylbenzene; hexachlorobutadiene; isopropylbenzene; m-xylenes; p-xylenes; bromomethane; chloromethane; methylene chloride; n-butylbenzene; n-propylbenzene; naphthalene; o-xylene; p-isopropyltoluene; sec-butylbenzene; styrene; tert-butylbenzene; tetrachloroethene; toluene; trans-1,2-dichloroethene; trans-1,3-dichloropropene; trichloroethene; trichlorofluoromethane; vinyl acetate; and vinyl chloride. Examples of SVOCs that can be at least partially removed by the VOM removal apparatus include, but are not limited to, 2,4,5-trichlorophenol; 2,4,6-trichlorophenol; 2,4-dichlorophenol; 2,4-dimethylphenol; 2,4-dinitrophenol; 2,4-dinitrotoluene; 2,6-dinitrotoluene; 2-chloronaphthalene; 2-chlorophenol; 2-methylnaphthalene; 2-methylphenol; 2-nitroaniline; 2-nitrophenol; 3,3'-dichlorobenzidine; 3-nitroaniline; 4,6-dinitro-2-methylphenol; 4-bromophenyl phenyl ether; 4-chloro-3-methylphenol; 4-chloroaniline; 4-chlorophenyl phenyl ether; 3 & 4-methylphenol; 4-nitroaniline; 4-nitrophenol; acenaphthene; acenaphthylene; anthracene; benzo(a)anthracene; benzo(a)pyrene; benzo(b)fluoranthene; benzo(g,h,i)perylene; benzo(k)fluoranthene; benzoic acid; benzyl alcohol; bis(2-chloroethoxy)methane; bis(2-chloroethyl)ether; bis(2-chloroisopropyl)ether; bis(2-ethylhexyl)phthalate; butyl benzyl phthalate; chrysene; di-n-butyl phthalate; di-n-octyl phthalate; dibenz(a,h)anthracene; dibenzofuran; diethyl phthalate; dimethyl phthalate; fluoranthene; fluorene; hexachlorobenzene; hexachlorocyclopentadiene; hexachloroethane; indeno(1,2,3-cd)pyrene; isophorone; n-nitroso-di-n-propylamine; n-nitrosodiphenylamine; nitrobenzene; pentachlorophenol; phenanthrene; phenol; and pyrene.

In certain embodiments, the VOM removal apparatus is configured to remove a relatively large percentage of the VOM from the stream fed to the VOM removal apparatus. For example, in some embodiments, the amount (in weight percentage, wt %) of at least one VOM within the stream exiting the VOM removal apparatus (e.g., stream 442 in FIG. 4) is at least about 50%, at least about 75%, at least about 90%, at least about 95%, or at least about 99% less than the amount of the at least one VOM within the stream entering the VOM removal apparatus (e.g., stream 438 in FIG. 4). In certain embodiments, the sum of the amounts of all VOM within the stream exiting the VOM removal apparatus is at least about 50%, at least about 75%, at least about 90%, at least about 95%, or at least about 99% less than the sum of the amounts of all VOM within the stream entering the VOM removal apparatus. The VOM removal apparatus may be fluidly connected to one or more other unit operations of the pretreatment system, desalination system, and/or precipitation apparatus, either directly or indirectly.

A variety of types of VOM removal apparatuses may be used in the embodiments described herein. In some embodiments, the VOM removal apparatus comprises a carbon bed filter and/or an air stripper. In some embodiments, the air stripper comprises a packed bed stripper, a low-profile air stripper, and/or an aeration stripper. In certain embodiments, the carbon bed comprises activated carbon.

According to some embodiments, the pretreatment system comprises an optional filtration apparatus. In some embodiments, the filtration apparatus may be configured to remove at least a portion of water from a solid-containing stream to form a substantially solid material and a filtered liquid stream. The substantially solid material may, in some cases, comprise at least a portion of a precipitated salt (e.g., a monovalent salt, a divalent salt). In certain embodiments, the substantially solid material may be a filter cake. In some embodiments, the filter cake may comprise a plurality of solid particles, wherein at least a portion of the solid particles are in direct contact with another solid particle. In certain cases, at least about 60%, at least about 70%, at least about 80%, at least about 90%, at least about 95%, or at least about 99% of the solid particles in the filter cake are in direct contact with another solid particle. In some cases, the filter cake has a relatively low liquid content. In some embodiments, the filter cake has a liquid content of about 90 wt % or less, about 85 wt % or less, about 80 wt % or less, about 75 wt % or less, about 70 wt % or less, about 65 wt % or less, about 60 wt % or less, about 55 wt % or less, about 50 wt % or less, about 40 wt % or less, about 30 wt % or less, about 25 wt % or less, about 20 wt % or less, about 15 wt % or less, or about 10 wt % or less. In certain embodiments, the filter cake has a liquid content in the range of about 10 wt % to about 90 wt %, about 10 wt % to about 85 wt %, about 10 wt % to about 80 wt %, about 10 wt % to about 75 wt %, about 10 wt % to about 70 wt %, about 10 wt % to about 60 wt %, about 10 wt % to about 55 wt %, about 10 wt % to about 50 wt %, about 10 wt % to about 40 wt %, about 10 wt % to about 30 wt %, or about 10 wt % to about 20 wt %.

In some cases, the filtration apparatus comprises a filter (e.g., a vacuum drum filter or a filter press) configured to at least partially separate a precipitated salt from the remainder of a suspension containing the precipitated salt (e.g., a solid-containing stream). In some such embodiments, at least a portion of the liquid within the solid-containing stream can be transported through the filter, leaving behind solid precipitated salt (e.g., a filter cake). As one non-limiting example, a Larox FP 2016-8000 64/64 M40 PP/PP Filter (Outotec, Inc.) may be used as the filter. The filter may comprise, in certain embodiments, a conveyor filter belt which filters the salt from a suspension containing the salt. In some cases, for example, the filtration apparatus may be fluidly connected (e.g., fluidly directly connected) to the suspended solids removal apparatus. For example, in certain embodiments, a solid-containing stream may be flowed (e.g., pumped) from the suspended solids removal apparatus (e.g., a clarifier) to the filtration apparatus.

In some embodiments, a solid-containing stream from the suspended solids removal apparatus may be pumped to the filtration apparatus by one or more pumps (e.g., air diaphragm pumps). In certain embodiments, the one or more pumps may initially pump at a relatively low pressure and may automatically increase the pressure as flow rate drops due to collection of solids in the filtration apparatus. In some cases, such a process may be advantageous. For example, in embodiments where the filtration apparatus comprises one or more filter presses, such a process may advantageously reduce filter cloth blinding (e.g., embedding of particles in a filter cloth) and result in formation of more consistent filter cakes. In certain cases, a liquid component of the solid-containing stream may be rejoined with other liquid streams in the pretreatment system, desalination system, and/or precipitation apparatus after passing through the filtration apparatus.

In some cases, one or more buffer tanks may be positioned between the suspended solids removal apparatus and the filtration apparatus. The presence of one or more buffer tanks between the suspended solids removal apparatus and the filtration apparatus may, in some cases, advantageously provide buffer volume in the event that components of the filtration apparatus (e.g., one or more filter presses) are undergoing a cleaning cycle.

In some cases, a component of the filtration apparatus (e.g., a filter press) may undergo a cleaning cycle when it is full. In certain cases, a filtration apparatus component may be considered to be full when the flow rate drops below a threshold level at a certain pumping pressure. In certain cases, when a filtration apparatus undergoes a cleaning cycle, flow may be rerouted to one or more buffer tanks to continue fluid circulation and prevent solid buildup. In some cases, the cleaning cycle begins by pumping clean brine into the filtration apparatus component to flush out soft filter cake. The filtration apparatus component may then be blown down. In some cases, the filter cake may be dried. For example, in certain cases, the filter cake may be air dried by blowing compressed air through the cake. It may be advantageous in some cases for the filter cake to be air dried in order to reduce its liquid content. In some cases, compacted filter cake may be stored and/or disposed (e.g., in a dumpster).

Various of the unit operations described herein can be "directly fluidly connected" to other unit operations and/or components. As used herein, a direct fluid connection exists between a first unit operation and a second unit operation (and the two unit operations are said to be "directly fluidly connected" to each other) when they are fluidly connected to each other and the composition of the fluid does not substantially change (i.e., no fluid component changes in relative abundance by more than 5% and no phase change occurs) as it is transported from the first unit operation to the second unit operation. As an illustrative example, a stream that connects first and second unit operations, and in which the pressure and temperature of the fluid is adjusted but the composition of the fluid is not altered, would be said to directly fluidly connect the first and second unit operations. If, on the other hand, a separation step is performed and/or a chemical reaction is performed that substantially alters the composition of the stream contents during passage from the first component to the second component, the stream would not be said to directly fluidly connect the first and second unit operations.

It should be understood that, in embodiments in which a single unit is shown in the figures and/or is described as performing a certain function, the single unit could be replaced with multiple units (e.g., operated in parallel) performing a similar function. For example, in certain embodiments, any one or more of the separation apparatus, suspended solids removal apparatus, ion-removal apparatus, pH adjustment apparatus, VOM removal apparatus, and/or filtration apparatus could correspond to a plurality of separation apparatuses, suspended solids removal apparatuses, ion-removal apparatuses, pH adjustment apparatuses, VOM removal apparatuses, and/or filtration apparatuses (e.g., configured to be operated in parallel).

As particular examples, in some embodiments, the pretreatment system comprises a single unit that acts as both a separation apparatus and an ion-removal apparatus. In some embodiments, the system comprises a single unit that acts as both a separation apparatus and a suspended solids removal apparatus. In certain embodiments, the system comprises a single unit that acts as both a separation apparatus and a pH adjustment apparatus. In certain embodiments, the system comprises a single unit that acts as both a separation apparatus and a VOM removal apparatus. In certain embodiments, the system comprises a single unit that acts as both a separation apparatus and a filtration apparatus. As additional examples, in some embodiments, the system comprises a single unit that acts as both an ion-removal apparatus and a suspended solids removal apparatus. In certain embodiments, the system comprises a single unit that acts as both an ion-removal apparatus and a pH adjustment apparatus. In certain embodiments, the system comprises a single unit that acts as both an ion-removal apparatus and a VOM removal apparatus. In certain embodiments, the system comprises a single unit that acts as both an ion-removal apparatus and a filtration apparatus. As still further examples, in some embodiments, the system comprises a single unit that acts as both a suspended solids removal apparatus and a pH adjustment apparatus. In some embodiments, the system comprises a single unit that acts as both a suspended solids removal apparatus and a VOM removal apparatus. In some embodiments, the system comprises a single unit that acts as both a suspended solids removal apparatus and a filtration apparatus. In some embodiments, the system comprises a single unit that acts as both a pH adjustment apparatus and a VOM removal apparatus. In some embodiments, the system comprises a single unit that acts as both a pH adjustment apparatus and a filtration apparatus. In some embodiments, the system comprises a single unit that acts as both a VOM removal apparatus and a filtration apparatus. Units that perform three, four, or five of the functions outlined above are also possible. Of course, the invention is not necessarily limited to combination units, and in some embodiments, any of the separation apparatus, the suspended solids removal apparatus, the ion-removal apparatus, the pH adjustment apparatus, the VOM removal apparatus, and/or the filtration apparatus may be standalone units.

It may be advantageous, in some cases, for a system for producing a concentrated brine stream to avoid producing solid material (e.g., solid salt) or to reduce the amount of solid material produced, as it may be expensive and/or complicated to dispose of certain solid materials. According to some embodiments, approximately about 70%, about 80%, about 90%, about 95%, about 99% or about 100% by weight of the material discharged from the system for producing a concentrated brine stream is substantially a liquid or a gas. In some embodiments, the concentration of solid material is about 5000 mg/L or less, about 2000 mg/L or less, about 1500 mg/L or less, about 1000 mg/L or less, about 750 mg/L or less, about 500 mg/L or less, about 200 mg/L or less, about 100 mg/L or less, about 75 mg/L or less, about 50 mg/L or less, about 20 mg/L or less, or about 10 mg/L or less. In some embodiments, the concentration of solid material is in the range of about 10 mg/L to about 5000 mg/L, about 10 mg/L to about 2000 mg/L, about 10 mg/L to about 1500 mg/L, about 10 mg/L to about 1000 mg/L, about 10 mg/L to about 750 mg/L, about 10 mg/L to about 500 mg/L, about 10 mg/L to about 200 mg/L, about 10 mg/L to about 100 mg/L, about 10 mg/L to about 75 mg/L, about 10 mg/L to about 50 mg/L, about 0 mg/L to about 5000 mg/L, about 0 mg/L to about 2000 mg/L, about 0 mg/L to about 1500 mg/L, about 0 mg/L to about 1000 mg/L, about 0 mg/L to about 750 mg/L, about 0 mg/L to about 500 mg/L, about 0 mg/L to about 200 mg/L, about 0 mg/L to about 100 mg/L, about 0 mg/L to about 75 mg/L, about 0 mg/L to about 50 mg/L, about 0 mg/L to about 20 mg/L, or about 0 mg/L to about 10 mg/L. In some embodiments, a system for producing a concentrated brine stream may produce substantially no solid material.

In some embodiments, a transiently-operated desalination system may produce an amount of solid material. For example, in some cases, a system for producing a concentrated brine stream may produce supersaturated brines. In certain embodiments, supersaturated brines can be used to produce solid salt. In certain cases, it may be advantageous for a system to produce solid salt, as it may be easier to dispose of solid salt than certain liquid and/or gas products.

In some embodiments, the system for producing a concentrated brine stream comprises a precipitation apparatus. In some cases, the precipitation apparatus is fluidly connected to a desalination system and is configured to receive a concentrated brine stream from the desalination system. The precipitation apparatus is, in certain embodiments, configured to precipitate at least a portion of the dissolved salt from the concentrated brine stream to produce a product stream containing less of the dissolved salt relative to the concentrated brine stream. For example, in FIG. 4, precipitation apparatus 418 can be configured such that at least a portion of the salt within concentrated brine stream 448 precipitates within precipitation apparatus 418 to produce substantially pure water stream 450, which contains less dissolved salt than concentrated brine stream 448.

The precipitation apparatus can be manufactured in any suitable manner. In certain embodiments, the precipitation apparatus comprises a vessel, such as a crystallization tank. The vessel may include an inlet through which at least a portion of the concentrated brine stream produced by the desalination system is transported into the precipitation vessel. The precipitation vessel may also include at least one outlet. For example, the precipitation vessel may include an outlet through which the water-containing stream (containing the dissolved salt in an amount that is less than that contained in the inlet stream) is transported. In some embodiments, the precipitation vessel includes an outlet through which solid, precipitated salt is transported.

In some embodiments, the crystallization tank comprises a low shear mixer. The low shear mixer can be configured to keep the crystals that are formed mixed (e.g., homogeneously mixed) in the brine stream. According to certain embodiments, the vessel is sized such that there is sufficient residence time for crystals to form and grow. In certain embodiments, the precipitation apparatus comprises a vessel which provides at least 20 minutes of residence time for the concentrated brine stream. As one non-limiting example, the vessel comprises, according to certain embodiments, a 6000 gallon vessel, which can be used to provide 24 minutes of residence in a 500 US barrel per day fresh water production system.

Those of ordinary skill in the art are capable of determining the residence time of a volume of fluid in a vessel. For a batch (i.e., non-flow) system, the residence time corresponds to the amount of time the fluid spends in the vessel. For a flow-based system, the residence time is determined by dividing the volume of the vessel by the volumetric flow rate of the fluid through the vessel.

In some embodiments the crystallization tank is fluidly connected to a storage tank. The storage tank may have, in some embodiments, a capacity that is substantially the same as the capacity of the crystallization tank. In certain embodiments, the crystallization tank and/or the storage tank can be configured to accommodate batch operation of a downstream solid handling apparatus, which can be fluidly coupled to the precipitation apparatus.

In some embodiments, the precipitation apparatus comprises at least one vessel comprising a volume within which the concentrated brine stream is substantially quiescent. In some embodiments, the flow rate of the fluid within the substantially quiescent volume is less than the flow rate at which precipitation (e.g., crystallization) is inhibited. For example, the flow rate of the fluid within the substantially quiescent volume may have, in certain embodiments, a flow rate of zero. In some embodiments, the flow rate of the fluid within the substantially quiescent volume may have a flow rate that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, or at least about 25% of the volume of the vessel. As one particular example, the precipitation apparatus can comprise a vessel including a stagnation zone. The stagnation zone may be positioned, for example, at the bottom of the precipitation vessel. In certain embodiments, the precipitation apparatus can include a second vessel in which the solids precipitated in the first vessel are allowed to settle. For example, an aqueous stream containing the precipitated solids can be transported to a crystallization tank, where the solids can be allowed to settle. The remaining contents of the aqueous stream can be transported out of the crystallization tank. While the use of two vessels within the precipitation apparatus has been described, it should be understood that, in other embodiments, a single vessel, or more than two vessels may be employed. In certain embodiments, the desalination system can be operated such that precipitation of the salt occurs substantially only within the stagnation zone of the precipitation vessel.

In some embodiments, the precipitated salt from the precipitation apparatus is fed to a solids-handling apparatus. The solids-handling apparatus may be configured, in certain embodiments, to remove at least a portion of the water retained by the precipitated salt. In some such embodiments, the solids-handling apparatus is configured to produce a cake comprising at least a portion of the precipitated salt from the precipitation apparatus. As one example, the solids-handling apparatus can comprise a filter (e.g., a vacuum drum filter or a filter press) configured to at least partially separate the precipitated salt from the remainder of a suspension containing the precipitated salt. In some such embodiments, at least a portion of the liquid within the salt suspension can be transported through the filter, leaving behind solid precipitated salt. As one non-limiting example, a Larox FP 2016-8000 64/64 M40 PP/PP Filter (Outotec, Inc.) may be used as the filter. The filter may comprise, in certain embodiments, a conveyor filter belt which filters the salt from a suspension containing the salt.

In some embodiments, the desalination system comprises a transport device configured to transport precipitated salt away from the precipitation apparatus. For example, in certain embodiments, a pump is used to transport a suspension of the precipitated salt away from the precipitation apparatus. In other embodiments, a conveyor could be used to transport precipitated salt away from the precipitation apparatus. In certain embodiments, the transport device is configured to transport the precipitated salt from the precipitation apparatus to a solids-handling apparatus.

The following examples are intended to illustrate certain embodiments of the present invention, but do not exemplify the full scope of the invention.

Example 1

In this example, a fluidic circuit comprising a feed tank and a desalination system is described.

Figure 6:
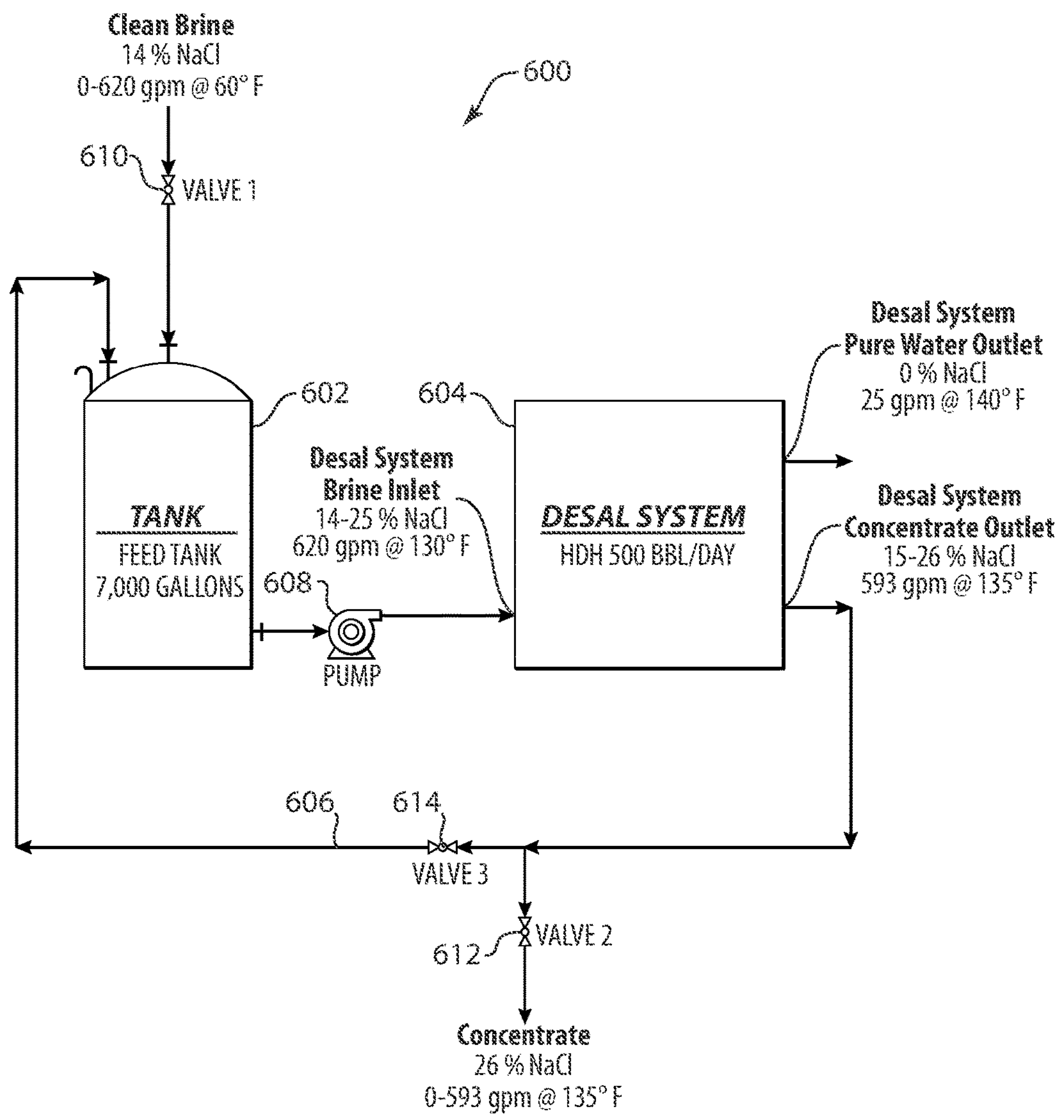
FIG. 6 shows a schematic flow diagram of an exemplary system for producing a concentrated brine stream comprising a feed tank, a desalination system, a pump, and a plurality of valves, according to some embodiments.

As shown in FIG. 6, system 600 for producing a concentrated brine stream comprised feed tank 602 having a volume of 7,000 gallons, HDH desalination system 604 having a production rate of 500 barrels/day, and liquid conduit 606. In addition, system 600 comprised pump 608, inlet valve 610, discharge valve 612, and recirculation valve 614.

In operation, inlet valve 610 was opened, and discharge valve 612 and recirculation valve 614 were closed. Clean brine (e.g., brine that has undergone pretreatment to remove one or more substances) having an NaCl concentration of 14 wt % entered feed tank 602 through an inlet at a temperature of 60° F. and a flow rate of 620 gallons per minute (gpm). Inlet valve 610 was then closed, and recirculation valve 614 was opened. The clean brine was pumped from feed tank 602 to desalination system 604 by pump 608, and the clean brine entered desalination system 604 at a temperature of 130° F. and a flow rate of 620 gpm. A pure water outlet stream (e.g., a water stream having an NaCl concentration of about 0 wt %) exited desalination system 604 at a temperature of 140° F. and a flow rate of 25 gpm. A concentrated brine stream having an NaCl concentration of 15 wt % also exited desalination system 604, with the concentrated brine stream having a temperature of 135° F. and a flow rate of 593 gpm. The concentrated brine stream recirculated through conduit 606 to feed tank 602. The concentrated brine stream continued to recirculate through system 600, with the NaCl concentration of the concentrated brine increasing with every cycle, until the concentrated brine stream had an NaCl concentration of 26 wt %. Upon reaching an NaCl concentration of 26 wt %, discharge valve 612 was opened and recirculation valve 614 was closed, and the recirculated concentrated brine was discharged from system 600 at a temperature of 135° F. and a flow rate of 593 gpm.

Example 2

In this example, a system for producing a concentrated brine stream is described, where the system comprises two feed tanks, a desalination system, and a heat exchanger.

Figure 7:
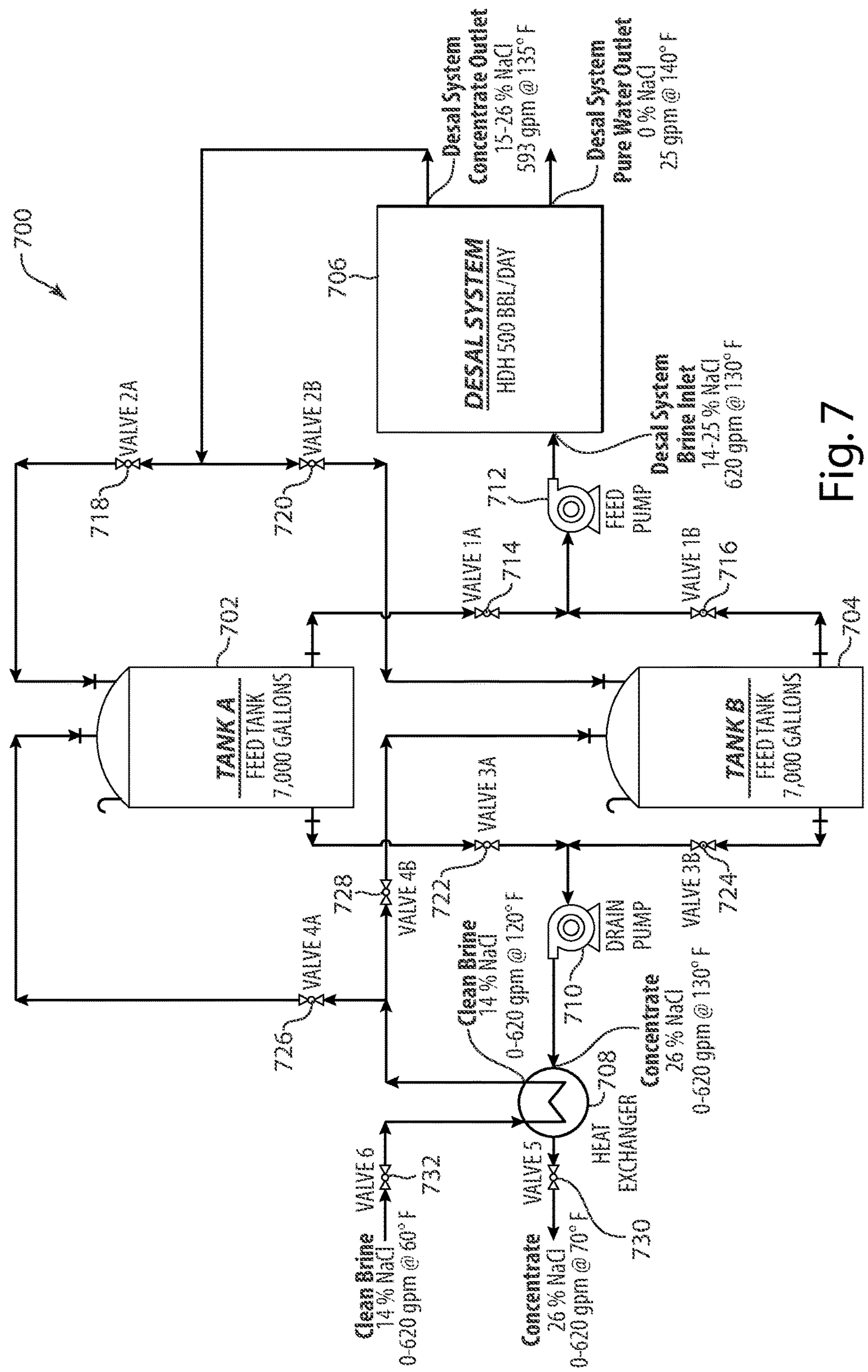
FIG. 7 shows, according to some embodiments, a schematic flow diagram of an exemplary system for producing a concentrated brine stream comprising two feed tanks, a desalination system, and a heat exchanger.

As shown in FIG. 7, system 700 comprises first feed tank 702 having a volume of 7,000 gallons, second feed tank 704 having a volume of 7,000 gallons, HDH desalination system 706 having a production rate of 500 barrels/day, and heat exchanger 708. In addition, system 700 comprises first pump 710, second pump 712, and valves 714, 716, 718, 720, 722, 724, 726, 728, 730, and 732.

In operation, first feed tank 702 is initially full of clean brine (e.g., brine that has undergone pretreatment to remove one or more substances) having an NaCl concentration of 14 wt %, and all valves except valves 714 and 718 are closed. The clean brine in first feed tank 702 is pumped to desalination system 706 by pump 712, and the clean brine enters desalination system 706 at a temperature of 130° F. and a flow rate of 620 gpm. A stream of substantially pure water (e.g., water having an NaCl concentration of about 0 wt %) exits desalination system 706 at a temperature of 140° F. and a flow rate of 25 gpm. A stream of concentrated brine having an NaCl concentration of 15 wt % exits desalination system 706 at a temperature of 135° F. and a flow rate of 593 gpm. The stream of concentrated brine is returned to first feed tank 702. Valves 726 and 732 are opened, and an amount of clean brine (e.g., to compensate for the substantially pure water that was removed) is added to first feed tank 702 at a temperature of 60° F. and a flow rate of 620 gpm. Valves 726 and 732 are then closed, and the concentrated brine stream continues to recirculate through a fluidic circuit comprising first feed tank 702 and desalination system 706. The NaCl concentration of the concentrated brine stream continues to increase with each cycle. When the NaCl concentration of the concentrated brine stream reaches 26 wt %, valves 714 and 718 are closed, and valves 722 and 730 are opened. Valves 732 and 728 are also opened. The concentrated brine stream is then discharged from first feed tank 702 through heat exchanger 708. The concentrated brine stream enters heat exchanger 708 at a temperature of 130° F. and a flow rate of 620 gpm. At the same time, a second clean brine stream having an NaCl concentration of 14 wt % enters heat exchanger 708 at a temperature of 60° F. and a flow rate of 620 gpm. In heat exchanger 708, heat is transferred from the concentrated brine stream to the second clean brine stream. After flowing through heat exchanger 708, the concentrated brine stream exits system 700 at a temperature of 70° F. and a flow rate of 620 gpm, while the second clean brine stream flows to second feed tank 704 at a temperature of 120° F. and a flow rate of 620 gpm.

The second clean brine stream, having been heated to a temperature of 120° F. in heat exchanger 708, flows into second feed tank 704. After tank 704 is filled, valves 728 and 732 are closed, and valves 716 and 720 are opened. The second clean brine stream flows through desalination system 706, and at least a portion of water is removed from the second clean brine stream to form a second concentrated brine stream. The second concentrated brine stream is recirculated through the fluidic circuit comprising second feed tank 704 and desalination system 706. The second concentrated brine stream flows between second feed tank 704 and desalination system 706 until the second concentrated brine stream reaches an NaCl concentration of 26%. At that point, valves 716 and 720 are closed, and valves 724 and 730 are opened. The second concentrated brine stream is discharged from system 700 through heat exchanger 708 while a third clean brine stream enters system 700 through heat exchanger 708 and is flowed to first feed tank 702, with heat transferring from the second concentrated brine stream to the third clean brine stream.

Example 3

In this example, a system for producing a concentrated brine stream that is configured for primary and secondary heat recovery is described. The configuration of the system is as shown in FIG. 3B.

In FIG. 3B, system 300 comprises HDH desalination unit 302, feed tank 304, heat exchanger 308, and concentrated brine tank 356. Initially, HDH desalination unit 302 is brought into operation. Brine circulates through HDH desalination unit 302 at a rate of about 620 gpm. The brine is desalinated at a rate of about 25 gpm. Make-up brine is supplied to HDH desalination unit 302 at a rate of 25 gpm to maintain a constant volume in the unit. As fresh water is separated from the recirculated volume and replaced with make-up brine, the salinity of the recirculated brine stream increases.

84 minutes after starting, the recirculated brine stream in HDH desalination unit 302 reaches a target NaCl concentration of 25 wt %. Discharge of the recirculated brine stream begins. A valve connecting the recirculation loop to the discharge header is opened, allowing concentrated brine to discharge at a rate of about 350 gpm. A valve controlling the flow of makeup brine is opened, allowing make-up brine to enter the unit at a rate of about 350 gpm. A valve on the recirculation loop is then closed. Flow into the make-up header from the feed pump is increased to a rate of 400 gpm. 350 gpm entered HDH desalination unit 302.

The discharged concentrated brine flows through counter-flow heat exchanger 308, where heat is transferred from the concentrated brine stream to the make-up brine stream. The concentrated brine stream is substantially cooled before exiting heat exchanger 308 and flowing through conduit 374 into concentrated brine tank 356. Make-up brine is pumped from feed tank 304 through heat exchanger 308, recovering thermal energy from the concentrated brine stream. The heated make-up brine flows through conduits 362 and 364 to HDH desalination unit 302.

Once discharge is ended, flow through heat exchanger 308 is replaced by warm concentrated brine from concentrated brine tank 356. The make-up brine continues to flow through heat exchanger 308. A portion of the make-up brine (e.g., 25 gpm) is flowed to HDH desalination unit 302, and the remainder (e.g., 325 gpm) is returned to feed tank 304. Accordingly, heat is exchanged between feed tank 304 and concentrated brine tank 356, bringing their temperatures towards an equilibrium.

Example 4

Figure 8:
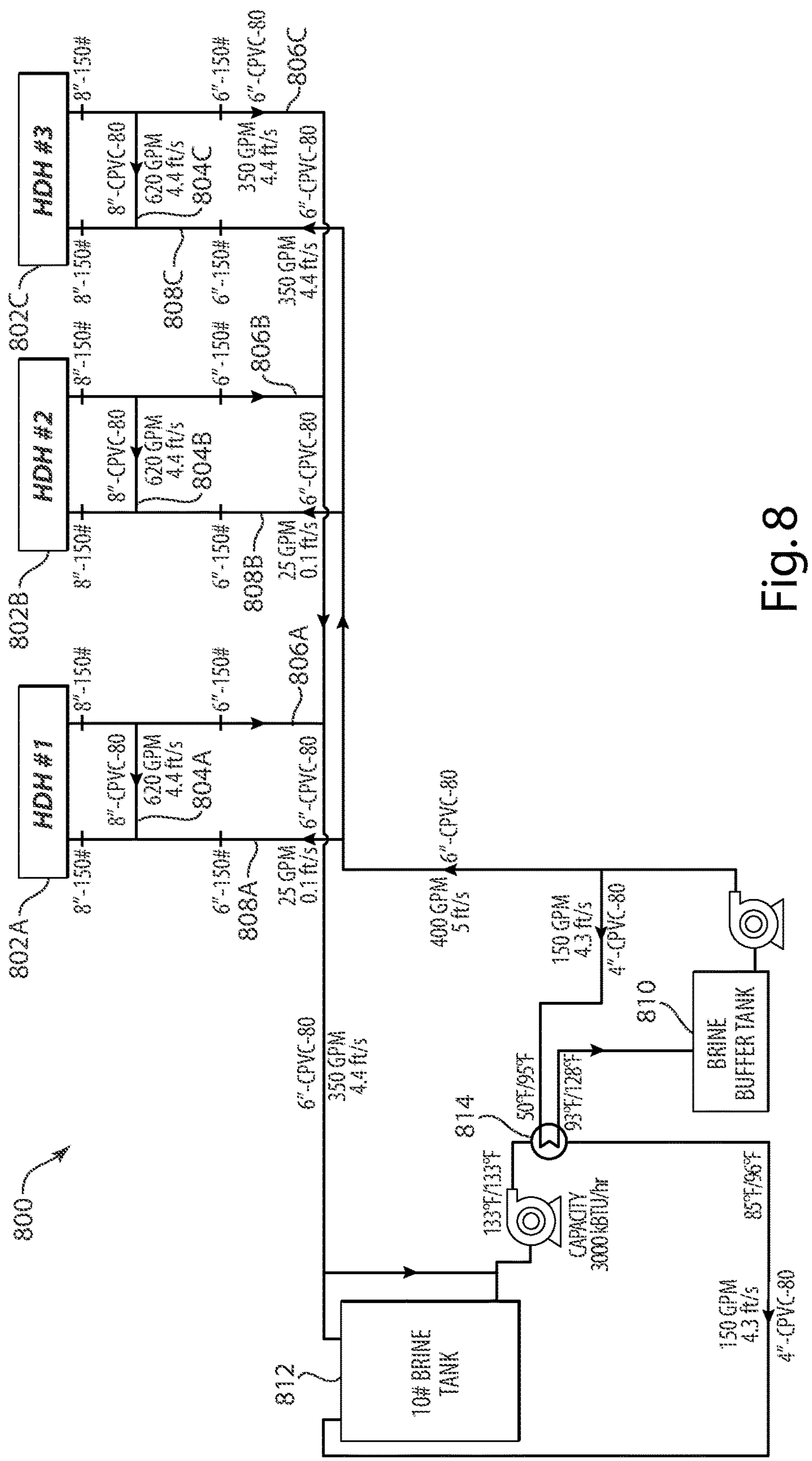
FIG. 8 shows a schematic flow diagram of an exemplary system for producing a concentrated brine stream comprising a feed tank, a concentrated brine tank, a desalination system comprising three desalination units, and a heat exchanger, according to some embodiments.

A system for producing a concentrated brine stream is described. As shown in FIG. 8, system 800 comprises HDH desalination units 802A, 802B, and 802C, recirculation conduits 804A, 804B, and 804C, discharge headers 806A, 806B, and 806C, inlet headers 808A, 808B, and 808C, feed tank 810, concentrated brine tank 812, and heat exchanger 814.

Initially, first HDH unit 802A is brought into operation. A brine stream is circulated through first HDH unit 802A at a rate of 620 gpm (e.g., via recirculation conduit 804A). The brine stream is desalinated at a rate of 25 gpm. Make-up brine is supplied to unit 802A at 25 gpm to maintain a constant volume in first HDH unit 802A. As fresh water is separated from the recirculated brine stream and replaced with make-up brine, the salinity of the recirculated brine stream increases. After about 29 minutes, while first HDH unit 802A continues to operate, second HDH unit 802B is brought into operation. After another 29 minutes (58 minutes total), while first HDH unit 802A and second HDH unit 802B continue to operate, third HDH unit 802C is also brought into operation.

84 minutes after starting up, the brine recirculation loop in first HDH unit 802A reaches the target NaCl concentration of 26 wt %, and discharge begins. A valve connecting the recirculation loop (e.g., including recirculation conduit 804A) to discharge header 806A is opened, allowing concentrated brine to discharge at a rate of approximately 350 gpm. A valve controlling the flow of make-up brine through inlet header 808A is opened, allowing 350 gpm of make-up brine to enter the system. A valve on the recirculation loop is closed, reducing the recirculation flow from 620 gpm to 0 gpm. During this time, the total flow through inlet header 808A is 400 gpm. 350 gpm is fed to the discharging unit (e.g., first HDH unit 802A), and 25 gpm make-up brine is fed to each of the two remaining units (e.g., second HDH unit 802B and third HDH unit 803C). Hot concentrated brine flows through discharge header 806A at a rate of 350 gpm. Some portion of the discharged brine enters heat exchanger 814. On the other side of the heat exchanger, make-up brine is pumped from feed tank 810, through heat exchanger 814, then back into tank 810, such that some of the heat from the hot concentrated brine is transferred to feed tank 810. Cooled concentrated brine enters concentrated brine tank 812, where it is mixed with any of the hot concentrated brine that does not flow through heat exchanger 814. After about 3 minutes, the salinity of the discharged brine falls below 24%, and the valve connecting first HDH unit 802A to the discharge header is shut, the valve connecting the first HDH unit to the intake header is throttled to allow only 25 gpm in, and the valve regulating flow in the recirculation loop is opened to allow 620 gpm of brine. The source of hot concentrated brine to the heat recovery heat exchanger 814 is interrupted. Flow is replaced by warm brine from concentrated brine tank 812.

26 minutes after discharge from first HDH unit 802A ends, second HDH unit 802B reaches the target salinity of 26 wt % NaCl. The discharge procedure is the same as for first HDH unit 802A. 26 minutes after discharge from second HDH unit 802B ends, third HDH unit 802C reaches its target salinity of 26 wt % NaCl. The discharge procedure is the same as for first HDH unit 802A. 26 minutes after discharge from third HDH unit 802C ends, first HDH unit 802A again reaches the target salinity of 26 wt % NaCl.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for producing a concentrated brine stream, comprising:

supplying a liquid stream comprising water and a dissolved salt at an initial concentration to a fluidic circuit comprising a humidifier, wherein the humidifier removes at least a portion of the water from the liquid stream to produce a concentrated brine stream comprising water and the dissolved salt at a second concentration higher than the initial concentration of the liquid stream;

recirculating the concentrated brine stream through the fluidic circuit to remove at least a portion of the water from the concentrated brine stream, forming a recirculated concentrated brine stream comprising water and the dissolved salt at a third concentration higher than the second concentration of the concentrated brine stream;

discharging the recirculated concentrated brine stream from the fluidic circuit when the recirculated concentrated brine stream reaches a density of at least about 10 pounds per gallon; and adding additional salt to the recirculated concentrated brine stream until the recirculated concentrated brine stream reaches a density of at least about 11.7 pounds per gallon.

2. The method according to claim 1, wherein the additional salt and the salt at the initial concentration in the liquid stream are different.

3. The method according to claim 1, wherein the salt at the initial concentration in the liquid stream comprises NaCl.

4. The method according to claim 1, wherein the additional salt comprises NaBr, $CaBr_2$, $MgBr_2$, KBr, $NaNO_3$, $Ca(NO_3)_2$, and/or $Mg(NO_3)_2$.

5. The method according to claim 1, wherein the recirculated concentrated brine stream has a salinity of at least about 25% upon discharge from the fluidic circuit.

6. The method according to claim 1, wherein the humidifier is a bubble column humidifier.

7. The method according to claim 1, wherein the humidifier is a packed bed humidifier.

8. The method according to claim 1, wherein the humidifier is fluidly connected to a dehumidifier, wherein the dehumidifier produces a stream comprising substantially pure water.

9. The method according to claim 8, wherein the dehumidifier is a bubble column condenser.

10. The method according to claim 1, further comprising treating the concentrated brine stream and/or the recirculated concentrated brine stream to remove an amount of a sulfate and/or a carbonate.

11. The method according to claim 1, further comprising pre-treating the liquid stream to remove at least a portion of at least one scale-forming ion from the liquid stream prior to supplying the liquid stream to the fluidic circuit.

12. The method according to claim 11, wherein the at least one scale-forming ion comprises $Mg^{2+}$, $Ca^{2+}$, $Sr^{2+}$, and/or $Ba^{2+}$.

13. The method according to claim 11, wherein the at least one scale-forming ion comprises $CO_3^{2-}$, $HCO_3^-$, $SO_4^{2-}$, $HSO_4^-$, $OH^-$, and/or a dissolved silica anion.

14. The method according to claim 1, further comprising pre-treating the liquid stream to remove at least a portion of a suspended and/or emulsified immiscible phase from the liquid stream prior to supplying the liquid stream to the fluidic circuit.

15. The method according to claim 14, wherein the suspended and/or emulsified immiscible phase comprises oil and/or grease.

16. The method according to claim 1, further comprising pre-treating the liquid stream to remove at least a portion of suspended solids from the liquid stream prior to supplying the liquid stream to the fluidic circuit.

17. The method according to claim 1, further comprising pre-treating the liquid stream to remove at least a portion of volatile organic material (VOM) from the liquid stream prior to supplying the liquid stream to the fluidic circuit.

18. The method according to claim 1, further comprising pre-treating the liquid stream to adjust or maintain the pH of the liquid stream prior to supplying the liquid stream to the fluidic circuit.

19. The method according to claim 1, wherein substantially no solid salt is produced in the fluidic circuit.

20. The method according to claim 1, further comprising precipitating at least a portion of the dissolved salt from the concentrated brine stream and/or the recirculated concentrated brine stream.

21. The method according to claim 1, wherein discharging the recirculated concentrated brine stream comprises flowing the recirculated concentrated brine stream through a first portion of a heat exchanger.

* * * * *